(12) United States Patent
Gomi

(10) Patent No.: US 8,349,436 B2
(45) Date of Patent: Jan. 8, 2013

(54) BASE MEMBER WITH BONDING FILM, BONDING METHOD AND BONDED BODY

(75) Inventor: Kazuhiro Gomi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1004 days.

(21) Appl. No.: 12/233,739

(22) Filed: Sep. 19, 2008

(65) Prior Publication Data

US 2009/0081432 A1    Mar. 26, 2009

(30) Foreign Application Priority Data

Sep. 21, 2007   (JP) ................. 2007-246302

(51) Int. Cl.
 *B32B 7/02* (2006.01)
 *B32B 7/12* (2006.01)
 *B32B 37/12* (2006.01)
(52) U.S. Cl. ........ 428/192; 428/214; 428/332; 428/354; 156/272.2
(58) Field of Classification Search ............ 428/192, 428/214, 332, 354; 156/272.2
 See application file for complete search history.

(56) References Cited

U.S. PATENT DOCUMENTS 5,573,592 A    11/1996   Hubner et al.

FOREIGN PATENT DOCUMENTS

JP    05-82404    4/1993

OTHER PUBLICATIONS

Machine Translation of JP 2005-011649.*
Machine Translation of JP 07-066549.*

* cited by examiner

*Primary Examiner* — Gerard Higgins
*Assistant Examiner* — Sathavaram I Reddy

(57) ABSTRACT

A base member with a bonding film that can be firmly bonded to an object with high dimensional accuracy and efficiently bonded to the object at a low temperature, a bonding method which is capable of efficiently bonding such a base member and the object at a low temperature, and a bonded body formed by firmly bonding the base member and the object with high dimensional accuracy and therefore being capable of providing high reliability are provided. The base member is adapted to be bonded to an object through the bonding film thereof. The base member includes a substrate, a bonding film containing metal atoms, oxygen atoms bonded to the metal atoms, and leaving groups each bonded to at least one of the metal and oxygen atoms, and having a surface, and an intermediate layer provided between the substrate and the bonding film, the intermediate layer having such a property that its thickness can be changed by applying stress thereto. When energy is applied to at least a predetermined region of the surface of the bonding film, the leaving groups, which exist in the vicinity of the surface within the region, are removed from the bonding film so that the region develops a bonding property with respect to the object.

39 Claims, 18 Drawing Sheets

Fig. 11D
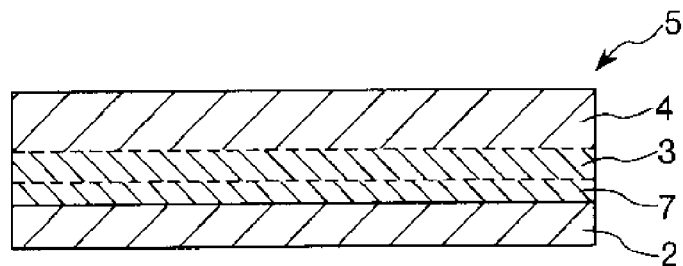
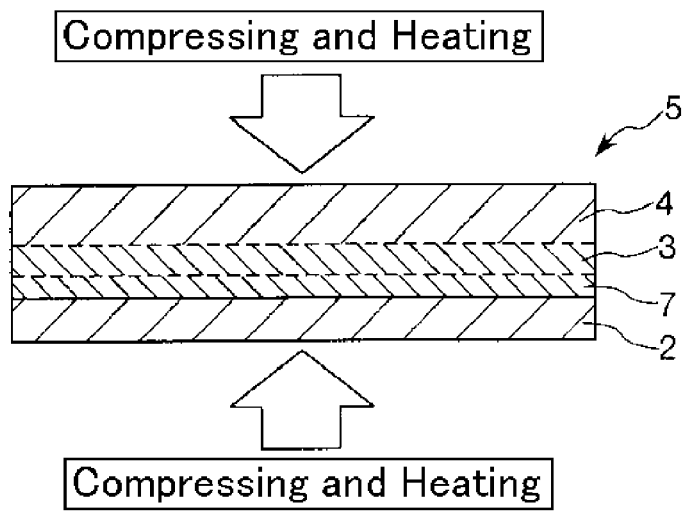
Fig. 11E
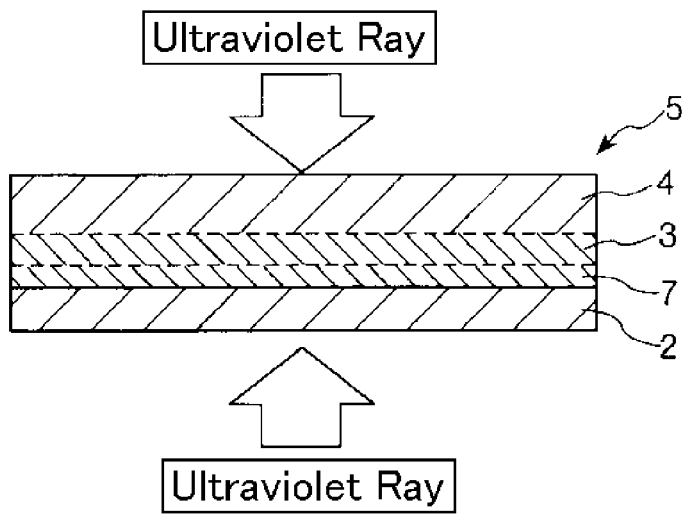
Fig. 11F

BASE MEMBER WITH BONDING FILM, BONDING METHOD AND BONDED BODY

CROSS-REFERENCE TO RELATED APPLICATION

This application claims a priority to Japanese Patent Application No. 2007-246302 filed on Sep. 21, 2007 is hereby expressly incorporated by reference herein in its entirety.

BACKGROUND

1. Technical Field

The present invention relates to a base member with a bonding film, a bonding method and a bonded body.

2. Related Art

Conventionally, in the case where two members (base members) are bonded together, an adhesive such as an epoxy-based adhesive, an urethane-based adhesive, or a silicone-based adhesive has been often used.

In general, an adhesive exhibits reliably high adhesiveness regardless of constituent materials of the members to be bonded. Therefore, members formed of various materials can be bonded together in various combinations.

For example, a liquid droplet ejection head (an ink-jet type recording head) included in an ink-jet printer is assembled by bonding, using an adhesive, several members formed of different kinds of materials such as a resin-based material, a metal-based material, and a silicon-based material.

When the members are to be bonded together using the adhesive to obtain an assembled body composed from the members, a liquid or paste adhesive is applied to surfaces of the members, and then the members are attached to each other via the applied adhesive on the surfaces thereof and firmly fixed together by hardening (setting) the adhesive with an action of heat or light.

However, in the case where the members are bonded together using the adhesive, there are problems in that bonding strength between the members is low, dimensional accuracy of the obtained assembled body is low, and it takes a relatively long time until the adhesive is hardened.

Further, it is often necessary to treat the surfaces of the members to be bonded using a primer in order to improve the bonding strength between the members. Therefore, additional cost and labor hour are required for performing the primer treatment, which causes an increase in cost and complexity of the process for bonding the members.

On the other hand, as a method of bonding members without using the adhesive, there is known a solid bonding method. The solid bonding method is a method of directly bonding members without an intervention of an intermediate layer composed of an adhesive or the like (see, for example, JP-A-5-82404).

Since such a solid bonding method does not need to use the intermediate layer composed of the adhesive or the like for bonding the members, it is possible to obtain a bonded body of the members having high dimensional accuracy.

However, in the case where the members are bonded together using the solid bonding method, there are problems in that constituent materials of the members to be bonded are limited to specific kinds, a heat treatment having a high temperature (e.g., about 700 to 800° C.) must be carried out in a bonding process, and an atmosphere in the bonding process is limited to a reduced atmosphere.

In view of such problems, there is a demand for a method which is capable of firmly bonding members with high dimensional accuracy and efficiently bonding them at a low temperature regardless of constituent materials of the members to be bonded.

SUMMARY

Accordingly, it is an object of the present invention to provide a base member with a bonding film (hereinafter, simply referred to as "a base member") that can be firmly bonded to an object with high dimensional accuracy and efficiently bonded to the object at a low temperature, a bonding method which is capable of efficiently bonding such a base member and the object at a low temperature, and a bonded body formed by firmly bonding the base member and the object with high dimensional accuracy and therefore being capable of providing high reliability.

A first aspect of the present invention is directed to a base member, the base member being adapted to be bonded to an object through the bonding film thereof.

The base member comprises a substrate, a bonding film containing metal atoms, oxygen atoms bonded to the metal atoms, and leaving groups each bonded to at least one of the metal and oxygen atoms, and having a surface, and an intermediate layer provided between the substrate and the bonding film, the intermediate layer having such a property that its thickness can be changed by applying stress thereto, wherein when energy is applied to at least a predetermined region of the surface of the bonding film, the leaving groups, which exist in the vicinity of the surface within the region, are removed from the bonding film so that the region develops a bonding property with respect to the object.

This makes it possible to obtain a base member that can be firmly bonded to an object with high dimensional accuracy and efficiently bonded to the object at a low temperature.

In the above base member, it is preferred that the leaving groups are unevenly distributed in the vicinity of the surface of the bonding film.

This makes it possible for the bonding film to appropriately exhibit a function of a metal oxide film. Namely, the bonding film can exhibit a function (property) of the metal oxide film such as excellent electrical conductivity or high transparency in addition to the function of the bonding film itself.

In the above base member, it is preferred that the metal atoms are at least one kind selected from the group comprising indium, tin, zinc, titanium and antimony.

In the case where the bonding film contains these metal atoms, it can exhibit excellent electrical conductivity and high transparency.

In the above base member, it is preferred that the leaving groups are at least one kind selected from the group comprising a hydrogen atom, a carbon atom, a nitrogen atom, a phosphorus atom, a sulfur atom, a halogen atom and an atomic group composed of these atoms.

Such leaving groups have excellent properties in bonding to and removing from the bonding film when applying the energy thereto. Therefore, the leaving groups can be removed from the bonding film relatively easily and uniformly, which makes it possible to further improve a bonding property of the base member.

In the above base member, it is preferred that the bonding film is composed of a material which is obtained by introducing hydrogen atoms as the leaving groups into indium tin oxide (ITO), indium zinc oxide (IZO), antimony tin oxide (ATO), indium tin oxide containing fluorine (FTO), zinc oxide (ZnO) or titanium dioxide ($TiO_2$).

If the bonding film has such a structure, the bonding film itself has an excellent mechanical property. Further, the bonding film exhibits an especially high bonding property to various kinds of materials. Therefore, such a bonding film is especially firmly bonded to the intermediate layer. Further, such a bonding film also exhibits an especially high bonding property with respect to the object. As a result, the substrate and the object are firmly bonded together through the bonding film and the intermediate layer.

In the above base member, it is preferred that an abundance ratio of the metal atoms to the oxygen atoms contained in the bonding film is in the range of 3:7 to 7:3.

By setting the abundance ratio of the metal atoms to the oxygen atoms to the above range, stability of the bonding film becomes high, and therefore it becomes possible to firmly bond the base member and the object together.

A second aspect of the present invention is directed to a base member, the base member being adapted to be bonded to an object through the bonding film thereof.

The base member comprises a substrate, a bonding film containing metal atoms and leaving groups each composed of an organic ingredient, and having a surface, and an intermediate layer provided between the substrate and the bonding film, the intermediate layer having such a property that its thickness can be changed by applying stress thereto, wherein when energy is applied to at least a predetermined region of the surface of the bonding film, the leaving groups, which exist in the vicinity of the surface within the region, are removed from the bonding film so that the region develops a bonding property with respect to the object.

This makes it possible to obtain a base member that can be firmly bonded to an object with high dimensional accuracy and efficiently bonded to the object at a low temperature.

In the above base member, it is preferred that the bonding film is obtained by forming an organic metal material as a raw material into a film form using a metal organic chemical vapor deposition method.

According to such a method, it is possible to form a bonding film having an uniform thickness in a relatively simple step.

In the above base member, it is preferred that the bonding film is formed under a low reducing atmosphere.

This makes it possible to effectively prevent or suppress reduction of the organic metal material. As a result, it is possible to form a bonding film in which a part of the organic compound contained in the organic metal material remains therein on the intermediate layer, which is more advantageous than the structure in which a pure metal film containing no organic compound is directly provided on the intermediate layer. In other words, it is possible to form a bonding film having excellent properties of both bonding and metal films.

In the above base member, it is preferred that the leaving groups are derived from a part of an organic compound contained in the organic metal material that remains in the bonding film.

By using residue remaining in the bonding film when forming it as the leaving groups, it is unnecessary to form, in advance, a film such as a metal film into which the leaving groups are to be introduced. This makes it possible to form a bonding film in a relatively simple step.

In the above base member, it is preferred that each of the leaving groups is composed of an atomic group containing a carbon atom as an essential element, and at least one kind selected from the group comprising a hydrogen atom, a nitrogen atom, a phosphorus atom, a sulfur atom and a halogen atom.

Such leaving groups have excellent properties in bonding to and removing from the bonding film when applying the energy thereto. Therefore, the leaving groups can be removed from the bonding film relatively easily and uniformly, which makes it possible to further improve a bonding property of the base member.

In the above base member, it is preferred that each of the leaving groups is an alkyl group.

Since the leaving groups each constituted from the alkyl group exhibit high chemical stability, the bonding film having the alkyl groups as the leaving groups can have excellent weather resistance and chemical resistance.

In the above base member, it is preferred that the organic metal material is a metal complex.

By using the metal complex, it is possible to reliably form a bonding film in which a part of the organic compound contained in the metal complex remains therein.

In the above base member, it is preferred that the metal atoms are at least one kind selected from the group comprising copper, aluminum, zinc and iron.

The bonding film containing these metal atoms can exhibit excellent electrical conductivity.

In the above base member, it is preferred that an abundance ratio of the metal atoms to the carbon atoms contained in the bonding film is in the range of 3:7 to 7:3.

By setting the abundance ratio of the metal atoms to the carbon atoms to the above range, stability of the bonding film becomes high, and thus it becomes possible to firmly bond the base member and the object together. Further, the bonding film can exhibit excellent electrical conductivity.

In the above base member, it is preferred that the intermediate layer is directly bonded to the bonding film.

In this case, a change of the thickness (that is, the shape) of the intermediate layer caused by applying the stress thereto affects the bonding film directly. Therefore, the bonding film can be reliably deformed according to the change of the shape of the intermediate layer. This makes it possible to more firmly bond the base member to the object through the bonding film thereof irrespective of a shape of the object.

In the above base member, it is preferred that the intermediate layer is elastically deformed.

This makes it possible to deform the intermediate layer according to the shapes of the object and the substrate without occurrence of fatigue failure thereof, even if a bonded body composed from the object and the substrate is used with being repeatedly deformed after the base member is bonded to the object.

In the above base member, it is preferred that a storage modulus of the intermediate layer is in the range of 0.01 to 10 MPa.

This makes it possible to reliably prevent occurrence of fatigue failure of the intermediate layer, and to deform the intermediate layer according to the shapes of the object and the substrate.

In the above base member, it is preferred that an average thickness of the intermediate layer is in the range of 5 to 10000 nm.

By setting the average thickness of the intermediate layer to the above range, it is possible for the intermediate layer to deform more reliably according to a shape of the surface of the object, that is, undulations, irregularities or the like existing on the surface of the object.

In the above base member, it is preferred that in the case where an average thickness of the intermediate layer is defined by A [nm] and an average thickness of the bonding film is defined by B [nm], the A and B satisfy a relation of $0.1 \leq A/B \leq 1000$.

By setting the relation of the A/B to the above range, when the thickness of the intermediate layer is changed, it is also possible to reliably change the thickness of the bonding film according to the change of the thickness of the intermediate layer.

In the above base member, it is preferred that active hands are generated on the surface of the bonding film, after the leaving groups existing at least in the vicinity thereof are removed from the bonding film.

This makes it possible to obtain a base member that can be firmly bonded to the object on the basis of chemical bonds to be produced using the active hands.

In the above base member, it is preferred that each of the active hands is a dangling bond or a hydroxyl group.

This makes it possible for the base member to be especially firmly bonded to the object.

In the above base member, it is preferred that an average thickness of the bonding film is in the range of 1 to 1000 nm.

This makes it possible to prevent dimensional accuracy of the bonded body obtained by bonding the base member and the object together from being significantly reduced, thereby enabling to more firmly bond them together.

In the above base member, it is preferred that the bonding film is in the form of a solid having no fluidity.

In this case, dimensional accuracy of the bonded body obtained by bonding the base member and the object together becomes extremely high as compared to a conventional bonded body obtained using an adhesive. Further, it is possible to firmly bond the base member to the object in a short period of time as compared to the conventional bonded body.

In the above base member, it is preferred that at least a portion of the substrate which makes contact with the intermediate layer is composed of a silicon material, a metal material or a glass material as a major component thereof.

This makes it possible to improve bonding strength of the intermediate layer against the substrate, even if the substrate is not subjected to a surface treatment.

In the above base member, it is preferred that a surface of the intermediate layer which makes contact with the bonding film has been, in advance, subjected to a surface treatment for improving bonding strength between the intermediate layer and the bonding film.

By doing so, the surface of the intermediate layer can be cleaned and activated, and the bonding strength between the bonding film and the intermediate layer becomes higher. This makes it possible to improve bonding strength between the base member and the object.

In the above base member, it is preferred that the surface treatment is a plasma treatment.

Use of the plasma treatment makes it possible to particularly optimize the surface of the intermediate layer so as to be able to form the bonding film thereon.

A third aspect of the present invention is directed to a bonding method of forming a bonded body in which the above base member and an object are bonded together through the bonding film of the base member.

The bonding method comprises preparing the base member and the object, applying energy to at least a predetermined region of a surface of the bonding film of the base member so that the region develops a bonding property with respect to the object, and making the object and the base member close contact with each other through the bonding film, so that the object and the base member are bonded together due to the bonding property developed in the region, to thereby obtain the bonded body.

This makes it possible to efficiently bond the base member and the object at a low temperature.

A fourth aspect of the present invention is directed to a bonding method of forming a bonded body in which the above base member and an object are bonded together through the bonding film of the base member, the bonding film having a surface making contact with the object.

The bonding method comprises preparing the base member and the object, making the object and the base member close contact with each other through the bonding film to obtain a laminated body in which the object and the base member are laminated together, and applying energy to at least a predetermined region of the surface of the bonding film in the laminated body, so that the region develops a bonding property with respect to the object and the object and the base member are bonded together due to the bonding property developed in the region, to thereby obtain the bonded body.

This makes it possible to efficiently bond the base member and the object at a low temperature. Further, in the state of the laminated body, the base member and the object are not bonded together. This makes it possible to finely adjust a relative position of the base member with relative to the object easily after they have been laminated together. As a result, it becomes possible to increase positional accuracy of the base member with relative to the object in a direction of the surface of the bonding film.

In the above bonding method, it is preferred that the applying the energy is carried out by at least one method selected from the group comprising a method in which an energy beam is irradiated on the bonding film, a method in which the bonding film is heated and a method in which a compressive force is applied to the bonding film.

Use of these methods makes it possible to relatively easily and efficiently apply the energy to the bonding film.

In the above bonding method, it is preferred that the energy beam is an ultraviolet ray having a wavelength of 126 to 300 nm.

Use of the ultraviolet ray having such a wavelength makes it possible to optimize an amount of the energy to be applied to the bonding film. As a result, the leaving groups in the bonding film can be reliably removed therefrom. This makes it possible for the bonding film to develop a bonding property, while preventing a characteristic thereof such as a mechanical characteristic or a chemical characteristic from being reduced.

In the above bonding method, it is preferred that a temperature of the heating is in the range of 25 to 100° C.

This makes it possible to reliably improve bonding strength between the base member and the object while reliably preventing them (the bonded body) from being thermally altered and deteriorated.

In the above bonding method, it is preferred that the compressive force is in the range of 0.2 to 10 MPa.

This makes it possible to reliably improve bonding strength between the base member and the object, while preventing occurrence of damages and the like in the substrate or the object due to an excess pressure.

In the above bonding method, it is preferred that the applying the energy is carried out in an atmosphere.

By doing so, it becomes unnecessary to spend labor hour and cost for controlling the atmosphere. This makes it possible to easily perform the application of the energy.

In the above bonding method, it is preferred that the object has a surface which has been, in advance, subjected to a surface treatment for improving bonding strength between the object and the base member, and the bonding film of the base member makes close contact with the surface-treated surface of the object.

This make it possible to improve the bonding strength between the base member and the object.

In the above bonding method, it is preferred that the object has a surface containing at least one group or substance selected from the group comprising a functional group, a radical, an open circular molecule, an unsaturated bond, a halogen atom and peroxide, and the bonding film of the base member makes close contact with the surface having the group or substance of the object.

This make it possible to sufficiently improve bonding strength between the base member and the object.

It is preferred that the above bonding method further comprises subjecting the bonded body to a treatment for improving bonding strength between the base member and the object.

This makes it possible to further improve the bonding strength between the base member and the object.

In the above bonding method, it is preferred that the subjecting the treatment is carried out by at least one method selected from the group comprising a method in which an energy beam is irradiated on the bonded body, a method in which the bonded body is heated and a method in which a compressive force is applied to the bonded body.

This makes it possible to further improve the bonding strength between the base member and the object.

A fifth aspect of the present invention is directed to a bonded body. The bonded body comprises the above base member, and an object bonded to the base member through the bonding film thereof.

This makes it possible to obtain a bonded body formed by firmly bonding the base member and the object together with high dimensional accuracy. Such a bonded body can have high reliability.

A sixth aspect of the present invention is directed to a bonded body. The bonded body comprises a first base member and a second base member, wherein the first and second base members are bonded together by facing and bonding the bonding films thereof.

This makes it possible to obtain a bonded body formed by firmly bonding the base members together with high dimensional accuracy. Such a bonded body can have high reliability.

BRIEF DESCRIPTION OF THE DRAWINGS

FIGS. 10A to 10C and 11D to 11F are longitudinal sectional views for explaining a first embodiment of the bonding method of bonding the base member according to the present invention to an object.

DESCRIPTION OF EXEMPLARY EMBODIMENTS

Figure 1:
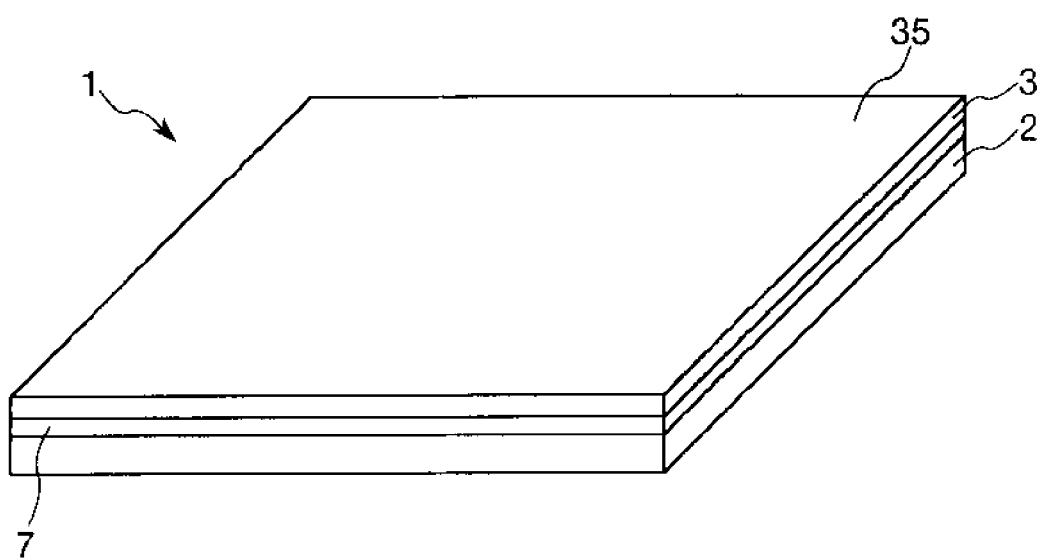
FIG. 1 is a perspective view for explaining the base member according to the present invention.

Hereinafter, the base member, the bonding method, and the bonded body according to the present invention will be described in detail with reference to preferred embodiments shown in the accompanying drawings.

The base member of the present invention has a substrate, a bonding film, and an intermediate layer interposed between the substrate and the bonding film.

The base member is used for bonding the substrate to an opposite substrate, that is, an object to be bonded to the base member (hereinafter, simply referred to as "an object" on occasion). Specifically, the base member is used for bonding the substrate to the opposite substrate (the object) through the intermediate layer and the bonding film.

In this regard, this bonding state of the substrate and the opposite substrate will be referred as the expression "the base member is bonded to the opposite substrate (the object)" or "the base member is bonded to the opposite substrate (the object) through the bonding film".

In the base member, the bonding film contains metal atoms, oxygen atoms bonded to the metal atoms, and leaving groups each bonded to at least one of the metal and oxygen atoms.

In the base member having such a bonding film, when energy is applied to at least a predetermined region of a surface of the bonding film, that is, a whole region or a partial region of the surface of the bonding film in a plan view thereof, the leaving groups, which exist in the vicinity of the surface within the region, are removed (left) from at least one of the metal and oxygen atoms (that is, the bonding film).

This bonding film has a characteristic that the region of the surface, to which the energy has been applied, develops a bonding property with respect to the opposite substrate due to the removal (leaving) of the leaving groups.

Further, the intermediate layer has such a property that its thickness can be changed by applying stress thereto. In the case where the base member has such an intermediate layer, when it is put on (laminated to) and pressed to the opposite substrate (a counter substrate), the thickness of the intermediate layer can be changed by applying stress.

Therefore, even if an opposite substrate, which is to be bonded to the base member, has undulations or irregularities on a surface thereof, the thickness of the intermediate layer is changed so as to conform with or correspond to the undulations or irregularities of the surface of the opposite substrate.

As a result, a shape of the bonding film positioned between the intermediate layer and the opposite substrate is also changed according (following) to that of the intermediate layer. This makes it possible to reliably bond the base member to the opposite substrate having the undulations or irregularities on the surface thereof.

According to the present invention, it is possible for the base member having the characteristic described above to firmly bond to the opposite substrate with high dimensional accuracy and to efficiently bond to the opposite substrate at a low temperature.

In addition, by using such a base member, it is possible to obtain a bonded body having high reliability, in which the substrate and the opposite substrate are firmly bonded together through the bonding film and the intermediate layer.

First Embodiment

First, description will be made on a first embodiment of each of the base member of the present invention, a bonding method of bonding the base member and an opposite substrate (an object) together, that is, the bonding method of the present invention, and the bonded body of the present invention including the above base member.

Figure 2:
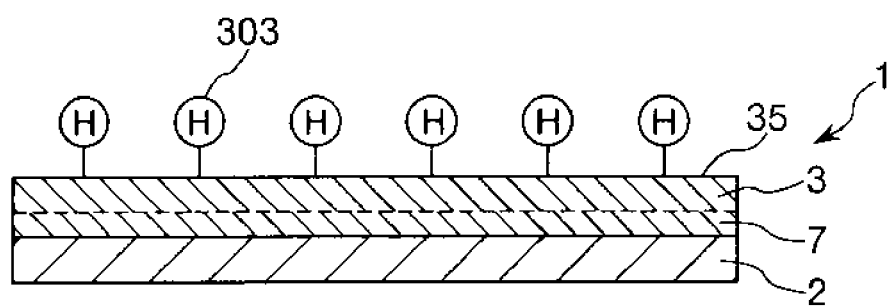
FIG. 2 is a partially enlarged view showing a state that before energy is applied to a bonding film having a structure I included in the base member according to the present invention.
Figure 3:
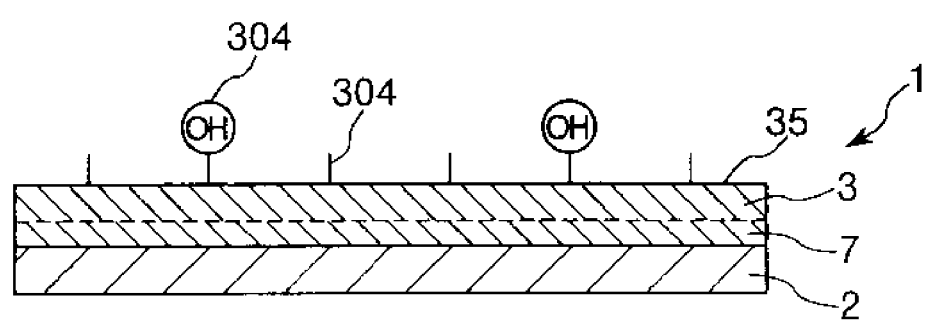
FIG. 3 is a partially enlarged view showing a state that after the energy is applied to the bonding film having the structure I included in the base member according to the present invention.

FIG. 1 is a perspective view for explaining the base member according to the present invention. FIG. 2 is a partially enlarged view showing a state that before energy is applied to a bonding film having a structure I included in the base member according to the present invention. FIG. 3 is a partially enlarged view showing a state that after the energy is applied to the bonding film having the structure I included in the base member according to the present invention.

Figure 4:
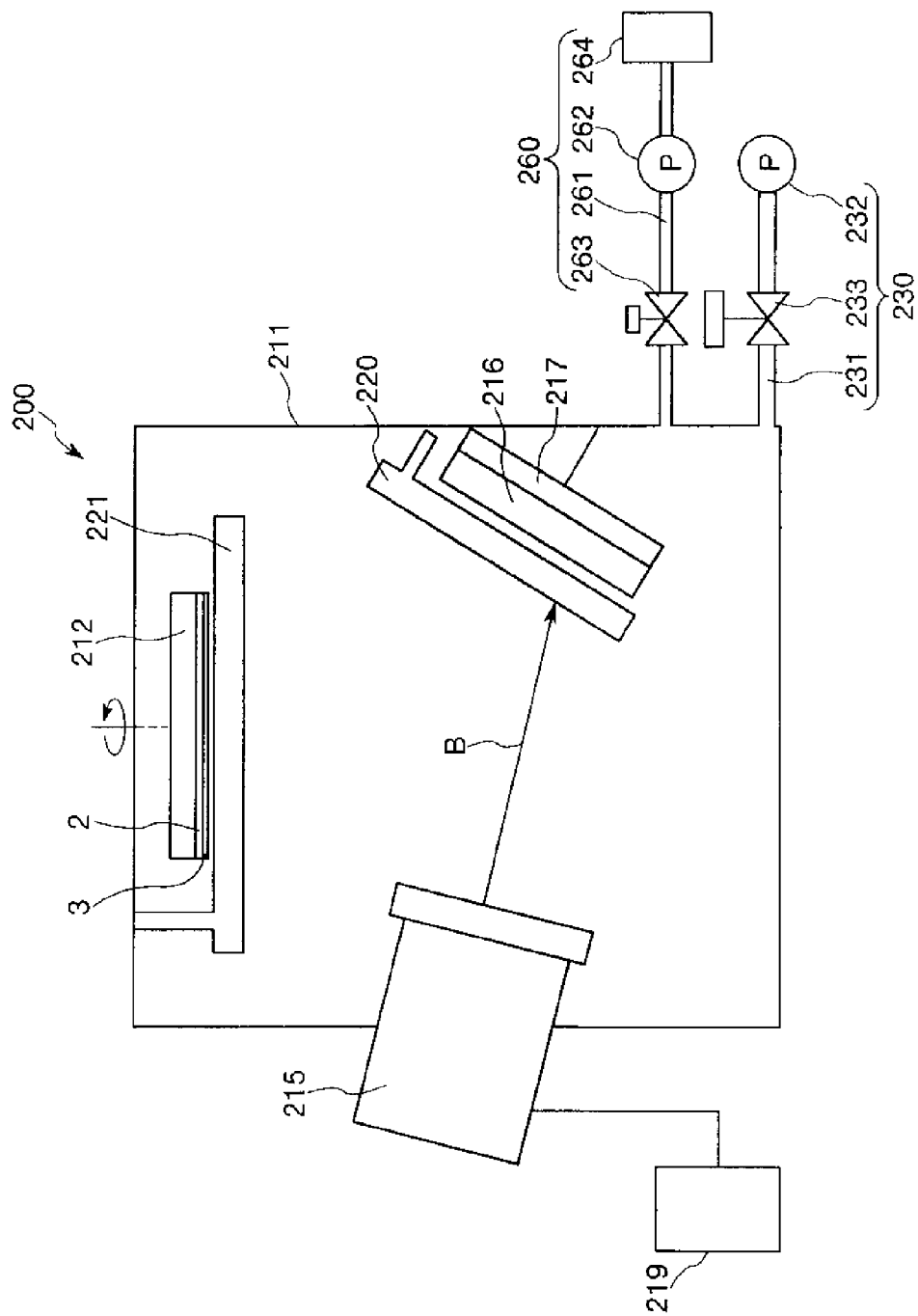
FIG. 4 is a longitudinal sectional view schematically showing a film forming apparatus used for forming the bonding film having the structure I.
Figure 5:
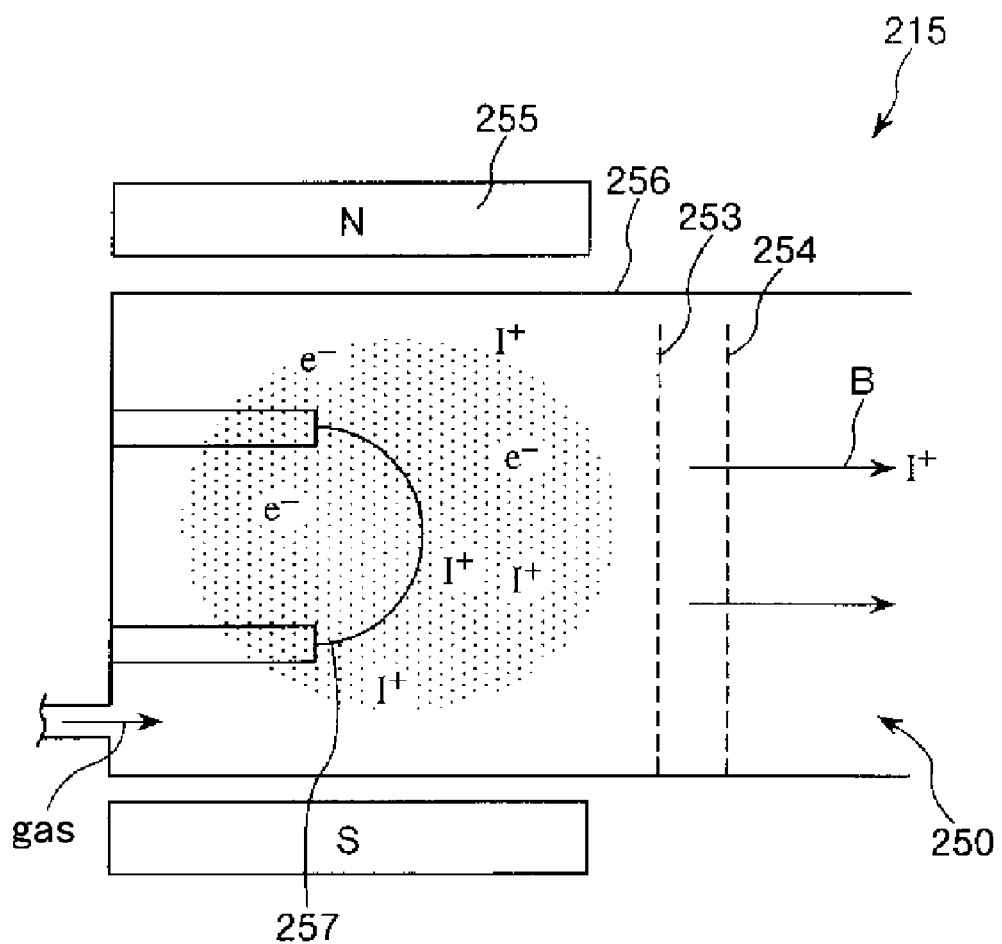
FIG. 5 is a schematic diagram showing a configuration of an ion source included in the film forming apparatus shown in FIG. 4.

FIG. 4 is a longitudinal sectional view schematically showing a film forming apparatus used for forming the bonding film having the structure I. FIG. 5 is a schematic diagram showing a configuration of an ion source included in the film forming apparatus shown in FIG. 4.

Figure 6:
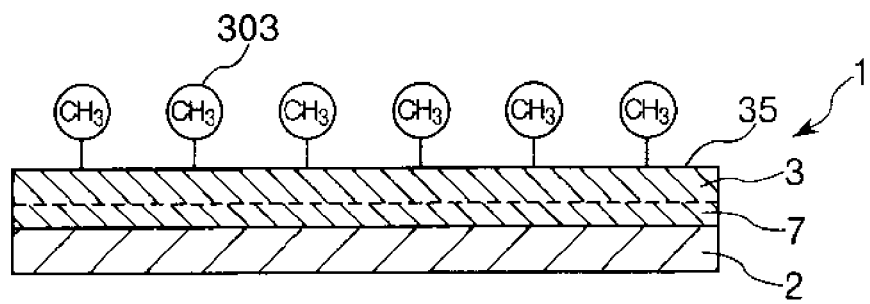
FIG. 6 is a partially enlarged view showing a state that before energy is applied to a bonding film having a structure II included in the base member according to the present invention.
Figure 7:
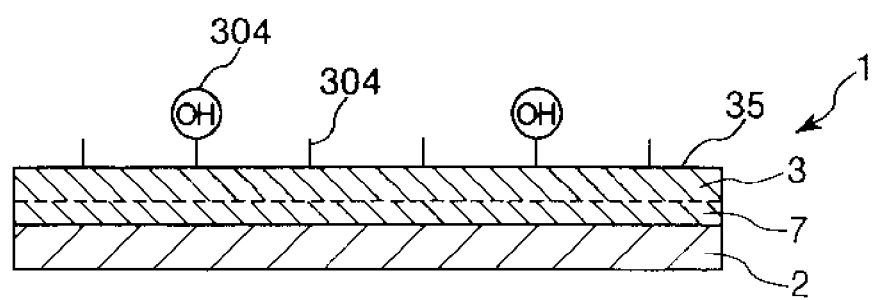
FIG. 7 is a partially enlarged view showing a state that after the energy is applied to the bonding film having the structure II included in the base member according to the present invention.

FIG. 6 is a partially enlarged view showing a state that before energy is applied to a bonding film having a structure II included in the base member according to the present invention. FIG. 7 is a partially enlarged view showing a state that after the energy is applied to the bonding film having the structure II included in the base member according to the present invention.

Figure 8:
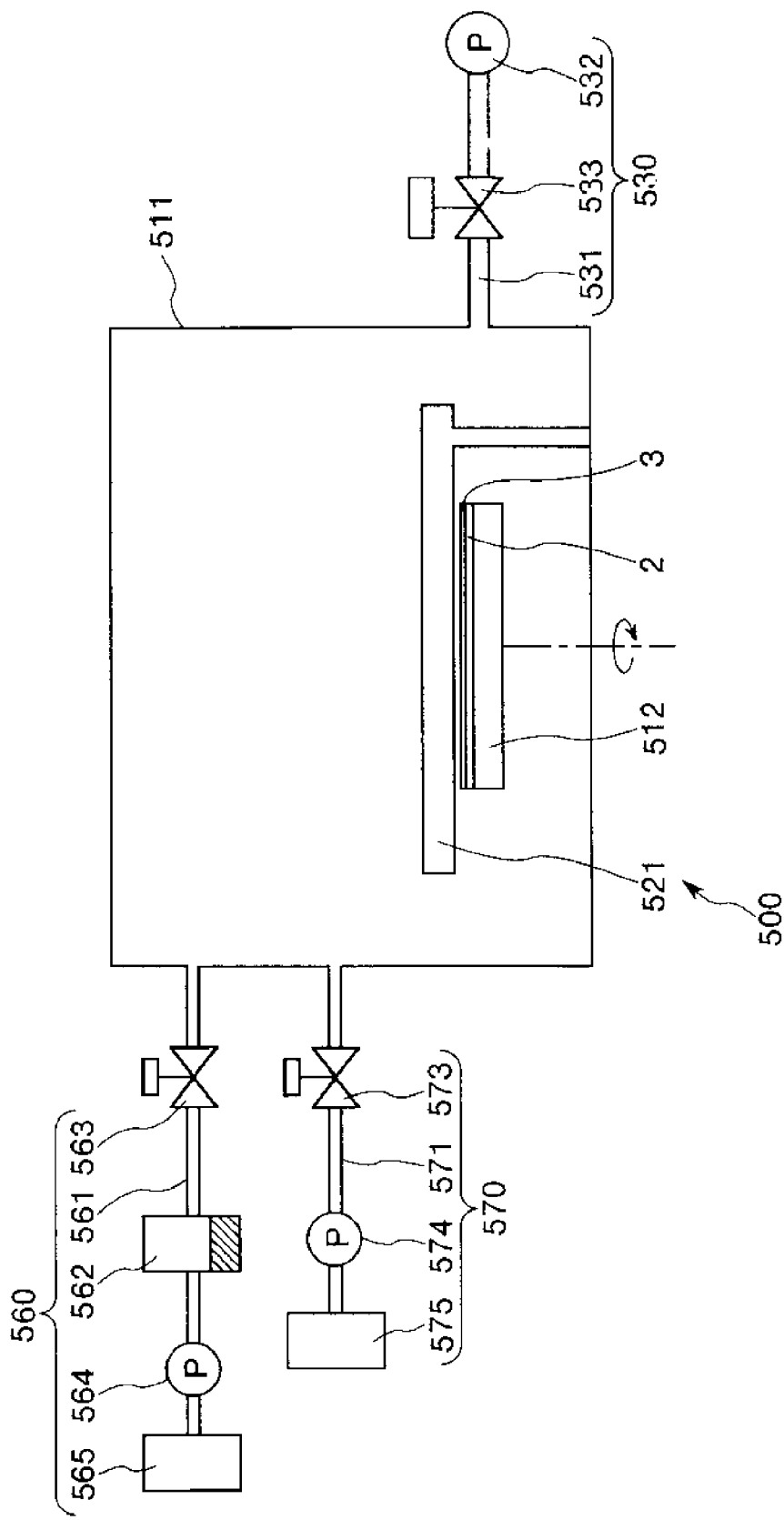
FIG. 8 is a longitudinal sectional view schematically showing a film forming apparatus used for forming the bonding film having the structure II.
Figure 9:
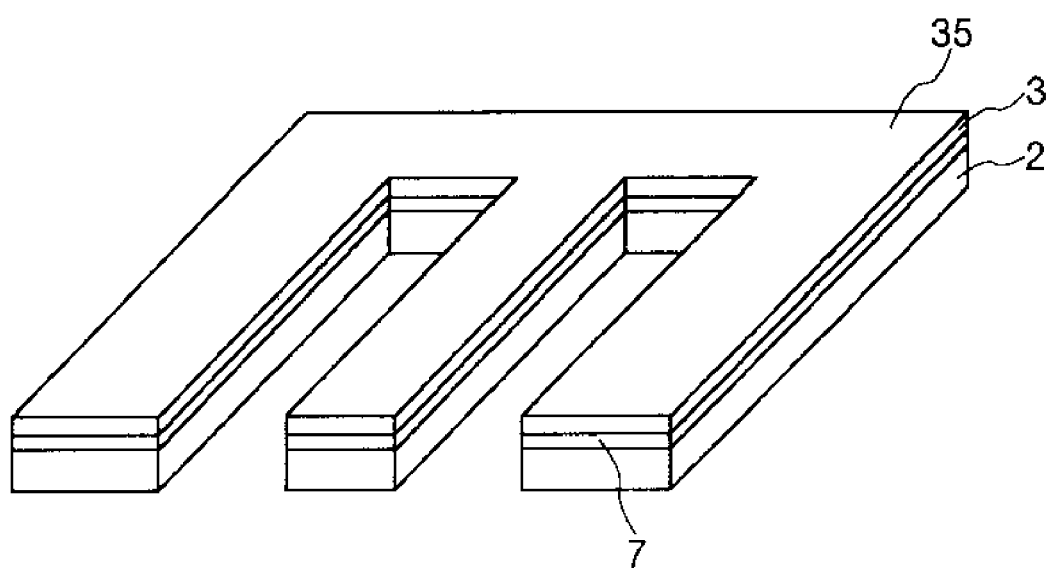
FIG. 9 is a perspective view for explaining another structure of the base member according to the present invention.

FIG. 8 is a longitudinal sectional view schematically showing a film forming apparatus used for forming the bonding film having the structure II. FIG. 9 is a perspective view for explaining another structure of the base member according to the present invention.

FIGS. 10A to 10C and 11D to 11F are longitudinal sectional views for explaining a first embodiment of the bonding method of bonding the base member according to the present invention to an object.

In this regard, it is to be noted that in the following description, an upper side in each of FIGS. 1 to 9, 10A to 10C and 11D to 11F will be referred to as "upper" and a lower side thereof will be referred to as "lower".

Hereinafter, first, a first embodiment of the base member of the present invention will be described.

As shown in FIG. 1, in this embodiment, a base member 1 includes a substrate 2, a bonding film 3 and an intermediate layer 7 provided between the substrate 2 and the bonding film 3. This base member 1 is used when the substrate 2 is bonded to an opposite substrate 4 through the bonding film 3 and the intermediate layer 7.

The substrate 2 has a function of supporting the intermediate layer 7 and the bonding film 3 each provided on one surface side of the substrate 2. Therefore, this substrate 2 may be composed of any material, as long as it has such stiffness that can support the intermediate layer 7 and the bonding film 3.

Especially, examples of a constituent material of the substrate 2 include: a resin-based material such as polyolefin (e.g., polyethylene, polypropylene, ethylene-propylene copolymer, ethylene-vinyl acetate copolymer (EVA)), cyclic polyolefin, denatured polyolefin, polyvinyl chloride, polyvinylidene chloride, polystyrene, polyamide, polyimide, polyamide-imide, polycarbonate, poly-(4-methylpentene-1), ionomer, acrylic resin, polymethyl methacrylate, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyester (e.g., polyethylene terephthalate (PET), polyethylene naphthalate, polybutylene terephthalate (PBT), polycyclohexane terephthalate (PCT)), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, liquid crystal polymer (e.g., aromatic polyester), fluoro resin (e.g., polytetrafluoroethylene, polyfluorovinylidene), thermoplastic elastomer (e.g., styrene-based elastomer, polyolefin-based elastomer, polyvinylchloride-based elastomer, polyurethane-based elastomer, polyester-based elastomer, polyamide-based elastomer, polybutadiene-based elastomer, trans-polyisoprene-based elastomer, fluororubber-based elastomer, chlorinated polyethylene-based elastomer), epoxy resin, phenolic resin, urea resin, melamine resin, aramid resin, unsaturated polyester, silicone resin, polyurethane, or a copolymer, a blended body and a polymer alloy each having at least one of these materials as a major component thereof; a metal-based material such as a metal (e.g., Fe, Ni, Co, Cr, Mn, Zn, Pt, Au, Ag, Cu, Pd, Al, W, Ti, V, Mo, Nb, Zr, Pr, Nd, Sm), an alloy containing at least one of these metals, carbon steel, stainless steel, indium tin oxide (ITO) or gallium arsenide; a semiconductor-based material such as Si, Ge, InP or GaPN; a silicon-based material such as monocrystalline silicon, polycrystalline silicon or amorphous silicon; a glass-based material such as silicic acid glass (quartz glass), silicic acid alkali glass, soda lime glass, potash lime glass, lead (alkaline) glass, barium glass or borosilicate glass; a ceramic-based material such as alumina, zirconia, ferrite, hydroxyapatite, silicon nitride, aluminum nitride, boron nitride, titanium nitride, carbon silicon, boron carbide, titanium carbide or tungsten carbide; a carbon-based material such as graphite; a complex material containing any one kind of the above materials or two or more kinds of the above materials; and the like.

Further, a surface of the substrate 2 may be subjected to a plating treatment such as a Ni plating treatment, a passivation treatment such as a chromate treatment, a nitriding treatment, or the like.

Furthermore, a shape of the substrate (base) 2 is not particularly limited to a plate shape, as long as it has a shape with a surface which can support the bonding film 3. In other words, examples of the shape of the substrate 2 include a massive shape (a blocky shape), a stick shape, and the like.

In this regard, in the case where the substrate 2 has the plate shape, an average thickness of the substrate 2 is not particularly limited to a specific value, but is preferably in the range of about 0.01 to 10 mm, and more preferably in the range of about 0.1 to 3 mm.

In this embodiment, the intermediate layer 7 is provided between the substrate 2 and the bonding film 3 so as to make contact with both of them.

This intermediate layer 7 has such a property that its thickness can be changed by applying stress thereto. Therefore, according to the base member 1 having such an intermediate layer 7, when it is put on and pressed to the opposite substrate 4, the thickness of the intermediate layer 7 can be changed by the applied stress.

Therefore, even if an opposite substrate 4, which is to be bonded to the base member 1, has undulations or irregularities on a surface thereof, the thickness of the intermediate layer 7 is changed so as to correspond (follow) to the undulations or irregularities of the surface of the opposite substrate 4.

As a result, a shape of the bonding film 3 provided on the intermediate layer 7 is also changed according to that of the intermediate layer 7. This makes it possible to reliably bond the base member 1 to the opposite substrate 4 having the undulations or irregularities on the surface thereof, and to improve bonding strength of the bonding film 3 against the opposite substrate 4.

Although such an intermediate layer 7 may be elastically or plastically deformed, it is preferred that the intermediate layer 7 is elastically deformed. This makes it possible to deform the intermediate layer 7 according to the shapes of the opposite substrate 4 and the substrate 2 without occurrence of fatigue failure thereof, even if a bonded body 5 composed from the opposite substrate 4 and the substrate 2 is used with being repeatedly deformed after the base member 1 is bonded to the opposite substrate 4.

In the case where the intermediate layer 7 is elastically deformed, a storage modulus of the intermediate layer 7 is preferably in the range of 0.01 to 10 MPa, and more preferably in the range of 0.1 to 1 MPa. This makes it possible to reliably prevent occurrence of fatigue failure of the intermediate layer 7, and to deform the intermediate layer 7 according to the shapes of the opposite substrate 4 and the substrate 2.

Although such an intermediate layer 7 may be composed of a dense body (a non-porous body), it is preferred that the intermediate layer 7 is composed of a porous body. This makes it possible to reliably change the thickness of the intermediate layer 7 by applying the stress thereto.

Examples of a constituent material of the intermediate layer 7 include: a resin-based material such as polyolefin, cyclic polyolefin, denatured polyolefin, polyester, polyether or polyurethane; a conductive polymer-based material such as a conductive polymer having thiophene chemical structures, a conductive polymer having phenylene chemical structures or a conductive polymer having pyrrole structures; a metal-based material such as a metal (e.g., Cu, Al, Ti) or an alloy containing at least one of these metals; a silicon-based material such as polycrystalline silicon; a ceramic-based material such as alumina, zirconia or ferrite; and the like.

Further, any one kind of the above materials may be used singly, or two or more kinds of the above materials may be used in combination as the constituent material of the intermediate layer 7.

An average thickness of the intermediate layer 7 is preferably in the range of 5 to 10000 nm, and more preferably in the range of 100 to 1000 nm. By setting the average thickness of the intermediate layer 7 to the above range, it is possible for the intermediate layer 7 to deform more reliably according to a shape of the surface of the opposite substrate 4, that is, the undulations, irregularities or the like existing on the surface of the opposite substrate 4.

Further, in the case where the average thickness of the intermediate layer 7 is defined by A [nm] and an average thickness of the bonding film 3 as described below is defined by B [nm], the A and B satisfy preferably a relation of $0.1 \leq A/B \leq 1000$, and more preferably a relation of $5 \leq A/B \leq 100$. By setting the relation of the A/B to the above range, when the thickness of the intermediate layer 7 is changed, it is also possible to reliably change the thickness of the bonding film 3 according to the change of the thickness of the intermediate layer 7.

When the base member 1 and the opposite substrate 4 are to be bonded together, the bonding film 3 can join the substrate 2 to the opposite substrate 4.

In the case where energy is applied on at least a predetermined region of a surface of the bonding film 3, that is, a whole region or a partial region of the surface of the bonding film 3 in a plane view thereof, leaving groups 303, which exist in the vicinity of the surface within the region, are removed therefrom (see FIG. 2).

Such a bonding film 3 develops a bonding property with respect to the opposite substrate (the object) 4 in the region on which the energy is applied due to the removal of the leaving groups 303.

The feature of the base member 1 of the present invention mainly resides on the characteristic of the bonding film 3 which is resulted from the structure thereof. Specifically, in the present invention, a bonding film 3 having the following structure I or II can be used.

Hereinafter, the bonding film 3 having the structure I or II will be described in detail, respectively.

I: The bonding film 3 having the structure I is provided on the intermediate layer 7, and contains metal atoms, oxygen atoms bonded to the metal atoms and leaving groups each bonded to at least one of the metal and oxygen atoms (see FIG. 2). In other words, the bonding film 3 is composed of a metal oxide film formed from metal oxide and leaving groups 303 introduced into the metal oxide film.

In the case where the energy is applied to such a bonding film 3, the leaving groups 303 are removed from the bonding film 3 (at least one of the metal and oxygen atoms). As a result, as shown in FIG. 3, active hands 304 are generated at least in the vicinity of a surface 35 of the bonding film 3.

At this time, a bonding property is developed on the surface 35 of the bonding film 3 due to generating of the active hands 304. This development of the bonding property makes it possible for the base member 1 (the bonding film 3) to firmly and effectively bond to the opposite substrate 4 with high dimensional accuracy through the bonding film 3 thereof.

Further, since the bonding film 3 is composed of the metal oxide (that is, the metal atoms and the oxygen atoms bonded to the metal atoms) and the leaving groups 303 bonded thereto, the bonding film 3 itself has high dimensional accuracy. This also makes it possible to obtain a bonded body 5 having high dimensional accuracy, wherein the bonded body 5 is obtained by bonding the base member 1 to the opposite substrate 4 as described below.

Furthermore, the bonding film 3 is in the form of a solid having no fluidity. Therefore, thickness and shape of a bonding layer (the bonding film 3) are hardly changed as compared to a conventional adhesive layer formed of an aquiform or muciform (semisolid) adhesive having fluidity.

Therefore, dimensional accuracy of the bonded body 5 obtained by bonding the base member 1 and the opposite substrate 4 together becomes extremely high as compared to a conventional bonded body obtained using the adhesive layer (the adhesive). In addition, since it is not necessary to wait until the adhesive is hardened, it is possible to firmly bond the base member 1 to the opposite substrate 4 in a short period of time as compared to the conventional bonded body.

Further, in the present invention, in the case of the bonding film 3 having the structure I, it is preferred that the bonding film 3 has electrical conductivity. In this case, if the intermediate layer 7 in the below mentioned bonded body 5 has the same electrical conductivity as that of the bonding film 3, the bonding film 3 can be used as a terminal or the like which electrically connects between the substrate 2 and the opposite substrate 4.

Furthermore, it is preferred that the bonding film 3 has transparency. In this case, if the intermediate layer 7 has the same transparency as that of the bonding film 3, the bonded body 5 of the present invention can be applied to elements (regions) each requiring transparency in devices such as optical devices.

In this regard, it is to be noted that the leaving groups 303 may exist in almost all of the bonding film 3, or be unevenly distributed in the vicinity of the surface 35 of the bonding film 3, as long as the leaving groups 303 exist at least in the vicinity of the surface 35 of the bonding film 3.

In the case where the leaving groups 303 are unevenly distributed in the vicinity of the surface 35 of the bonding film 3, the bonding film 3 can appropriately exhibit a function of the metal oxide film. Namely, the bonding film 3 can exhibit a function (property) of the metal oxide film such as excellent electrical conductivity or high transparency in addition to the function of the bonding film itself.

In the above described bonding film 3, the metal atoms contained in the bonding film 3 are selected so as to appropriately exhibit the function thereof.

Specifically, the metal atoms are not particularly limited to specific atoms, but examples of the metal atoms include Li, Be, B, Na, Mg, Al, K, Ca, Sc, V, Cr, Mn, Fe, Co, Ni, Cu, Zn, Ga, Rb, Sr, Y, Zr, Nb, Mo, Cd, In, Sn, Sb, Cs, Ba, La, Hf, Ta, W, Ti, Pb and the like.

Among these atoms, one kind selected from the group comprising In (indium), Sn (tin), Zn (zinc), Ti (titanium) and Sb (antimony) or two or more kinds selected from the above group may be preferably used. In the case where the bonding film 3 is composed of metal oxide containing these metal atoms and introducing the leaving groups 303 thereinto, the bonding film 3 can exhibit excellent electrical conductivity and high transparency.

More specifically, examples of the metal oxide include indium tin oxide (ITO), indium zinc oxide (IZO), antimony tin oxide (ATO), indium tin oxide containing fluorine (FTO), zinc oxide (ZnO), titanium dioxide ($TiO_2$), and the like.

In this regard, it is to be noted that in the case where the indium tin oxide (ITO) is used as the metal oxide, an atomic ratio of the indium atoms to the tin atoms is preferably in the range of 99/1 to 80/20, and more preferably in the range of 97/3 to 85/15. This makes it possible to conspicuously exhibit the above effects.

Further, an abundance ratio of the metal atoms to the oxygen atoms contained in the bonding film 3 is preferably in the range of about 3:7 to 7:3, and more preferably in the range of about 4:6 to 6:4. By setting the abundance ratio of the metal atoms to the oxygen atoms to the above range, stability of the bonding film 3 becomes high, and thus it becomes possible to firmly bond the base member 1 and the opposite substrate 4 together.

As described above, the active hands 304 are generated in the bonding film 3 due to the removal of the leaving groups 303 from at least one of the metal and oxygen atoms. Therefore, as each of the leaving groups 303, such a group of the type as mentioned below is preferably selected, that is, a group satisfying conditions in that it is relatively easily and uniformly removed from the bonding film 3 when the energy is applied thereto, whereas reliably bonded to the bonding film 3 so as not to be removed therefrom when the energy is not applied.

From such a viewpoint, as the leaving groups 303, at least one kind selected from the group comprising a hydrogen atom, a carbon atom, a nitrogen atom, a phosphorus atom, a sulfur atom, a halogen atom and an atomic group composed of these atoms is preferably used.

Such leaving groups 303 have excellent properties in bonding to and removing from the bonding film 3 when applying the energy thereto. Therefore, the leaving groups 303 can satisfy the above mentioned conditions sufficiently, which makes it possible to improve a bonding property of the base member 1.

In this regard, it is to be noted that examples of the atomic group composed of these atoms include an alkyl group such as a methyl group or an ethyl group, an alkoxy group such as a methoxy group or an ethoxy group, a carboxyl group, an amino group, a sulfonic acid group, and the like.

In the case of the bonding film 3 having the structure I, among the above atoms and atomic groups, it is preferred that each of the leaving groups 303 is a hydrogen atom. Since the leaving groups 303 each constituted from the hydrogen atom exhibit high chemical stability, the bonding film 3 having the hydrogen atoms as the leaving groups 303 can have excellent weather resistance and chemical resistance.

Considering the above matters, it is preferred that the bonding film 3 is composed of the metal oxide selected from the group comprising the indium tin oxide (ITO), the indium zinc oxide (IZO), the antimony tin oxide (ATO), the indium tin oxide containing fluorine (FTO), the zinc oxide (ZnO) and the titanium dioxide ($TiO_2$), and the hydrogen atoms introduced into the metal oxide as the leaving groups 303.

If the bonding film 3 has such a structure, the bonding film 3 itself has an excellent mechanical property. Further, the bonding film 3 exhibits an especially high bonding property to various kinds of materials. Therefore, such a bonding film 3 is especially firmly bonded to the intermediate layer 7. Further, such a bonding film 3 also exhibits an especially high bonding property with respect to the opposite substrate 4. As a result, the substrate 2 and the opposite substrate 4 are firmly bonded together through the bonding film 3 and the intermediate layer 7.

Further, an average thickness of the bonding film 3 is preferably in the range of about 1 to 1000 nm, and more preferably in the range of about 2 to 800 nm. By setting the average thickness of the bonding film 3 to the above range, it is possible to prevent dimensional accuracy of the bonded body 5 obtained by bonding the base member 1 and the opposite substrate 4 together from being significantly reduced, thereby enabling to more firmly bond them together.

In other words, if the average thickness of the bonding film 3 is lower than the above lower limit value, there is a case that the bonded body 5 having sufficient bonding strength cannot be obtained. In contrast, if the average thickness of the bonding film 3 exceeds the above upper limit value, there is a fear that dimensional accuracy of the bonded body 5 is reduced significantly.

In addition, in the case where the average thickness of the bonding film 3 is set to the above range, even if irregularities are generated on a bonding surface (a surface to be adjoined to the bonding film 3) of the intermediate layer 7 according to irregularities existing on the surface of the substrate 2, the bonding film 3 can be formed so as to assimilate the irregularities of the bonding surface of the intermediate layer 7, though it may be affected depending on sizes (heights) thereof.

As a result, it is possible to suppress sizes of irregularities of the surface 35 of the bonding film 3, which would be generated according to the irregularities of the bonding surface of the intermediate layer 7, from being extremely enlarged. Namely, it is possible to improve flatness of the surface 35 of the bonding film 3. This makes it possible to improve bonding strength between the bonding film 3 and the opposite substrate 4.

In addition, by adjusting the thickness of the bonding film 3 to a specific value, the bonding film 3 can have a certain degree of a shape following property. Therefore, even if the opposite substrate 4 has undulations or irregularities on a surface thereof, the base member 1 can be reliably bonded to the opposite substrate 4 through the deformation of the bonding film 3. Namely, the bonding film 3 can exhibit the same function as that of the above mentioned intermediate layer 7.

The thicker the thickness of bonding film 3 is, the higher degrees of the above flatness of the surface 35 and shape following property of the bonding film 3 become. Therefore, it is preferred that the thickness of the bonding film 3 is as thick as possible in order to further improve the degrees of the flatness of the surface 35 and the shape following property of the bonding film 3.

In the case where the leaving groups 303 are distributed in almost all of the bonding film 3, such a bonding film 3 can be formed by a method I-A in which a metal oxide containing the metal atoms and the oxygen atoms is applied into a film form using a physical vapor deposition method under an atmosphere containing atomic ingredients constituting the leaving group 303.

On the other hand, in the case where the leaving groups 303 are unevenly distributed in the vicinity of the surface 35 of the bonding film 3, such a bonding film 3 can be formed by a method I-B in which a metal oxide film containing the metal atoms and the oxygen atoms is formed, and then the leaving groups 303 are introduced into at least one of the metal and oxygen atoms.

Hereinafter, cases that after the intermediate layers 7 are formed on the substrates 2, the bonding films 3 are formed using the method I-A and the method I-B on the intermediate layers 7, respectively, will be described in detail.

I-A: In this case, as described above, the bonding film 3 is formed by applying the metal oxide containing the metal atoms and the oxygen atoms into the film form using the physical vapor deposition method (PVD method) under the atmosphere containing the atomic ingredients constituting the leaving group 303. By using such a PVD method, when the metal oxide comes flying toward the substrate 2, the leaving groups 303 are relatively easily introduced into at least one of the metal and oxygen atoms. Therefore, the leaving groups 303 can be distributed in almost all of the bonding film 3 reliably.

In addition, according to the PVD method, it is possible to form a dense and homogeneous bonding film 3 efficiently. The bonding film 3 formed using the PVD method can be especially firmly bonded to the opposite substrate 4. Further, the bonding film 3 formed using the PVD method can maintain an active state generated by applying the energy over a relatively extended time period. This makes it possible to improve simplification and efficiency of a manufacturing process of the bonded body 5.

Further, examples of the PVD method include a vacuum deposition method, a sputtering method, an ion plating method, a laser ablation method, and the like. Among these methods, it is preferred that the sputtering method is used. By using the sputtering method, particles constituted from the metal oxide can be sputtered into the atmosphere containing the atomic ingredients constituting the leaving groups 303 without breaking bonds between the metal atoms and the oxygen atoms.

At this time, the sputtered particles can make contact with gas containing the atomic ingredients constituting the leaving groups 303. This makes it possible to more effectively introduce the leaving groups 303 into the metal oxide (the metal atoms and/or the oxygen atoms).

Hereinafter, description will be representatively made on a method of forming the bonding film 3 using the sputtering method (the ion beam sputtering method) as the method of forming the bonding film 3 using the PVD method.

First, prior to description of the method of forming the bonding film 3, description will be made on a film forming apparatus 200 to be used for forming the bonding film 3 on the intermediate layer 7 provided on the substrate 2 using the ion beam sputtering method.

The film forming apparatus 200 shown in FIG. 4 is configured so that the bonding film 3 can be formed by the ion beam sputtering method in a chamber provided therein.

Specifically, the film forming apparatus 200 includes a chamber (a vacuum chamber) 211, a substrate holder (a film formation object holding unit) 212 that is provided in the chamber 211 and holds the substrate 2 (a film formation object), an ion source (an ion supplying unit) 215 that irradiates an ion beam B toward the inside of the chamber 211, and a target holder (a target holding unit) 217 that holds a target 216 to be used for generating the metal oxide (e.g., ITO) containing the metal and oxygen atoms due to the irradiation of the ion beam B.

Further, connected to the chamber 211 are gas supplying means 260 that supplies gas (e.g., a hydrogen gas) containing the atomic ingredients constituting the leaving groups 303 into the chamber 211 and evacuating means 230 that evacuates the inside of the chamber 211 and controls pressure of the inside thereof.

In this regard, it is to be noted that in this embodiment, the substrate holder 212 is attached to a ceiling section of the chamber 211 so that it is pivotable. This makes it possible to form a bonding film 3 having homogeneity and an uniform thickness on the substrate 2.

As shown in FIG. 5, the ions source (an ion gun) 215 includes an ion generation chamber 256 in which an opening (an irradiation opening) 250 is formed, a filament 257 and grids 253 and 254 each provided in the inside of the ion generation chamber 256, and a magnet 255 set on the outside of the ion generation chamber 256.

Further, as shown in FIG. 4, a gas supply source 219 that supplies gas (sputtering gas) into the ion generation chamber 256 is connected to the ion generation chamber 256.

In the ion source 215, when the filament 257 is heated by electrifying it in a state that the gas is supplied into the ion generation chamber 256 from the gas supply source 219, electrons are discharged from the filament 257. The discharged electrons are moved by a magnetic field of the magnet 255 and collide with gas molecules supplied into the ion generation chamber 256.

As a result, the gas molecules are ionized to produce ions $I^+$ thereof. The ions $I^+$ are drawn out of the ion generation chamber 256 while being accelerated by a voltage gradient between the grid 253 and the grid 254, and then discharged (irradiated) from the ion source 215 as the ion beam B through the opening 250.

The ion beam B irradiated from the ion source 215 collides with a surface of the target 216. Particles (sputtered particles) are sputtered from the surface of the target 216. The target 216 is formed of the metal oxide described above.

In the film forming apparatus 200, the ion source 215 is fixed (provided) in a sidewall of the chamber 211 so that the opening 250 thereof is located in the chamber 211. The ion source 215 may be arranged in a position spaced apart from the chamber 211 and connected to the chamber 211 through a connecting section. However, by adapting the configuration of this embodiment, the film forming apparatus 200 can be reduced in size.

The ion source 215 is provided so that the opening 250 thereof faces a direction different from a direction of the substrate holder 212, i.e., in this embodiment, a bottom side of the chamber 211. The number of the ion sources 215 is not limited to one and may be plural. It is possible to further increase film formation speed of the bonding film 3 by providing a plurality of the ion sources 215.

Further, a first shutter 220 and a second shutter 221 that can cover the target holder 217 and the substrate holder 212, respectively, are provided near the same. The shutters 220 and 221 prevent the target 216, the substrate 2, the intermediate layer 7, and the bonding film 3 from being exposed to an unnecessary atmosphere and the like.

The evacuating means 230 includes a pump 232, an evacuating line 231 that communicates the pump 232 and the chamber 211 with each other, and a valve 233 that is provided at a middle of the evacuating line 231. The evacuating means 230 can decompress the inside of the chamber 211 to a desired pressure.

The gas supplying means 260 includes a gas bomb 264 that stores gas (e.g., a hydrogen gas) containing the atomic ingredients constituting the leaving groups 303, a gas supply line 261 that introduces the gas from the gas bomb 264 into the chamber 211, and a pump 262 and a valve 263 that are provided at a middle of the gas supply line 261. The gas supplying means 260 can supply the gas containing the atomic ingredients constituting the leaving groups 303 into the chamber 211.

In the film forming apparatus 200 having the configuration described above, the bonding film 3 can be formed on the intermediate layer 7 provided on the substrate 2 as described below.

First, the substrate 2 provided with the intermediate layer 7 is prepared. The substrate 2 is conveyed into the chamber 211 of the film forming apparatus 200 and mounted (set) on the substrate holder 212 so that the intermediate layer 7 faces the bottom side of the chamber 211.

Next, the inside of the chamber 211 is decompressed by opening the valve 233 in a state that the evacuating means 230 is actuated, i.e., the pump 232 is actuated. A degree of the decompression (a degree of vacuum) is not particularly limited to a specific value, but is preferably in the range of about $1 \times 10^{-7}$ to $1 \times 10^{-4}$ Torr, and more preferably in the range of about $1 \times 10^{-6}$ to $1 \times 10^{-5}$ Torr.

The gas containing the atomic ingredients constituting the leaving groups 303 is supplied into the chamber 211 by opening the valve 263 in a state that the gas supplying means 260 is actuated, i.e., the pump 262 is actuated. As a result, the inside of the chamber can be set to an atmosphere containing such gas (a hydrogen gas atmosphere).

A flow rate of the gas containing the atomic ingredients constituting the leaving groups 303 is preferably in the range of about 1 to 100 ccm, and more preferably in the range of about 10 to 60 ccm. This makes it possible to reliably introduce the leaving groups 303 into at least one of the metal and oxygen atoms.

A temperature within the chamber 211 only has to be equal to or higher than 25° C., but is preferably in the range of about 25 to 100° C. By setting the temperature to the above range, reaction of the metal atoms or the oxygen atoms and the gas containing the atomic ingredients is efficiently performed. As a result, the gas containing the atomic ingredients can be reliably introduced into the metal atoms and/or the oxygen atoms as the leaving groups 303.

Next, the second shutter 221 is opened and the first shutter 220 is further opened. In this state, gas is introduced into the ion generation chamber 256 of the ion source 215 and heated by electrifying the filament 257. As a result, electrons are discharged from the filament 257 and the discharged electrons and gas molecules collide with each other, whereby the gas molecules are ionized to produce ions $I^+$ thereof.

The Ions $I^+$ are accelerated by the grids 253 and 254, discharged from the ion source 215, and collide with the target 216 formed of the metal oxide. Consequently, particles of the metal oxide (e.g., ITO) are sputtered from the target 216. At this time, the inside of the chamber 211 is set to the atmosphere containing the gas containing the atomic ingredients constituting the leaving groups 303 (e.g., a hydrogen gas atmosphere).

Therefore, the leaving groups 303 are introduced into the metal atoms and/or the oxygen atoms contained in the particles sputtered into the chamber 211. The metal oxide into which the leaving groups 303 are introduced is deposited onto the intermediate layer 7, whereby the bonding film 3 is formed.

In this regard, it is to be noted that in the ion beam sputtering method described in this embodiment, electrical discharge is performed in the ion generation chamber 256 of the ion source 215 and electrons $e^-$ are generated. However, the electrons $e^-$ are blocked by the grid 253 and prevented from being discharged into the chamber 211.

In addition, the irradiation direction of the ion beam B (the opening 250 of the ion source 215) faces the target 216 (a direction different from the bottom side of the chamber 211). Therefore, an ultraviolet ray generated in the ion generation chamber 256 is more reliably prevented from being irradiated on the formed bonding film 3. This makes it possible to reliably prevent the leaving groups 303 introduced during the formation of the bonding film 3 from being removed (left) therefrom.

As described above, it is possible to form a bonding film 3 in which the leaving groups 303 are distributed in almost all of a thickness direction thereof.

I-B: In this case, the bonding film 3 is obtained by forming a metal oxide film containing the metal atoms and the oxygen atoms, and then introducing the leaving groups 303 into at least one of the metal and oxygen atoms existing in the vicinity of a surface of the metal oxide film. According to this method, the introduced leaving groups 303 can be unevenly distributed in the vicinity of the surface of the metal oxide film in a relative simple step. Therefore, it is possible to form a bonding film 3 having excellent properties of both bonding and metal oxide films.

In this regard, the metal oxide film may be formed by any method. Examples of the method include various kinds of vapor phase film-formation methods such as a PVD method (physical vapor deposition method), a CVD method (chemical vapor deposition method) and a plasma polymerization method, various kinds of liquid phase film-formation methods, and the like. Among these methods, the metal oxide film is preferably formed using the PVD method. Use of the PVD method makes it possible to efficiently form a dense and uniform metal oxide film.

Further, examples of the PVD method include a vacuum deposition method, a sputtering method, an ion plating method, a laser ablation method, and the like. Among these methods, it is preferred that the sputtering method is used. By using the sputtering method, particles of the metal oxide can be sputtered into an atmosphere performing the formation of the metal oxide film without breaking bonds between the metal atoms and the oxygen atoms, and applied onto the intermediate layer 7 provided on the substrate 2. As a result, it is possible to form a metal oxide film having improved properties.

Furthermore, various kinds of methods can be used as the method of introducing the leaving groups 303 into the vicinity of the surface of the metal oxide film. Examples of such methods include a method I-B1 in which the metal oxide film is subjected to a heat treatment, that is, the metal oxide film is annealed under the atmosphere containing the atomic ingredients constituting the leaving groups 303, a method I-B2 which is referred to as an ion implantation method, and the like.

Among these methods, it is preferred that the method I-B1 is used. Use of the method I-B1 makes it possible to selectively introduce the leaving groups 303 into the vicinity of the surface of the metal oxide film. Further, by setting conditions such as an atmosphere temperature and a processing time to adequate conditions during the heat treatment, it is possible to control an amount of (the number of) the leaving groups 303 to be introduced into the metal oxide film, and a range of the metal oxide film in a depth direction thereof into which the leaving groups 303 are introduced.

Hereinafter, description will be representatively made on a case that the bonding film 3 is obtained by forming the metal oxide film using the sputtering method (the ion beam sputtering method), and then subjecting the thus obtained metal oxide film to the heat treatment under the atmosphere containing the atomic ingredients constituting the leaving groups 303.

In this regard, in the case where the bonding film 3 is formed using the method I-B, used is a film forming apparatus having the same configuration as that of the film forming apparatus 200 used in the formation of the bonding film 3 using the method I-A. Therefore, description regarding the film forming apparatus is omitted.

First, the substrate 2 provided with the intermediate layer 7 is prepared. The substrate 2 is conveyed into the chamber 211 of the film forming apparatus 200 and mounted (set) on the substrate holder 212 so that the intermediate layer 7 faces the bottom side of the chamber 211.

Next, the inside of the chamber 211 is decompressed by opening the valve 233 in a state that the evacuating means 230 is actuated, i.e., the pump 232 is actuated. A degree of the decompression (a degree of vacuum) is not particularly limited to a specific value, but is preferably in the range of about $1 \times 10^{-7}$ to $1 \times 10^{-4}$ Torr, and more preferably in the range of about $1 \times 10^{-6}$ to $1 \times 10^{-5}$ Torr.

Further, at this time, the inside of the chamber 211 is heated by actuating a heating means (not shown). A temperature within the chamber 211 only has to be equal to or higher than 25° C., but is preferably in the range of about 25 to 100° C. By setting the temperature to the above range, it is possible to form a metal oxide film having high density.

Next, the second shutter 221 is opened and the first shutter 220 is further opened. In this state, gas is introduced into the ion generation chamber 256 of the ion source 215 and heated by electrifying the filament 257. As a result, electrons are discharged from the filament 257 and the discharged electrons and gas molecules collide with each other, whereby the gas molecules are ionized to produce ions $I^+$ thereof.

The Ions $I^+$ are accelerated by the grids 253 and 254, discharged from the ion source 215, and collide with the target 216 formed of the metal oxide. Consequently, particles of the metal oxide (e.g., ITO) are sputtered from the target 216 and deposited onto the intermediate layer 7 provided on the substrate 2, whereby the metal oxide film containing the metal atoms and the oxygen atoms bonded to the metal atoms is formed.

In this regard, it is to be noted that in the ion beam sputtering method described in this embodiment, electrical discharge is performed in the ion generation chamber 256 of the ion source 215 and electrons $e^-$ are generated. However, the electrons $e^-$ are blocked by the grid 253 and prevented from being discharged into the chamber 211.

In addition, the irradiation direction of the ion beam B (the opening 250 of the ion source 215) faces the target 216 (a direction different from the bottom side of the chamber 211). Therefore, an ultraviolet ray generated in the ion generation chamber 256 is more reliably prevented from being irradiated on the formed bonding film 3.

This makes it possible to prevent the metal oxide film from being altered and deteriorated, and to suppress an introduction efficiency of the leaving groups 303 into a surface of the metal oxide film from being reduced in the subsequent step.

Next, the first shutter 220 is closed while maintaining the open state of the second shutter 221. In this state, the inside of the chamber 211 is heated by actuating the heating means. The temperature within the chamber 211 is set to a value that the leaving groups 303 can be introduced into the metal oxide film efficiently.

Specifically, the temperature is preferably in the range of about 100 to 600° C., and more preferably in the range of about 150 to 300° C. This makes it possible to prevent the substrate 2 and the metal oxide film from being altered and deteriorated and to efficiently introduce the leaving groups 303 into a surface of the metal oxide film from being reduced in the subsequent step.

Next, the gas containing the atomic ingredients constituting the leaving groups 303 is supplied into the chamber 211 by opening the valve 263 in a state that the gas supplying means 260 is actuated, i.e., the pump 262 is actuated. As a result, the inside of the chamber can be set to an atmosphere containing such gas (a hydrogen gas atmosphere).

In this way, when the inside of the chamber 211 is set to the atmosphere containing the atomic ingredients constituting the leaving groups 303 (e.g., the hydrogen gas atmosphere) in the state that the inside of the chamber 211 is heated in the preceding step, the leaving groups 303 are introduced into at least one of the metal and oxygen atoms existing in the vicinity of the surface of the metal oxide film to thereby form the bonding film 3.

A flow rate of the gas containing the atomic ingredients constituting the leaving groups 303 is preferably in the range of about 1 to 100 ccm, and more preferably in the range of about 10 to 60 ccm. This makes it possible to reliably introduce the leaving groups 303 into at least one of the metal and oxygen atoms.

In this regard, it is preferred that the decompression state of the inside of the chamber 211, that is adjusted by actuating the evacuating means 230 in the preceding step, is maintained. This makes it possible to more effectively introduce the leaving groups 303 into the vicinity of the surface of the metal oxide film.

Further, in the case where the inside of the chamber 211 is decompressed in this step from the decompression state that adjusted in the preceding step, labor hour, in which the inside of the chamber 211 is decompressed from the beginning, can be omitted. Therefore, merits such as reduce of a time, a cost or the like for forming the bonding film 3 can be obtained.

In this case, a degree of the decompression (a degree of vacuum) is not particularly limited to a specific value, but is preferably in the range of about $1\times10^{-7}$ to $1\times10^{-4}$ Torr, and more preferably in the range of about $1\times10^{-6}$ to $1\times10^{-5}$ Torr. A processing time for subjecting to the heat treatment is preferably in the range of about 15 to 120 minutes, and more preferably in the range of about 30 to 60 minutes.

By setting conditions (the temperature within the chamber 211, the degree of vacuum thereof, the flow rate of the gas and the processing time) during the heat treatment to the above ranges, the leaving groups 303 can be selectively introduced into the vicinity of the surface of the metal oxide film, although being different depending on kinds and the like thereof.

As described above, it is possible to form a bonding film 3 in which the leaving groups 303 are unevenly distributed in the vicinity of the surface thereof.

II: The bonding film 3 having the structure II is provided on the intermediate layer 7 provided on the substrate 2. Further, the bonding film 3 includes metal atoms and leaving groups each composed of an organic ingredient (see FIG. 6).

When energy is applied to such a bonding film 3, the leaving groups 303, which exist at least in the vicinity of the surface 35 of the bonding film 3, are removed therefrom to generate active hands 304 at least in the vicinity of the surface 35 of the bonding film 3 as shown in FIG. 7. As a result, the surface 35 of the bonding film 3 develops a bonding property.

In the case where the bonding property is developed on the surface 35 of the bonding film 3, the base member 1 can be firmly and efficiently bonded to an opposite substrate 4 with high dimensional accuracy through the bonding film 3 thereof.

Further, since the bonding film 3 includes the metal atoms and the leaving groups 303 each composed of the organic ingredient, that is, the bonding film 3 is formed from an organic metal film, it becomes a strong film which is relatively hardly deformed. Therefore, the bonding film 3 itself has high dimensional accuracy. This also makes it possible to obtain a bonded body 5 having high dimensional accuracy as described below, wherein the bonded body 5 is obtained by bonding the base member 1 to the opposite substrate 4.

Furthermore, such a bonding film 3 is in the form of a solid having no fluidity. Therefore, thickness and shape of a bonding layer (the bonding film 3) are hardly changed as compared to a conventional adhesive layer formed of an aquiform or muciform (semisolid) adhesive having fluidity.

Therefore, dimensional accuracy of the bonded body 5 obtained by bonding the base member 1 and the opposite substrate 4 together becomes extremely high as compared to a conventional bonded body obtained using the adhesive layer (the adhesive). In addition, since it is not necessary to wait until the adhesive is hardened, it is possible to firmly bond the base member 1 to the opposite substrate 4 in a short period of time as compared to the conventional bonded body.

Further, in the present invention, in the case of the bonding film 3 having the structure II, it is preferred that the bonding film 3 has electrical conductivity. In this case, if the intermediate layer 7 of the below mentioned bonded body 5 has the same electrical conductivity as that of the bonding film 3, the bonding film 3 can be used as a terminal or the like which electrically connects between the substrate 2 and the opposite substrate 4.

In the above described bonding film 3, the metal atoms and the leaving groups 303 contained in the bonding film 3 are selected so as to appropriately exhibit the function thereof.

Specifically, examples of the metal atoms include transition metal elements such as Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, various kinds of lanthanoid elements and various kinds of actinoid elements, typical metal elements such as Li, Be, Na, Mg, Al, K, Ca, Zn, Ga, Rb, Sr, Cd, In, Sn, Sb, Cs, Ba, Tl, Pd, Bi and Po, and the like.

Here, since a difference between the transition metal elements is only the number of electrons existing in an outermost electron shell thereof, physical properties of the transition metal elements are similar with each other. In general, each transition metal has strong hardness, a high melting point, and excellent electrical and thermal conductivities.

Therefore, in the case where the transition metal elements are used as the metal atoms, it is possible to prevent the metal oxide film from being altered and deteriorated, and to suppress an introduction efficiency of the leaving groups 303 into a surface of the metal oxide film from being reduced in the subsequent step. This makes it possible to further improve a bonding property to be developed in the bonding film 3, and electrical conductivity of the bonding film 3.

Further, in the case where one kind selected from the group comprising Cu, Al, Zn and Fe or two or more kinds selected from the above group are used as the metal atoms, the bonding film 3 can exhibit excellent electrical conductivity. Furthermore, in the case of use of a metal organic chemical vapor deposition method as described below, it is possible to relatively easily form a bonding film 3 having an uniform thickness by using a metal complex containing at least one kind of the above metals or the like as a raw material.

As described above, the active hands 304 are generated in the bonding film 3 due to the removal of the leaving groups 303 therefrom. Therefore, as each of the leaving groups 303, such a group of the type as mentioned below is preferably selected, that is, a group satisfying conditions in that it is relatively easily and uniformly removed from the bonding film 3 when the energy is applied thereto, whereas reliably bonded to the bonding film 3 so as not to be removed therefrom when the energy is not applied.

Specifically, in the bonding film 3 having the structure II, as each of the leaving groups 303, a group composed of an atomic group containing a carbon atom as an essential element, and at least one kind selected from the group comprising a hydrogen atom, a nitrogen atom, a phosphorus atom, a sulfur atom and a halogen atom is preferably selected.

Such leaving groups 303 have excellent properties in bonding to and removing from the bonding film 3 when applying the energy thereto. Therefore, the leaving groups 303 can satisfy the above mentioned conditions sufficiently, which makes it possible to improve a bonding property of the base member 1.

More specifically, examples of the atomic group include: an alkyl group such as a methyl group or an ethyl group; an alkoxy group such as a methoxy group or an ethoxy group; a carboxyl group; the other group such as an alkyl group having an isocyanate group, an amino group or a sulfonic acid group at the end thereof; and the like.

Among the above mentioned atomic groups, the alkyl group is preferably selected as each of the leaving groups 303. Since the leaving groups 303 each constituted from the alkyl group exhibit high chemical stability, the bonding film 3 having the alkyl groups as the leaving groups 303 can have excellent weather resistance and chemical resistance.

Further, in the bonding film 3 having such a structure, an abundance ratio of the metal atoms to the carbon atoms contained in the bonding film 3 is preferably in the range of about 3:7 to 7:3, and more preferably in the range of about 4:6 to 6:4. By setting the abundance ratio of the metal atoms to the carbon atoms to the above range, stability of the bonding film 3 becomes high, and therefore it becomes possible to firmly bond the base member 1 and the opposite substrate 4 together. Further, the bonding film 3 can exhibit excellent electrical conductivity.

Further, an average thickness of the bonding film 3 is preferably in the range of about 1 to 1000 nm, and more preferably in the range of about 2 to 800 nm. By setting the average thickness of the bonding film 3 to the above range, it is possible to prevent dimensional accuracy of the bonded body 5 obtained by bonding the base member 1 and the opposite substrate 4 together from being significantly reduced, thereby enabling to firmly bond them together.

In other words, if the average thickness of the bonding film 3 is lower than the above lower limit value, there is a case that the bonded body 5 having sufficient bonding strength between the base member 1 and the opposite substrate 4 cannot be obtained. In contrast, if the average thickness of the bonding film 3 exceeds the above upper limit value, there is a fear that dimensional accuracy of the bonded body 5 is reduced significantly.

In addition, in the case where the average thickness of the bonding film 3 is set to the above range, even if irregularities are generated on a bonding surface (a surface to be adjoined to the bonding film 3) of the intermediate layer 7 according to irregularities existing on the surface of the substrate 2, the bonding film 3 can be formed so as to assimilate the irregularities of the bonding surface of the intermediate layer 7, though it may be affected depending on sizes (heights) thereof.

As a result, it is possible to suppress sizes of irregularities of the surface 35 of the bonding film 3, which would be generated according to the irregularities of the bonding surface of the intermediate layer 7, from being extremely enlarged. Namely, it is possible to improve flatness of the surface 35 of the bonding film 3. This makes it possible to improve bonding strength between the bonding film 3 and the opposite substrate 4.

In addition, by adjusting the thickness of the bonding film 3 to a specific value, the bonding film 3 can have a certain degree of a shape following property. Therefore, even if the opposite substrate 4 has undulations or irregularities on a surface thereof, the base member 1 can be reliably bonded to the opposite substrate 4 through the deformation of the bonding film 3. Namely, the bonding film 3 can exhibit the same function as that of the above mentioned intermediate layer 7.

The thicker the thickness of bonding film 3 is, the higher degrees of the above flatness of the surface 35 and shape following property of the bonding film 3 become. Therefore, it is preferred that the thickness of the bonding film 3 is as thick as possible in order to further improve the degrees of the flatness of the surface 35 and the shape following property of the bonding film 3.

The above mentioned bonding film 3 may be formed by any method. Examples of such a method of forming the bonding film 3 include: a method II-A in which an organic compound containing the leaving groups 303 (an organic component) is applied to almost all of a metal film made of metal atoms; a method II-B in which an organic compound containing the leaving groups 303 (the organic ingredient) is selectively applied to the vicinity of a surface of a metal film made of metal atoms, that is, the vicinity of the surface of the metal film is chemically modified by the organic compound; a method II-C in which an organic metal material comprising metal atoms and an organic compound containing the leaving groups 303 as a raw material is formed into a film form using a metal organic chemical vapor deposition method; and the like.

Among the above methods, it is preferred that the bonding film 3 is formed using the method II-C. Use of the method II-C makes it possible to form a bonding film 3 having an uniform thickness in a relatively simple step.

Hereinafter, description will be representatively offered regarding a case (that is, the method II-C) that the bonding film 3 is obtained by forming the organic metal material comprising the metal atoms and the organic compound containing the leaving groups 303 as the raw material into a film form using the metal organic chemical vapor deposition method.

First, prior to description of the method of forming the bonding film 3, description will be made on a film forming apparatus 500 to be used for forming the bonding film 3.

The film forming apparatus 500 shown in FIG. 8 is configured so that the bonding film 3 is formed by the metal organic chemical vapor deposition method (hereinafter, referred to as "a MOCVD method") in the chamber 511 provided therein.

Specifically, the film forming apparatus 500 includes a chamber (a vacuum chamber) 511, a substrate holder (a film formation object holding unit) 512 that is provided in the chamber 511 and holds the substrate 2 on which the intermediate layer 7 is formed (a film formation object), organic metal material supplying means 560 that supplies a vaporized or atomized organic metal material into the chamber 511, gas supplying means 570 that supplies gas for setting the inside of the chamber 511 to a low reducing atmosphere, evacuating means 530 that evacuates the chamber 511 and controls pressure, and heating means (not shown) that heats the substrate holder 512.

In this embodiment, the substrate holder 512 is attached to a bottom of the chamber 511. The substrate holder 512 is pivotable by actuating a motor. This makes it possible to form a bonding film 3 having homogeneity and an uniform thickness on the substrate 2.

Further, a shutter 521 that can cover the substrate holder 512 is provided near the same. The shutter 521 prevents the substrate 2, the intermediate layer 7, and the bonding film 3 from being exposed to an unnecessary atmosphere and the like.

The organic metal material supplying means 560 is connected to the chamber 511. The organic metal material supplying means 560 includes a storage tank 562 that stores a solid organic metal material, a gas bomb 565 that stores a carrier gas for supplying the vaporized or atomized organic metal material into the chamber 511, a gas supply line 561 that leads the carrier gas and the vaporized or atomized organic metal material into the chamber 511, and a pump 564 and a valve 563 provided at a middle of the gas supply line 561.

In the organic metal material supplying means 560 having such a configuration, the storage tank 562 has heating means, and the solid organic metal material can be heated by actuating the heating means so that it is vaporized or atomized. Therefore, when the pump 564 is actuated to supply the carrier gas from the gas bomb 565 to the storage tank 562 in a state that the valve 563 is opened, the vaporized or atomized organic metal material is supplied into the chamber 511 through the supply line 561 together with the carrier gas.

The carrier gas is not particularly limited to a specific kind. As the carrier gas, a nitrogen gas, an argon gas, a helium gas, and the like may be preferably used.

Further, in this embodiment, the gas supplying means 570 is connected to the chamber 511. The gas supplying means 570 includes a gas bomb 575 that stores gas for setting the inside of the chamber 511 to a low reducing atmosphere, a gas supply line 571 that leads the gas into the gas chamber 511, and a pump 574 and a valve 573 provided at a middle of the gas supply line 571.

In the gas supplying means 570 having such a configuration, when the pump 574 is actuated in a state that the valve 573 is opened, the gas for setting the inside of the chamber 511 to the low reducing atmosphere is supplied into the chamber 511 from the gas bomb 575 through the supply line 571. By configuring the gas supplying means 570 as described above, it is possible to reliably set the inside of the chamber 511 to the low reducing atmosphere with respect to the organic metal material.

As a result, in the case where the bonding film 3 is formed from the organic metal material by using the MOCVD method, the bonding film 3 is formed in a state that at least a part of an organic compound contained in the organic metal material remains as the leaving groups 303 (the organic ingredient).

The gas for setting the inside of the chamber 511 to the low reducing atmosphere is not particularly limited to a specific kind. Examples of the gas include a nitrogen gas, rare gas such as helium, argon and xenon, and the like, and any one kind of the above gases may be used singly, or two or more kinds of the above gases may be used in combination.

In the case where a material containing oxygen atoms in a molecule structure such as 2,4-pentadionato copper(II) or [cu(hfac) (VTMS)] described later is used as the organic metal material, a hydrogen gas is preferably added to the gas for setting the inside of the chamber 511 to the low reducing atmosphere. This makes it possible to improve a reducing property with respect to the oxygen atoms and to form the bonding film 3 without remaining excessive oxygen atoms therein. As a result, the bonding film 3 has a low abundance ratio of metal oxide therein so that it can exhibit excellent electrical conductivity.

Further, in the case where at least one kind selected from the group comprising the nitrogen gas, the argon gas and the helium gas described above is used as the carrier gas, the carrier gas also can serve as the gas for setting the inside of the chamber 511 to the low reducing atmosphere.

The evacuating means 530 includes a pump 532, an evacuating line 531 that communicates the pump 532 and the chamber 511 with each other, and a valve 533 provided at a middle of the evacuating line 531. The evacuating means 530 can decompress the inside of the chamber 511 to a desired pressure.

In the film forming apparatus 500 having the configuration described above, the bonding film 3 can be formed on the intermediate layer 7 provided on the substrate 2 as described below using the MOCVD method.

First, the substrate 2 provided with the intermediate layer 7 is prepared. The substrate 2 is conveyed into the chamber 511 of the film forming apparatus 500 and mounted (set) on the substrate holder 512 so that the intermediate layer 7 faces an upper side of the chamber 511.

Next, the inside of the chamber 511 is decompressed by opening the valve 533 in a state that the evacuating means 530 is actuated, i.e., the pump 532 is actuated. A degree of the decompression (a degree of vacuum) is not particularly limited to a specific value, but is preferably in the range of about $1 \times 10^{-7}$ to $1 \times 10^{-4}$ Torr, and more preferably in the range of about $1 \times 10^{-6}$ to $1 \times 10^{-5}$ Torr.

Further, the gas for setting the inside of the chamber 511 to the low reducing atmosphere is supplied into the chamber 511 by opening the valve 573 in a state that the gas supplying means 570 is actuated, i.e., the pump 574 is actuated. As a result, the inside of the chamber 511 is set to the low reducing atmosphere.

A flow rate of the gas in the gas supplying means 570 is not particularly limited to a specific value, but is preferably in the range of about 0.1 to 10 sccm, and more preferably in the range of about 0.5 to 5 sccm.

Further, at this time, the heating means is actuated to heat the substrate holder 512. A temperature of the substrate holder 512 is preferably in the range of about 80 to 300° C., and more preferably in the range of about 100 to 275° C., although being slightly different depending on kind of the bonding film 3, that is, kind of a raw material to be used for forming the bonding film 3. By setting the temperature to the above range, it is possible to form the bonding film 3 having an excellent bonding property using the organic metal material described later.

Next, the shutter 521 is opened. The solid organic metal material stored in the storage tank 562 is heated by actuating the heating means provided in the storage tank 562 to thereby vaporize or atomize it. In this state, the vaporized or atomized organic metal material is supplied into the chamber 511 together with the carrier gas by actuating the pump 564 and opening the valve 563.

In this way, when the vaporized or atomized organic metal material is supplied into the chamber 511 in a state that the substrate holder 512 is heated in the preceding step, the organic metal material is heated on the intermediate layer 7. This makes it possible to form the bonding film 3 on the intermediate layer 7 so that a part of an organic compound contained in the organic metal material remains therein.

In other words, according to the MOCVD method, it is possible to form a film containing metal atoms so as to remain a part of the organic compound contained in the organic metal material in the film. Therefore, it is possible to obtain a bonding film 3 in which a part of the organic compound (that is, the organic ingredient) serves as the leaving groups 303 therein on the intermediate layer 7.

The organic metal material to be used for such a MOCVD method is not particularly limited to a specific kind. Examples of the organic metal material include: a metal complex such as 2,4-pentadionato copper(II), tris(8-quinolinolato)aluminum ($Alq_3$), tris(4-methyl-8-quinolinolato)aluminum(III) ($Almq_3$), (8-hydroxyquinolato)Zinc ($Znq_2$), copper phthalocyanine, Cu hexafluoroacetylacetonato(vinyltrimethylsilane) (Cu(hfac)(VTMS)), Cu hexafluoroacetylacetonato(2-methyl-1-hexene-3-en) (Cu(hfac)(MHY)), Cu perfluoroacetylacetonato(vinyltrimethylsilane) (Cu(pfac)(VTMS)), or Cu perfluoroacetylacetonato(2-methyl-1-hexene-3-en) (Cu(pfac)(MHY)); alkylmetal such as trimethylgallium, trimethylaluminum or diethyl zinc; derivatives thereof; and the like.

Among these materials, it is preferred that the metal complex is used as the organic metal material. By using the metal complex, it is possible to reliably form a bonding film 3 in which a part of the organic compound contained in the metal complex remains therein.

Further, in this embodiment, the inside of the chamber 511 is set to the low reducing atmosphere by actuating the gas supplying means 570. Setting the inside of the chamber 511 to such an atmosphere makes it possible to effectively prevent or suppress reduction of the organic metal material such as the metal complex.

As a result, it is possible to form a bonding film 3 in which a part of the organic compound contained in the organic metal material remains therein on the intermediate layer 7, which is more advantageous than the structure in which a pure metal film containing no organic compound is directly provided on the intermediate layer 7. In other words, it is possible to form a bonding film 3 having excellent properties of both bonding and metal films.

A flow rate of the vaporized or atomized organic metal material is preferably in the range of about 0.1 to 100 ccm, and more preferably in the range of about 0.5 to 60 ccm. This makes it possible to form a bonding film 3 having an uniform thickness, in which a part of the organic compound contained in the organic metal material remains therein.

As described above, in this embodiment, residue remaining in the bonding film 3 when forming it is used as the leaving groups 303. Therefore, it is unnecessary to form, in advance, a film such as a metal film into which the leaving groups 303 are to be introduced. This makes it possible to form a bonding film 3 in a relatively simple step.

In this regard, it is to be noted that a part of the organic compound remained in the bonding film 3 formed by using the organic metal material may entirely serve as the leaving groups 303 or may partially serve as the leaving groups 303.

As described above, it is possible to form a bonding film 3 on the intermediate layer 7 provided on the substrate 2.

Prior to forming the bonding film 3 by using the above method, it is preferred that at least a predetermined region of the intermediate layer 7 provided on the substrate 2 where the bonding film 3 is to be formed has been, in advance, subjected to a surface treatment for improving bonding strength between the intermediate layer 7 and the bonding film 3, depending on the constituent material of the intermediate layer 7.

Examples of such a surface treatment include: a physical surface treatment such as a sputtering treatment or a blast treatment; a chemical surface treatment such as a plasma treatment performed using oxygen plasma and nitrogen plasma, a corona discharge treatment, an etching treatment, an electron beam irradiation treatment, an ultraviolet ray irradiation treatment or an ozone exposure treatment; a treatment performed by combining two or more kinds of these surface treatments; and the like.

By subjecting the predetermined region of the intermediate layer 7 where the bonding film 3 is to be formed to such a treatment, it is possible to clean and activate the predetermined region. This makes it possible to improve the bonding strength between the bonding film 3 and the intermediate layer 7.

Among these surface treatments, use of the plasma treatment makes it possible to particularly optimize the surface (the predetermined region) of the intermediate layer 7 so as to be able to form the bonding film 3 thereon.

In this regard, it is to be noted that in the case where the surface of the intermediate layer 7 to be subjected to the surface treatment is formed of a resin material (a polymeric material), the corona discharge treatment, the nitrogen plasma treatment and the like are particularly preferably used.

Depending on the constituent material of the intermediate layer 7, the bonding strength of the bonding film 3 against the intermediate layer 7 becomes sufficiently high even if the surface of the intermediate layer 7 is not subjected to the surface treatment described above.

Examples of the constituent material of the intermediate layer 7 with which such an effect is obtained include materials containing the various kinds of resin-based materials, the various kinds of conductive polymer-based materials, the various kinds of ceramics-based materials and the like as a major component thereof. The surface of the intermediate layer 7 formed of such a material is covered with an oxide film.

In the oxide film, hydroxyl groups having relatively high activity exist in a surface thereof. Therefore, in this case, it is possible to improve bonding strength of the bonding film 3 against the intermediate layer 7 without subjecting the surface thereof to the surface treatment described above, which makes it possible to firmly bond the base member 1 (the bonding film 3) and the opposite substrate 4.

The substrate 2 provided with the intermediate layer 7 can be obtained by, for example, forming the intermediate layer 7 on the substrate 2. The intermediate layer 7 can be formed using various kinds of methods, although being different depending on the constituent material of the intermediate layer 7.

Examples of the methods include: an applying method such as a dipping method, a spin coating method, a curtain front coating method, a roll coating method, a gravure coating method, a spray coating method, a flow coating method, an electrostatic coating method or an electrodeposition coating method; a wet plating method (a wet process) such as an electrolytic plating method, a dip plating method or an electroless plating method; a vapor deposition method such as a vapor deposition method, a sputtering method, a CVD method, a PVD method or an ion plating method; a thermal spraying method; and the like.

In this way, it is possible to manufacture a base member 1, in which the intermediate layer 7 and the bonding film 3 are laminated on one surface of the substrate 2 in this order from the side of the substrate 2.

In this regard, it is to be noted that the base member 1 may be patterned in a shape like a comb shape besides the plate shape (the sheet shape) described above (see FIG. 9).

The base member 1 having the comb shape shown in FIG. 9 may have been obtained by preparing a substrate 2 having a comb shape in advance, and then forming the intermediate layer 7 and the bonding film 3 on the substrate 2 in this order, or obtained by patterning a base member 1 having the plate shape using various kinds of etching methods. Moreover, the patterned shape is not limited to the comb shape, and may be an arbitrary shape such as an L shape, a U shape, a frame shape or a meandering shape.

Further, in the base member 1, the intermediate layer 7 only has to be interposed between the substrate 2 and the bonding film 3. Therefore, one or more of other layers may be provided between the substrate 2 and the intermediate layer 7 and/or between the bonding film 3 and the intermediate layer 7.

However, if the intermediate layer 7 directly makes contact with the bonding film 3 like this embodiment, a change of the thickness (that is, the shape) of the intermediate layer 7 caused by applying the stress thereto affects the bonding film 3 directly. Therefore, in this case, the bonding film 3 can be reliably deformed according to the change of the shape of the intermediate layer 7. This makes it possible to more firmly bond the base member 1 to the opposite substrate 4 through the bonding film 3 thereof irrespective of a shape of the opposite substrate 4.

Next, a bonding method according to this embodiment, that is a bonding method of forming a bonded body in which the base member 1 and the opposite substrate 4 (the object) are bonded together through the bonding film 3 of the base member 1, will be described.

The bonding method according to this embodiment includes a step of preparing the base member 1 and the opposite substrate 4, a step of applying the energy to the bonding film 3 so that it is activated by removing (detaching) the leaving groups 303 therefrom, and a step of making the prepared opposite substrate 4 and the base member 1 close contact with each other through the bonding film 3 so that they are bonded together, to thereby obtain the bonded body 5.

Hereinafter, the respective steps of the bonding method according to this embodiment will be described one after another.

[1] First, the base member 1 (the base member according to the present invention) is prepared using the method described above (see FIG. 10A).

[2] Next, the energy is applied to the surface 35 of the bonding film 3 of the base member 1.

When the energy is applied to the bonding film 3, bonds of at least a part of the leaving groups 303 are broken and the at least a part of the leaving groups 303 are removed from the vicinity of the surface 35 of the bonding film 3. After the leaving groups 303 have been removed, active hands 304 are generated in the vicinity of the surface 35 of the bonding film 3.

As a result, the surface 35 of the bonding film 3 develops the bonding property with respect to the opposite substrate 4, that is, the bonding film 3 is activated. The base member 1 having such a state can be firmly bonded to the opposite substrate 4 on the basis of chemical bonds to be produced using the active hands 304.

The energy may be applied to the bonding film 3 by any method. Examples of the method include: a method in which an energy beam is irradiated on the bonding film 3; a method in which the bonding film 3 is heated; a method in which a compressive force (physical energy) is applied to the bonding film 3; a method in which the bonding film 3 is exposed to plasma (that is, plasma energy is applied to the bonding film 3); a method in which the bonding film 3 is exposed to an ozone gas (that is, chemical energy is applied to the bonding film 3); and the like.

Among these methods, in this embodiment, it is particularly preferred that the method in which the energy beam is irradiated on the bonding film 3 is used as the method in which the energy is applied to the bonding film 3. Since such a method can efficiently apply the energy to the bonding film 3 relatively easily, the method is suitably used as the method of applying the energy.

Examples of the energy beam include: a ray such as an ultraviolet ray or a laser beam; a particle beam such as a X ray, a y ray, an electron beam or an ion beam; and combinations of two or more kinds of these energy beams.

Figure 10A:
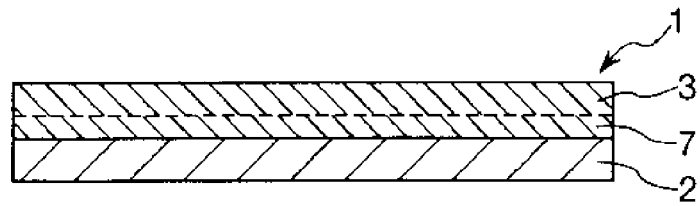
Figure 10B:
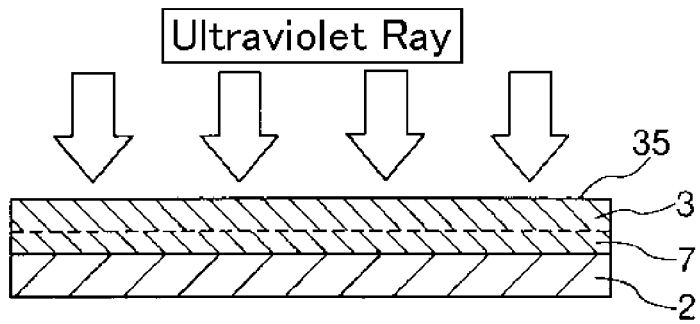

Among these energy beams, it is particularly preferred that an ultraviolet ray having a wavelength of about 126 to 300 nm is used (see FIG. 10B). Use of the ultraviolet ray having such a wavelength makes it possible to optimize an amount of the energy to be applied to the bonding film 3.

As a result, the leaving groups 303 in the bonding film 3 can be reliably removed therefrom. This makes it possible for the bonding film 3 to develop a bonding property, while preventing a characteristic thereof such as a mechanical characteristic or a chemical characteristic from being reduced.

Further, the use of the ultraviolet ray makes it possible to process a wide area of the surface 35 of the bonding film 3 without unevenness in a short period of time. Therefore, the removal (leaving) of the leaving groups 303 can be efficiently performed.

Moreover, such an ultraviolet ray has, for example, an advantage that it can be generated by simple equipment such as an UV lamp. In this regard, it is to be noted that the wavelength of the ultraviolet ray is more preferably in the range of about 126 to 200 nm.

In the case where the UV lamp is used, power of the UV lamp is preferably in the range of about 1 mW/cm$^2$ to 1 W/cm$^2$, and more preferably in the range of about 5 to 50 mW/cm$^2$, although being different depending on an area of the surface 35 of the bonding film 3. In this case, a distance between the UV lamp and the bonding film 3 is preferably in the range of about 3 to 3000 mm, and more preferably in the range of about 10 to 1000 mm.

Further, a time for irradiating the ultraviolet ray is preferably set to a time enough for removing the leaving groups 303 from the vicinity of the surface 35 of the bonding film 3, i.e., a time enough for preventing the ultraviolet ray from being irradiated on the bonding film 3 more than necessary. This makes it possible to efficiently prevent the bonding film 3 from being altered and deteriorated.

Specifically, the time is preferably in the range of about 0.5 to 30 minutes, and more preferably in the range of about 1 to 10 minutes, although being slightly different depending on an amount of the ultraviolet ray, the constituent material of the bonding film 3, and the like. The ultraviolet ray may be irradiated temporally continuously or intermittently (in a pulse-like manner).

On the other hand, examples of the laser beam include: a pulse oscillation laser (a pulse laser) such as an excimer laser; a continuous oscillation laser such as a carbon dioxide laser or a semiconductor laser; and the like. Among these lasers, it is preferred that the pulse laser is used. Use of the pulse laser makes it difficult to accumulate of heat in a portion of the bonding film 3 where the laser beam is irradiated with time.

Therefore, it is possible to reliably prevent alteration and deterioration of the bonding film 3 due to the heat accumulated. In other words, the use of the pulse laser makes it possible to prevent the heat accumulated from affecting the inside of the bonding film 3.

In the case where influence of the heat is taken into account, a pulse width of the pulse laser is preferably as small as possible. Specifically, the pulse width is preferably equal to or smaller than 1 ps (picosecond), and more preferably equal to or smaller than 500 fs (femtoseconds).

By setting the pulse width to the above range, it is possible to reliably suppress the influence of the heat generated in the bonding film 3 due to the irradiation of the laser beam. In this regard, it is to be noted that the pulse laser having the small pulse width of the above range is called "femtosecond laser".

A wavelength of the laser beam is not particularly limited to a specific value, but is preferably in the range of about 200 to 1200 nm, and more preferably in the range of about 400 to 1000 nm. Further, in the case of the pulse laser, peak power of the laser beam is preferably in the range of about 0.1 to 10 W, and more preferably in the range of about 1 to 5 W, although being different depending on the pulse width thereof.

Moreover, a repetitive frequency of the pulse laser is preferably in the range of about 0.1 to 100 kHz, and more preferably in the range of about 1 to 10 kHz. By setting the frequency of the pulse laser to the above range, a temperature of a portion where the laser beam is irradiated extremely rises and the leaving groups 303 can be reliably broken (removed) from the vicinity of the surface 35 of the bonding film 3.

By appropriately setting various conditions for such a laser beam, the temperature in the portion where the laser beam is irradiated is adjusted so as to be preferably in the range of about normal temperature (room temperature) to 600° C., more preferably in the range of about 200 to 600° C., and still more preferably in the range of about 300 to 400° C. The adjustment of the temperature in the region to the above range makes it possible to reliably remove the leaving groups 303 from the bonding film 3.

The laser beam irradiated on the bonding film 3 is preferably scanned along the surface 35 of the bonding film 3 with a focus thereof set on the surface 35. By doing so, heat generated by the irradiation of the laser beam is locally accumulated in the vicinity of the surface 35. As a result, it is possible to selectively remove the leaving groups 303 existing in the vicinity of the surface 35 of the bonding film 3.

Further, the irradiation of the energy beam on the bonding film 3 may be performed in any atmosphere. Specifically, examples of the atmosphere include: an oxidizing gas atmospheres such as atmosphere (air) or an oxygen gas; a reducing gas atmospheres such as a hydrogen gas; an inert gas atmospheres such as a nitrogen gas or an argon gas; a decompressed (vacuum) atmospheres obtained by decompressing these atmospheres; and the like.

Among these atmospheres, the irradiation is particularly preferably performed in the atmosphere. As a result, it becomes unnecessary to spend labor hour and cost for controlling the atmosphere. This makes it possible to easily perform (carry out) the irradiation of the energy beam.

In this way, according to the method of irradiating the energy beam, the energy can be easily applied to the vicinity of the surface 35 of the bonding film 3 selectively. Therefore, it is possible to prevent, for example, alteration and deterioration of the substrate 2, the intermediate layer 7, and the bonding film 3, i.e., alteration and deterioration of the base member 1 due to the application of the energy.

Further, according to the method of irradiating the energy beam, a degree of the energy to be applied can be accurately and easily controlled. Therefore, it is possible to adjust the number of the leaving groups 303 to be removed from the bonding film 3. By adjusting the number of the leaving groups 303 to be removed from the bonding film 3 in this way, it is possible to easily control bonding strength between the base member 1 and the opposite substrate 4.

In other words, by increasing the number of the leaving groups 303 to be removed, since a large number of active hands 304 are generated in the vicinity of the surface 35 of the bonding film 3, it is possible to further improve a bonding property developed in the bonding film 3.

On the other hand, by reducing the number of the leaving groups 303 to be removed, it is possible to reduce the number of the active hands 304 generated in the vicinity of the surface 35 of the bonding film 3 and suppress a bonding property developed in the bonding film 3.

In order to adjust magnitude of the applied energy, for example, conditions such as the kind of the energy beam, the power of the energy beam, and the irradiation time of the energy beam only have to be controlled. Moreover, according to the method of irradiating the energy beam, since large energy can be applied in a short period of time, it is possible to more efficiently apply energy on the bonding film 3.

As shown in FIGS. 2 and 6, the bonding film 3 before the application of the energy has the leaving groups 303 in the vicinity of the surface 35 thereof. When the energy is applied to such a bonding film 3, the leaving groups 303 (the hydrogen atoms in FIG. 2 and the methyl groups in FIG. 6) are removed from the bonding film 3. At this time, as shown in FIGS. 3 and 7, the active hands 304 are generated on the surface 35 of the bonding film 3. As a result, a bonding property is developed on the surface 35 of the bonding film 3.

Here, in this specification, a state that the bonding film 3 is "activated" means: a state that the leaving groups 303 existing on the surface 35 and in the inside of the bonding film 3 are removed as described above, and atoms constituting the bonding film 3, from which the leaving groups 303 are removed (left), are not terminated so that "dangling bonds (or uncoupled bonds)" are generated; a state that the atoms having the dangling bonds (the unpaired electrons) are terminated by hydroxyl groups (OH groups) so that the hydroxyl groups exist on the surface 35 of the bonding film 3; and a state that the dangling bonds and the hydroxyl groups coexist on the surface 35 of the bonding film 3.

Therefore, as shown in FIGS. 3 and 7, the active hands 304 refer to the dangling bonds and/or the hydroxyl groups bonded to the atoms which have had the dangling bonds. If such active hands 304 exist on the surface 35 of the bonding film 3, it is possible to particularly firmly bond the base member 1 to the opposite substrate 4 through the bonding film 3.

In this regard, the latter state (that is, the state that the atoms which have had the dangling bonds are terminated by the hydroxyl groups) is easily generated, because, for example, when the energy beam is merely irradiated on the bonding film 3 in the atmosphere, water molecules contained therein bond to the atoms which have had the dangling bonds and they are terminated by the hydroxyl groups.

In this embodiment, before the base member 1 and the opposite substrate 4 are laminated together, the energy has been applied to the bonding film 3 of the base member 1 in advance. However, such energy may be applied at a time when the base member 1 and the opposite substrate 4 are laminated together or after the base member 1 and the opposite substrate 4 have been laminated together. Such a case will be described in a second embodiment described below.

Figure 10C:
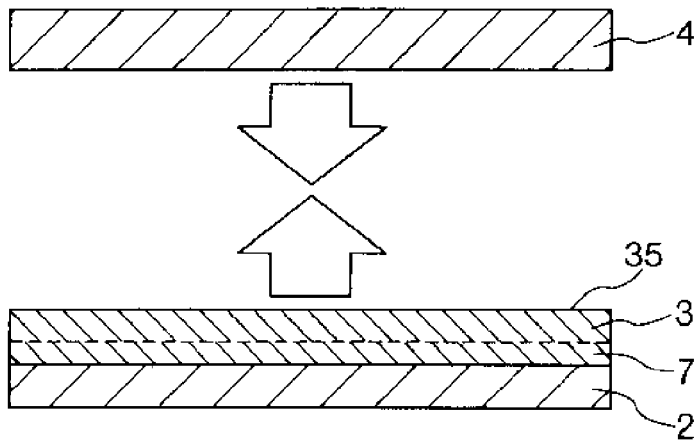

[3] The opposite substrate (the object) 4 is prepared. As shown in FIG. 10C, the base member 1 makes close contact with the opposite substrate 4 through the bonding film 3 thereof. At this time, since the bonding film 3 has developed the bonding property with respect to the opposite substrate 4 in the step [2], the bonding film 3 and the opposite substrate 4 are chemically bonded together. As a result, the base member 1 is bonded to the opposite substrate 4, to thereby obtain a bonded body 5 shown in FIG. 11D.

In the bonded body 5 obtained in this way, the base member 1 and the opposite substrate 4 are bonded together by firm chemical bonds formed in a short period of time such as a covalent bond, unlike bond (adhesion) mainly based on a physical bond such as an anchor effect by using the conventional adhesive. Therefore, it is possible to obtain a bonded body 5 in a short period of time, and to prevent occurrence of peeling, bonding unevenness and the like in the bonded body 5.

Further, according to such a method of manufacturing the bonded body 5 using the base member 1, a heat treatment at a high temperature (e.g., a temperature equal to or higher than 700° C.) is unnecessary unlike the conventional solid bonding method. Therefore, the substrate 2 and the opposite substrate 4 each formed of a material having low heat resistance can also be used for bonding them.

In addition, the substrate 2 and the opposite substrate 4 are bonded together through the bonding film 3 and the intermediate layer 7. Therefore, there is also an advantage that each of the constituent materials of the substrate 2 and the opposite substrate 4 is not limited to a specific kind. For these reasons, according to the present invention, it is possible to expand selections of the constituent materials of the substrate 2 and the opposite substrate 4.

Moreover, in the conventional solid bonding method, the substrate 2 and the opposite substrate 4 are bonded together without intervention of a bonding layer. Therefore, in the case where the substrate 2 and the opposite substrate 4 exhibit a large difference in their thermal expansion coefficients, stress based on the difference tends to concentrate on a bonding interface therebetween. It is likely that peeling of the bonding interface and the like occur.

However, since the bonded body (the bonded body of the present invention) 5 has the intermediate layer 7 and the bonding film 3, the concentration of the stress which would be generated is reduced due to the presence thereof. This makes it possible to accurately suppress or prevent occurrence of peeling in the bonded body 5.

Like the substrate 2, the opposite substrate 4 to be bonded to the base member 1 may be formed of any material. Specifically, the opposite substrate 4 can be formed of the same material as that constituting the substrate 2. Further, a shape of the opposite substrate 4 is not limited to a plate shape shown in FIGS. 10A to 10C, and may be a block shape, a bar shape or the like.

Although the constituent material of the opposite substrate 4 may be different from or the same as that of the substrate 2, it is preferred that the substrate 2 and the opposite substrate 4 have substantially equal thermal expansion coefficients with each other.

In the case where the substrate 2 and the opposite substrate 4 have the substantially equal thermal expansion coefficients with each other, when the base member 1 and the opposite substrate 4 are bonded together, stress due to thermal expansion is less easily generated on a bonding interface therebetween. As a result, it is possible to reliably prevent occurrence of deficiencies such as peeling in the bonded body 5 finally obtained.

Further, in the case where the substrate 2 and the opposite substrate 4 have a difference in their thermal expansion coefficients with each other, it is preferred that conditions for bonding between the base member 1 and the opposite substrate 4 are optimized as follows. This makes it possible to firmly bond the base member 1 and the opposite substrate 4 together with high dimensional accuracy.

In other words, in the case where the substrate 2 and the opposite substrate 4 have the difference in their thermal expansion coefficients with each other, it is preferred that the base member 1 and the opposite substrate 4 are bonded together at as low temperature as possible. If they are bonded together at the low temperature, it is possible to further reduce thermal stress which would be generated on the bonding interface therebetween.

Specifically, the base member 1 and the opposite substrate 4 are bonded together in a state that each of the substrate 2 and the opposite substrate 4 is heated preferably at a temperature of about 25 to 50° C., and more preferably at a temperature of about 25 to 40° C., although being different depending on the difference between the thermal expansion coefficients thereof.

In such a temperature range, even if the difference between the thermal expansion coefficients of the substrate 2 and the opposite substrate 4 is rather large, it is possible to sufficiently reduce thermal stress which would be generated on the bonding interface between the base member 1 (the bonding film 3) and the opposite substrate 4. As a result, it is possible to reliably suppress or prevent occurrence of warp, peeling or the like in the bonded body 5.

Especially, in the case where the difference between the thermal expansion coefficients of the substrate 2 and the opposite substrate 4 is equal to or larger than $5 \times 10^{-5}$/K, it is particularly recommended that the base member 1 and the opposite substrate 4 are bonded together at a low temperature as much as possible as described above. Moreover, it is preferred that the substrate 2 and the opposite substrate 4 have a difference in their rigidities. This makes it possible to more firmly bond the base member 1 and the opposite substrate 4 together.

Before the base member 1 and the opposite substrate 4 are bonded together, it is preferred that a predetermined region of the above mentioned opposite substrate 4 to which the base member 1 is to be bonded has been, in advance, subjected to the same surface treatment as employed in the intermediate layer 7, depending on the constituent material of the opposite substrate 4.

In this case, the surface treatment is a treatment for improving bonding strength between the base member 1 and the opposite substrate 4. By subjecting the region of the opposite substrate 4 to the surface treatment, it is possible to further improve the bonding strength between the base member 1 and the opposite substrate 4.

In this regard, it is to be noted that the opposite substrate 4 can be subjected to the same surface treatment as the above mentioned surface treatment to which the intermediate layer 7 is subjected.

Depending on the constituent material of the opposite substrate 4, if the region of the surface of the opposite substrate 4, to which the base member 1 is to be bonded, has the following groups and substances, the bonding strength between the base member 1 and the opposite substrate 4 can become sufficiently high even if the region is not subjected to the surface treatment described above.

Examples of such groups and substances include at least one group or substance selected from the group comprising a hydrogen atom, a functional group such as a hydroxyl group, a thiol group, a carboxyl group, an amino group, a nitro group or an imidazole group, a radical, an open circular molecule, an unsaturated bond such as a double bond or a triple bond, a halogen atom such as a F atom, a Cl atom, a Br atom or an I atom, and peroxide.

In the case where the surface of the opposite substrate 4 has such groups or substances, it is possible to further improve the bonding strength between the bonding film 3 of the base member 1 and the opposite substrate 4.

By appropriately performing one selected from various surface treatment described above, the surface having such groups and substances can be obtained. This makes it possible to obtain an opposite substrate 4 that can be particularly firmly bonded to the base member 1.

Instead of the surface treatment, a surface layer having a function of improving bonding strength between the opposite substrate 4 and the base member 1 (the bonding film 3) may have been, in advance, provided on the region of the surface of the opposite substrate 4 to which the base member 1 is to be bonded.

In this case, the base member 1 and the opposite substrate 4 are bonded together through such a surface layer of the opposite substrate 4, which makes it possible to obtain a bonded body 5 having higher bonding strength between the base member 1 and the opposite substrate 4. As a constituent material of such a surface layer, the same material as the constituent material of the above intermediate layer 7 can be used.

Here, description will be made on a mechanism that the base member 1 and the opposite substrate 4 are bonded together in this process. Hereinafter, description will be representatively offered regarding a case that the hydroxyl groups are exposed in the region of the surface of the opposite substrate 4 to which the base member 1 is to be bonded.

In this process, when the base member 1 and the opposite substrate 4 are laminated together so that the bonding film 3 makes contact with the opposite substrate 4, the hydroxyl groups existing on the surface 35 of the bonding film 3 and the hydroxyl groups existing in the region of the surface of the opposite substrate 4 are attracted together, as a result of which hydrogen bonds are generated between the above adjacent hydroxyl groups. It is conceived that the generation of the hydrogen bonds makes it possible to bond the base member 1 and the opposite substrate 4 together.

Depending on conditions such as a temperature and the like, the hydroxyl groups bonded together through the hydrogen bonds are dehydrated and condensed, so that the hydroxyl groups and/or water molecules are removed from the bonding surface (the contact surface) between the base member 1 and the opposite substrate 4. As a result, two atoms, to which the hydroxyl groups had been bonded, are bonded together directly or via an oxygen atom. In this way, it is conceived that the base member 1 and the opposite substrate 4 are firmly bonded together.

In this regard, an activated state that the surface 35 of the bonding film 3 is activated in the step [2] is reduced with time. Therefore, it is preferred that this step [3] is started as early as possible after the step [2]. Specifically, this step [3] is preferably started within 60 minutes, and more preferably started within 5 minutes after the step [2].

If the step [3] is started within such a time, since the surface 35 of the bonding film 3 maintains a sufficient activated state, when the base member 1 is bonded to the opposite substrate 4 through the bonding film 3 thereof, they can be bonded together with sufficient high bonding strength therebetween.

In other words, the bonding film 3 before being activated is a film having relatively high chemical stability and excellent weather resistance in a state that it contains the leaving groups 303. For this reason, the bonding film 3 before being activated can be stably stored for a long period of time. Therefore, a base member 1 having such a bonding film 3 may be used as follows.

Namely, first, a large number of the base members 1 have been manufactured or purchased, and stored in advance. Then just before the base member 1 makes close contact with the opposite substrate 4 in this step, the energy is applied to only a necessary number of the base members 1 as described in the step [2]. This use is preferable because the bonded bodies 5 are manufactured effectively.

In the manner described above, it is possible to obtain a bonded body (the bonded body of the present invention) 5 shown in FIG. 11D.

In FIG. 11D, the opposite substrate 4 is bonded (attached) to the base member 1 so as to cover the entire surface of the bonding film 3 thereof. However, a relative position of the base member 1 with respect to the opposite substrate 4 may be shifted. In other words, the opposite substrate 4 may be bonded to the base member 1 so as to extend beyond the bonding film 3 thereof.

In the bonded body 5 obtained in this way, bonding strength between the substrate 2 (the base member 1) and the opposite substrate 4 is preferably equal to or larger than 5 MPa (50 kgf/cm$^2$), and more preferably equal to or larger than 10 MPa (100 kgf/cm$^2$). Therefore, peeling of the bonded body 5 having such bonding strength therebetween can be sufficiently prevented.

As described later, in the case where a surface acoustic wave device is formed using the bonded body 5, it is possible to obtain a surface acoustic wave device having excellent durability. Further, use of the base member 1 of the present invention makes it possible to efficiently manufacture the bonded body 5 in which the substrate 2 (the base member 1) and the opposite substrate 4 are bonded together by the above large bonding strength therebetween.

In the conventional solid bonding method such as a bonding method of directly bonding silicon substrates, even if surfaces of the silicon substrates to be bonded together are activated, an activated state of each surface can be maintained only for an extremely short period of time (e.g., about several to several tens seconds) in the atmosphere. Therefore, there is a problem in that, after each surface is activated, for example, a time for bonding the two silicon substrates together cannot be sufficiently secured.

On the other hand, according to the present invention, the activated state of the bonding film 3 can be maintained over a relatively long period of time. Therefore, a time for bonding the base member 1 and the opposite substrate 4 can be sufficiently secured, which makes it possible to improve efficiency of bonding them together.

In this regard, it is conceived that the activated state of the bonding film 3 can be maintained over a relatively long period of time, on the grounds that a state generated by removing the leaving groups 303 composed of the organic component from the bonding film 3 is stable.

Just when the bonded body 5 is obtained or after the bonded body 5 has been obtained, if necessary, at least one step (a step of improving bonding strength between the base member 1 and the opposite substrate 4) among three steps (steps [4A], [4B] and [4C]) described below may be applied to the bonded body 5 (a laminated body in which the base member 1 and the opposite substrate 4 are laminated together). This makes it possible to further improve the bonding strength between the base member 1 and the opposite substrate 4.

[4A] In this step, as shown in FIG. 11E, the obtained bonded body 5 is pressed in a direction in which the substrate 2 and the opposite substrate 4 come close to each other.

As a result, surfaces of the bonding film 3 come closer to the surface of the substrate 2 and the surface of the opposite substrate 4. It is possible to further improve the bonding strength between the members (e.g., between the substrate 2 and the intermediate layer 7, between the intermediate layer 7 and the bonding film 3, between the bonding film 3 and the opposite substrate 4) in the bonded body 5.

Further, by pressing the bonded body 5, spaces remaining in the boding interfaces (the contact interfaces) in the bonded body 5 can be crashed to further increase a bonding area (a contact area) thereof. This makes it possible to further improve the bonding strength between the members in the bonded body 5.

Moreover, even when the base member 1 is bonded to the opposite substrate 4 having the undulations or irregularities on the surface thereof, stress can be reliably applied to the intermediate layer 7 by pressing the bonded body 5.

As a result, since the thickness of the intermediate layer 7 changes according (following) to the undulations or irregularities of the surface of the opposite substrate 4, it is possible to more reliably bond the base member 1 to the opposite substrate 4.

At this time, it is preferred that a pressure in pressing the bonded body 5 is as high as possible within a range in which the bonded body 5 is not damaged. This makes it possible to improve the bonding strength between the members in the bonded body 5 relative to a degree of this pressure.

In this regard, it is to be noted that this pressure can be appropriately adjusted, depending on the constituent materials and thicknesses of the substrate 2, intermediate layer 7 and opposite substrate 4, conditions of a bonding apparatus, and the like.

Specifically, the pressure is preferably in the range of about 0.2 to 10 MPa, and more preferably in the range of about 1 to 5 MPa, although being slightly different depending on the constituent materials and thicknesses of the substrate 2, intermediate layer 7 and opposite substrate 4, and the like.

By setting the pressure to the above range, it is possible to reliably improve the bonding strength between the members in the bonded body 5. Further, although the pressure may exceed the above upper limit value, there is a fear that damages and the like occur in the substrate 2, the intermediate layer 7 and the opposite substrate 4, depending on the constituent materials thereof.

A time for pressing the bonded body 5 is not particularly limited to a specific value, but is preferably in the range of about 10 seconds to 30 minutes. The pressing time can be appropriately changed, depending on the pressure for pressing the bonded body 5. Specifically, in the case where the pressure in pressing the bonded body 5 is higher, it is possible to improve the bonding strength between the members in the bonded body 5 even if the pressing time becomes short.

[4B] In this step, as shown in FIG. 11E, the obtained bonded body 5 is heated.

This makes it possible to further improve the bonding strength between the members in the bonded body 5. A temperature in heating the bonded body 5 is not particularly limited to a specific value, as long as the temperature is higher than room temperature and lower than a heat resistant temperature of the bonded body 5.

Specifically, the temperature is preferably in the range of about 25 to 100° C., and more preferably in the range of about 50 to 100° C. If the bonded body 5 is heated at the temperature of the above range, it is possible to reliably improve the bonding strength between the members in the bonded body 5 while reliably preventing them from being thermally altered and deteriorated.

Further, a heating time is not particularly limited to a specific value, but is preferably in the range of about 1 to 30 minutes.

In the case where both steps [4A] and [4B] are performed, the steps are preferably performed simultaneously. In other words, as shown in FIG. 11E, the bonded body 5 is preferably heated while being pressed. By doing so, an effect by pressing and an effect by heating are exhibited synergistically. It is possible to particularly improve the bonding strength between the members in the bonded body 5.

[4C] In this step, as shown in FIG. 11F, an ultraviolet ray is irradiated on the obtained bonded body 5.

This makes it possible to increase the number of chemical bonds formed between the members in the bonded body 5 (e.g., between the substrate 2 and the intermediate layer 7, between the intermediate layer 7 and the bonding film 3, between the bonding film 3 and the opposite substrate 4). As a result, it is possible to improve the bonding strength between the members in the bonded body 5.

Conditions of the ultraviolet ray irradiated at this time can be the same as those of the ultraviolet ray irradiated in the step [2] described above.

Further, in the case where this step [4C] is performed, one of the substrate 2 and the opposite substrate 4 needs to have translucency. It is possible to reliably irradiate the ultraviolet ray on the bonding film 3 by irradiating it from the side of the substrate having translucency.

Through the steps described above, it is possible to easily improve the bonding strength between the members in the bonded body 5 (especially, between the bonding film 3 and the opposite substrate 4), and, eventually, to further improve the bonding strength between the base member 1 and the opposite substrate 4.

Second Embodiment

Next, description will be made on a second embodiment of each of the base member of the present invention, a bonding method of bonding the base member and an object together, that is, the bonding method of the present invention, and the bonded body of the present invention including the above base member.

FIGS. 12A to 12D are longitudinal sectional views for explaining a second embodiment of the bonding method of bonding the base member according to the present invention to an object.

In this regard, it is to be noted that in the following description, an upper side in each of FIGS. 12A to 12D will be referred to as "upper" and a lower side thereof will be referred to as "lower".

Hereinafter, the bonding method according to the second embodiment will be described by placing emphasis on the points differing from the first embodiment, with the same matters omitted from description.

The bonding method according to this embodiment is the same as that of the first embodiment, except that after the base member 1 and the opposite substrate 4 are laminated together (make contact with each other), the base member 1 is bonded to the opposite substrate 4 by applying the energy to the bonding film 3.

In other words, the bonding method according to this embodiment includes a step of preparing the base member 1 of the present invention and the opposite substrate (the object) 4, a step of making the prepared opposite substrate 4 and the base member 1 close contact with each other through the bonding film 3 to obtain a laminated body in which they are laminated together, and a step of applying the energy to the bonding film 3 in the laminated body so that it is activated and the base member 1 and the opposite substrate 4 are bonded together, to thereby obtain a bonded body 5.

Hereinafter, the respective steps of the bonding method according to this embodiment will be described one after another.

Figure 12A:
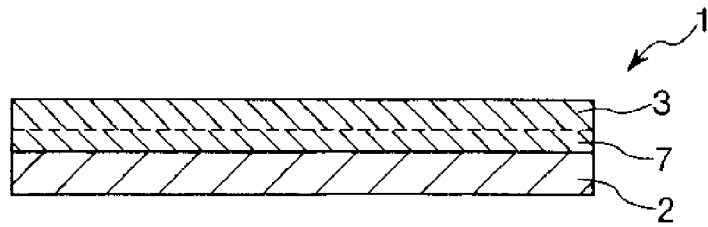
FIGS. 12A to 12D are longitudinal sectional views for explaining a second embodiment of the bonding method of bonding the base member according to the present invention to an object.

[1] First, the base member 1 is prepared in the same manner as in the first embodiment (see FIG. 12A).

Figure 12B:
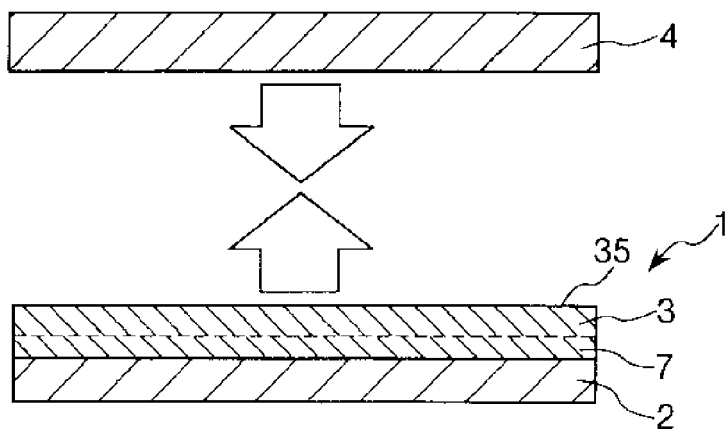

[2] Next, as shown in FIG. 12B, the opposite substrate 4 is prepared. Thereafter, the base member 1 and the opposite substrate 4 are laminated together so that the surface 35 of the bonding film 3 thereof and the opposite substrate 4 make close contact with each other, to obtain the laminated body.

In the state of the laminated body, the base member 1 and the opposite substrate 4 are not bonded together. Therefore, it is possible to adjust a relative position of the base member 1 with respect to the opposite substrate 4.

This makes it possible to finely adjust the relative position of the base member 1 with relative to the opposite substrate 4 easily after they have been laminated (overlapped) together. As a result, it becomes possible to increase positional accuracy of the base member 1 with relative to the opposite substrate 4 in a direction of the surface 35 of the bonding film 3.

Figure 12C:
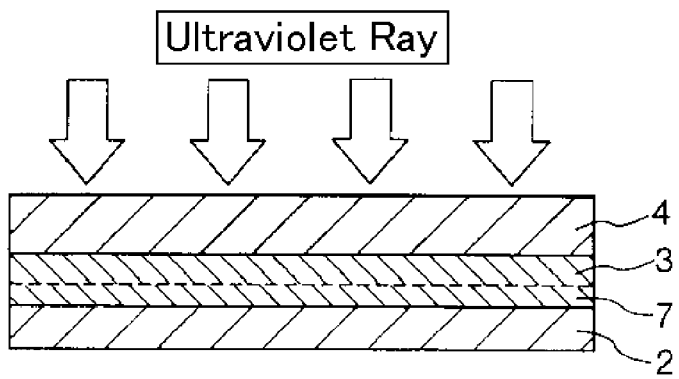

[3] Then, as shown in FIG. 12C, the energy is applied to the bonding film 3 in the laminated body. When the energy is applied on the surface 35 of the bonding film 3 which makes contact with the opposite substrate 4, a bonding property with respect to the opposite substrate 4 is developed on the surface 35.

Figure 12D:
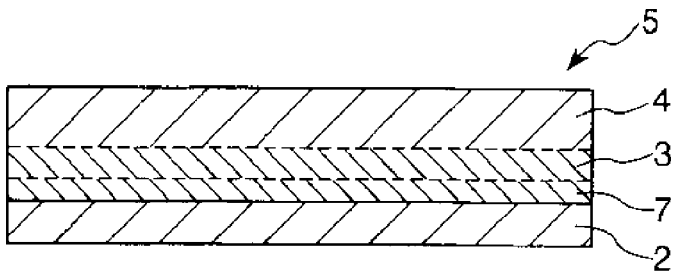

As a result, the base member 1 and the opposite substrate 4 are bonded together due to the bonding property developed on the surface 35, to thereby obtain a bonded body 5 as shown in FIG. 12D. In this regard, it is to be noted that the energy may be applied to the bonding film 3 by any method including, e.g., the methods described in the first embodiment.

In this embodiment, it is preferred that at least one method selected from the group comprising a method in which an energy beam is irradiated on the bonding film 3, a method in which the bonding film 3 is heated, and a method in which a compressive force (physical energy) is applied to the bonding film 3 is used as the method of applying the energy to the bonding film 3.

The reason why these methods are preferred as the energy application method is that they are capable of relatively easily and efficiently applying the energy to the bonding film 3. Among these methods, the same method as employed in the first embodiment can be used as the method in which the energy beam is irradiated on the bonding film 3.

In this case, the energy beam is transmitted through the substrate 2 and the intermediate layer 7 and is irradiated on the bonding film 3, or the energy beam is transmitted through the opposite substrate 4 and is irradiated on the bonding film 3. For this reason, between the substrate 2 and the opposite substrate 4, the substrate on which the energy beam is irradiated has transparency. In addition, in the case where the energy beam is irradiated from the side of the substrate 2, the intermediate layer 7 also has transparency.

On the other hand, in the case where the energy is applied to the bonding film 3 by heating the bonding film 3, a heating temperature is preferably in the range of about 25 to 100° C., and more preferably in the range of about 50 to 100° C. If the bonding film 3 is heated at a temperature of the above range, it is possible to reliably activate the bonding film 3 while reliably preventing the substrate 2, the intermediate layer 7 and the opposite substrate 4 from being thermally altered or deteriorated.

Further, a heating time is set great enough to remove the leaving groups 303 included in the bonding film 3. Specifically, the heating temperature may be preferably in the range of about 1 to 30 minutes if the heating temperature is set to the above mentioned range. Furthermore, the bonding film 3 may be heated by any method. Examples of the heating method include various kinds of methods such as a method using a heater, a method of irradiating an infrared ray and a method of making contact with a flame.

In the case of using the method of irradiating the infrared ray, it is preferred that the substrate 2 or the opposite substrate 4 is made of a light-absorbing material. This ensures that the substrate 2 or the opposite substrate 4 can generate heat efficiently when the infrared ray is irradiated thereon. As a result, it is possible to efficiently heat the bonding film 3.

Further, in the case of using the method using the heater or the method of making contact with the flame, it is preferred that, between the substrate 2 and the opposite substrate 4, the substrate with which the heater or the flame makes contact is made of a material that exhibits superior thermal conductivity. This makes it possible to efficiently transfer the heat to the bonding film 3 through the substrate 2 or the opposite substrate 4, thereby efficiently heating the bonding film 3.

Furthermore, in the case where the energy is applied to the bonding film 3 by imparting the compressive force to the bonding film 3, it is preferred that the base member 1 and the opposite substrate 4 are compressed against each other. Specifically, a pressure in compressing them is preferably in the range of about 0.2 to 10 MPa, and more preferably in the range of about 1 to 5 MPa.

This makes it possible to easily apply appropriate energy to the bonding film 3 by merely performing a compressing operation, which ensures that a sufficiently high bonding property with respect to the opposite substrate 4 is developed in the bonding film 3. Although the pressure may exceed the above upper limit value, it is likely that damages and the like occur in the substrate 2, the intermediate layer 7 and the opposite substrate 4, depending on the constituent materials thereof.

Further, a compressing time is not particularly limited to a specific value, but is preferably in the range of about 10 seconds to 30 minutes. In this regard, it is to be noted that the compressing time can be suitably changed, depending on magnitude of the compressive force. Specifically, the compressing time can be shortened as the compressive force becomes greater.

In the manner described above, it is possible to obtain a bonded body 5 in which the base member 1 is bonded to the opposite substrate 4 through the bonding film 3 thereof.

Third Embodiment

Next, description will be made on a third embodiment of each of the base member of the present invention, a bonding method of bonding the base member and an object together, that is, the bonding method of the present invention, and the bonded body of the present invention including the above base member.

FIGS. 13A to 13D, 14E and 14F are longitudinal sectional views for explaining a third embodiment of the bonding method of bonding the base member according to the present invention to an object.

In this regard, it is to be noted that in the following description, an upper side in each of FIGS. 13A to 13D, 14E and 14F will be referred to as "upper" and a lower side thereof will be referred to as "lower".

Hereinafter, the bonding method according to the third embodiment will be described by placing emphasis on the points differing from the first and second embodiments, with the same matters omitted from description.

The bonding method according to this embodiment is the same as that of the first embodiment, except that two base members 1 (that is, a first base member 1 and a second base member 1) are bonded together.

In other words, the bonding method according to this embodiment includes a step of preparing two base members 1 each having a bonding film 31 or a bonding film 32, a step of applying the energy to the bonding films 31 and 32 of the base members 1 so that they are activated, and a step of making the two base members 1 close contact with each other through the bonding films 31 and 32 so that they are bonded together, to thereby obtain a bonded body 5a.

Hereinafter, the respective steps of the bonding method according to this embodiment will be described one after another.

Figure 13A:
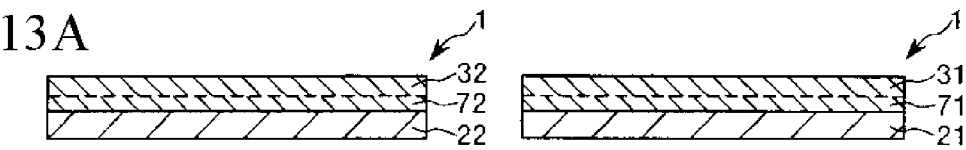
FIGS. 13A to 13D, 14E and 14F are longitudinal sectional views for explaining a third embodiment of the bonding method of bonding the base member according to the present invention to an object.

[1] First, two base members 1 are prepared in the same manner as in the first embodiment (see FIG. 13A).

In this embodiment, as shown in FIG. 13A, as the two base members 1, used are a base member (a first base member) 1 having a substrate 21, and an intermediate layer 71 and a bonding film 31 provided on the substrate 21 in this order, and a base member (a second base member) 1 having a substrate 22, and an intermediate layer 72 and a bonding film 32 provided on the substrate 22 in this order.

Figure 13B:
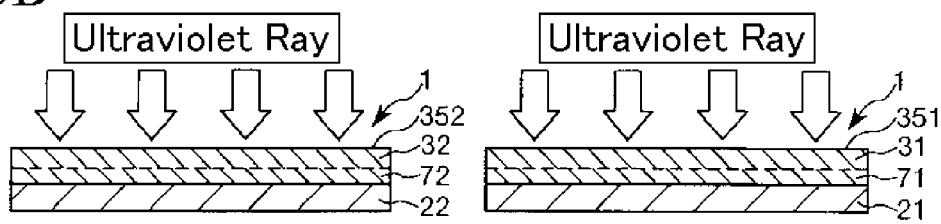

[2] Next, as shown in FIG. 13B, the energy is applied to the bonding films 31 and 32 of the two base members 1.

When the energy is applied to the bonding films 31 and 32, respectively, at least a part of the leaving groups 303 illustrated in FIGS. 2 and 6 are removed therefrom. After the leaving groups 303 have been removed, the active hands 304 are generated in the vicinity of the surfaces 35 of the bonding films 31 and 32 as shown in FIGS. 3 and 7.

In this state, the bonding films 31 and 32 are activated, that is, a bonding property is developed in the bonding films 31 and 32. The two base members 1 each having the above state are rendered bondable to each other. In this regard, it is to be noted that the same method as employed in the first embodiment can be used as the energy application method.

Here, a state that the bonding films 31 and 32 are "activated" means: a state that the leaving groups 303 existing on surfaces 351 and 352 and in the inside of the bonding films 31 and 32 are removed as described above in connection with the first embodiment, and at least one of the metal and oxygen atoms, from which the leaving groups 303 are removed (left), are not terminated so that "dangling bonds (or uncoupled bonds)" are generated; a state that the atoms having the dangling bonds (the unpaired electrons) are terminated by hydroxyl groups (OH groups) so that the hydroxyl groups exist on the surfaces 351 and 352 of the bonding films 31 and 32; and a state that the dangling bonds and the hydroxyl groups coexist on the surfaces 351 and 352 of the bonding films 31 and 32.

Therefore, in this specification, as shown in FIGS. 3 and 7, the active hands 304 refer to the dangling bonds and/or the hydroxyl groups bonded to the atoms which have had the dangling bonds.

Figure 13C:
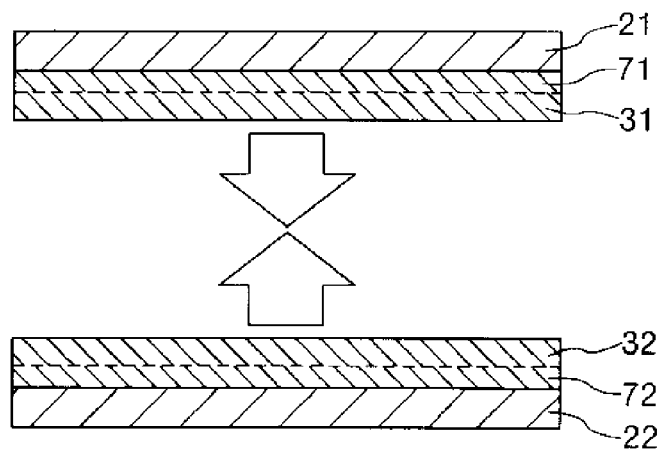

[3] Then, as shown in FIG. 13C, the two base members 1 are laminated together so that the bonding films 31 and 32 each having the bonding property thus developed make close contact with each other, to thereby obtain a bonded body 5a. In this step, the two base members 1 are bonded together. It is conceived that this bonding results from one or both of the following mechanisms (i) and (ii).

Hereinafter, description will be representatively offered regarding a case that hydroxyl groups are exposed on the surfaces 351 and 352 of the bonding films 31 and 32.

(i) When the two base members 1 are laminated together so that the bonding films 31 and 32 make close contact with each other, the hydroxyl groups existing on the surfaces 351 and 352 of the bonding films 31 and 32 thereof are attracted together, as a result of which hydrogen bonds are generated between the above adjacent hydroxyl groups. It is conceived that the generation of the hydrogen bonds makes it possible to bond the two base members 1 together.

Depending on conditions such as a temperature and the like, the hydroxyl groups bonded together through the hydrogen bonds are dehydrated and condensed, so that the hydroxyl groups and/or water molecules are removed from the bonding surface (the contact surface) between the two base members 1. As a result, two atoms, to which the hydroxyl groups had been bonded, are bonded together directly or via an oxygen atom. In this way, it is conceived that the base members 1 are firmly bonded together.

(ii) When the two base members 1 are laminated together, the dangling bonds (the uncoupled bonds) generated in the vicinity of the surfaces 351 and 352 of the bonding films 31 and 32 are bonded together. This bonding occurs in a complicated fashion so that the dangling bonds are inter-linked.

As a result, network-like bonds are formed in the bonding interface between the base members 1. This ensures that either the metal or oxygen atoms constituting the bonding films 31 and 32 are directly bonded together, as a result of which the respective bonding films 31 and 32 are united (bonded) together.

Figure 13D:
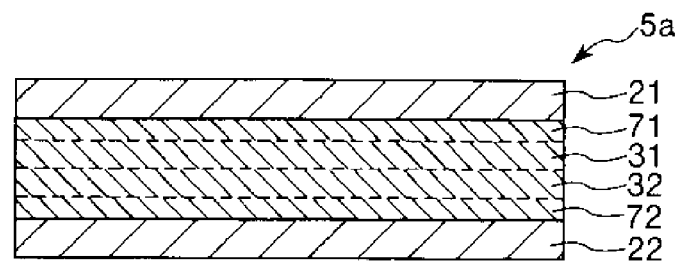

By the above mechanism (i) and/or mechanism (ii), it is possible to obtain the bonded body 5a as shown in FIG. 13D.

If necessary, the bonded body 5a thus obtained may be subjected to at least one of the steps [4A], [4B] and [4C] in the first embodiment.

Figure 14E:
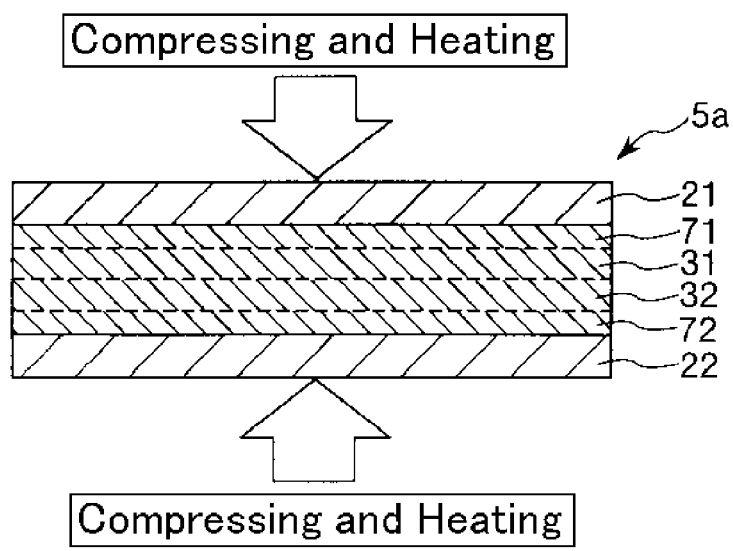
Figure 14F:
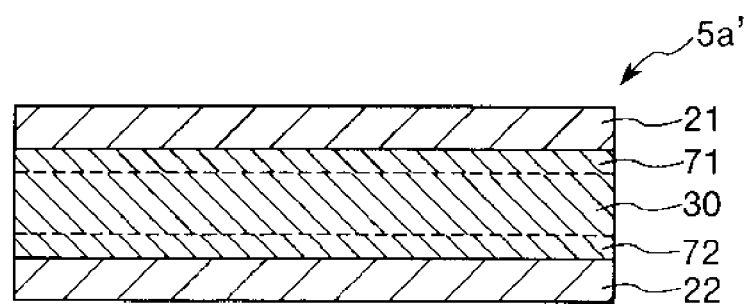

For example, if the bonded body 5a is heated while compressing the same as shown in FIG. 14E, the substrates 21 and 22 in the bonded body 5a come closer to each other. This accelerates dehydration and condensation of the hydroxyl groups and/or bonding of the dangling bonds in the interface between the bonding films 31 and 32. Thus, unification (bonding) of the bonding films 31 and 32 is further progressed. As a result, as shown in FIG. 14F, it is possible to obtain a bonded body 5a' having a substantially completely united bonding film.

Fourth Embodiment

Next, description will be made on a fourth embodiment of each of the base member of the present invention, a bonding method of bonding the base member and an object together, that is, the bonding method of the present invention, and the bonded body of the present invention including the above base member.

FIGS. 15A to 15D are longitudinal sectional views for explaining a fourth embodiment of the bonding method of bonding the base member according to the present invention to an object.

In this regard, it is to be noted that in the following description, an upper side in each of FIGS. 15A to 15D will be referred to as "upper" and a lower side thereof will be referred to as "lower".

Hereinafter, the bonding method according to the fourth embodiment will be described by placing emphasis on the points differing from the first to third embodiments, with the same matters omitted from description.

The bonding method according to this embodiment is the same as that of the first embodiment, except that only a predetermined region 350 of the bonding film 3 is selectively activated, and the base member 1 and the opposite substrate 4 are partially bonded together in the predetermined region 350.

In other words, the bonding method according to this embodiment includes a step of preparing the base member 1 of the present invention and the opposite substrate (the object) 4, a step of applying the energy to the predetermined region 350 of the bonding film 3 of the base member 1 so that it is selectively activated, and a step of making the prepared opposite substrate 4 and the base member 1 contact with each other through the bonding film 3 so that they are partially bonded together in the predetermined region 350, to thereby obtain a bonded body 5b.

Hereinafter, the respective steps of the bonding method according to this embodiment will be described one after another.

Figure 15A:
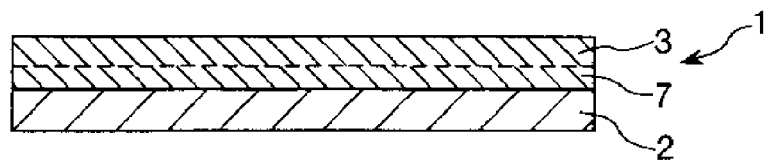
FIGS. 15A to 15D are longitudinal sectional views for explaining a fourth embodiment of the bonding method of bonding the base member according to the present invention to an object.

[1] First, the base member 1 (the base member of the present invention) is prepared (see FIG. 15A).

Figure 15B:
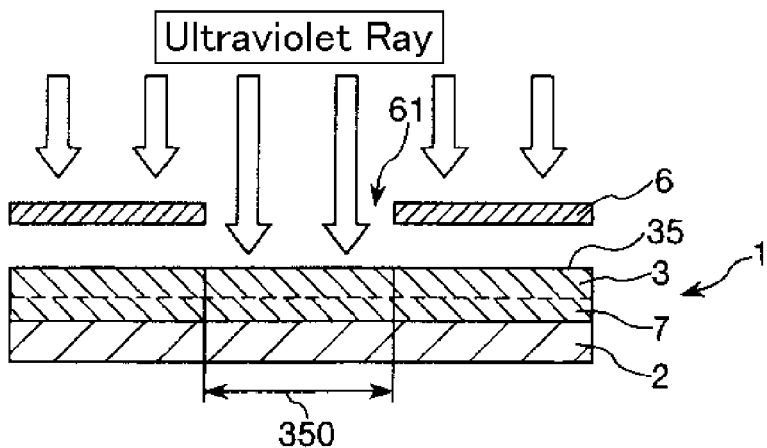

[2] Next, as shown in FIG. 15B, the energy is selectively applied to the predetermined region 350 of the surface 35 of the bonding film 3 of the base member 1.

When the energy is applied to the predetermined region 350 of the bonding film 3, at least a part of the leaving groups 303 shown in FIGS. 2 and 6 are removed therefrom. After the leaving groups 303 have been removed, the active hands 304 are generated in the vicinity of the surface 35 of the bonding film 3 in the predetermined region 350 as shown in FIGS. 3 and 7.

In this state, the bonding film 3 is activated, that is, a bonding property with respect to the opposite substrate 4 is developed in the predetermined region 350 of the bonding film 3. In contrast, little or no bonding property is developed in a region of the bonding film 3 other than the predetermined region 350.

The base member 1 having the above state is rendered partially bondable to the opposite substrate 4 in the predetermined region 350. In this regard, it is to be noted that the energy may be applied to the bonding film 3 by any method including, e.g., the methods described in the first embodiment.

In this embodiment, it is particularly preferred that a method of irradiating an energy beam on the bonding film 3 is used as the energy application method. The reason why this method is preferred as the energy application method is that it is capable of relatively easily and efficiently applying the energy to the bonding film 3.

Further, in this embodiment, it is preferred that energy beams having high directionality such as a laser beam and an electron beam are used as the energy beam. Use of these energy beams makes it possible to selectively and easily irradiate the energy beam on a predetermined region 350 by irradiating it in a target direction.

Even in the case where an energy beam with low directionality is used, it is possible to selectively irradiate the energy beam on the predetermined region 350 of the surface 35 of the bonding film 3, if radiation thereof is performed by covering (shielding) a region other than the predetermined region 350 to which the energy beam is to be irradiated.

Specifically, as shown in FIG. 15B, a mask 6 having a window portion 61 whose shape corresponds to a shape of the predetermined region 350 may be provided above the surface 35 of the bonding film 3. Then, the energy beam may be irradiated through the mask 6. By doing so, it is easy to selectively irradiate the energy beam on the predetermined region 350.

Figure 15C:
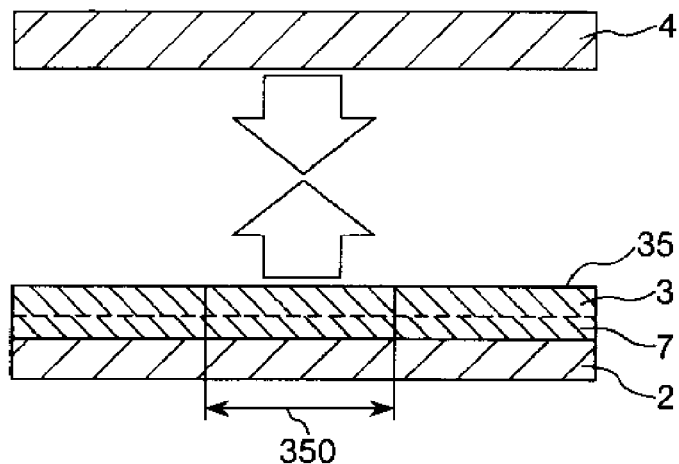

[3] Next, the opposite substrate (the object) 4 is prepared as shown in FIG. 15C. Then, the base member 1 and the opposite substrate 4 are laminated together so that the bonding film 3 having the selectively activated predetermined region 350 makes close contact with the opposite substrate 4. This makes it possible to obtain a bonded body 5b shown in FIG. 15D.

In the bonded body 5b thus obtained, the base member 1 and the opposite substrate 4 are not bonded together in the entire of an interface therebetween, but partially bonded together only in a partial region (the predetermined region 350). During this bonding operation, it is possible to readily select a bonded region by merely controlling an energy application region of the bonding film 3.

This makes it possible to control, e.g., an area of the activated region (the predetermined region 350 in this embodiment) of the bonding film 3 of the base member 1, which in turn makes it possible to easily adjust the bonding strength between the base member 1 and the opposite substrate 4. As a result, there is provided a bonded body 5b that allows a bonded portion to be separated easily.

Figure 15D:
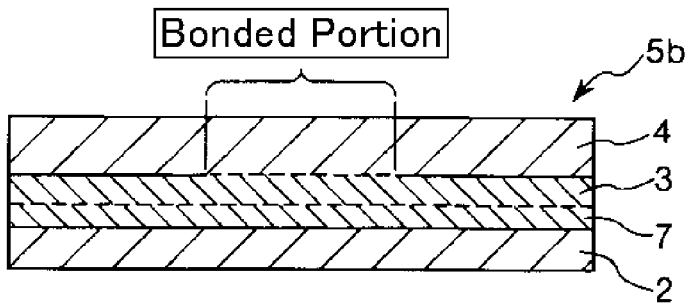

Further, it is also possible to reduce local concentration of stress which would be generated in the bonded portion by suitably controlling an area and shape of the bonded portion (the predetermined region 350) of the base member 1 and the opposite substrate 4 shown in FIG. 15D.

This makes it possible to reliably bond the base member 1 and the opposite substrate 4 together, e.g., even in the case where the substrate 2 and the opposite substrate 4 exhibit a large difference in their thermal expansion coefficients.

In addition, in the bonded body 5b, a tiny gap is generated (or remains) between the base member 1 and the opposite substrate 4 in the region other than the predetermined bonding region 350. This means that it is possible to easily form closed spaces, flow paths or the like between the base member 1 and the opposite substrate 4 by suitably changing the shape of the predetermined region 350.

As described above, it is possible to adjust the bonding strength between the base member 1 and the opposite substrate 4 and separating strength (splitting strength) therebetween by controlling the area of the bonded portion (the predetermined region 350) between the base member 1 and the opposite substrate 4.

From this standpoint, it is preferred that, in the case of producing an easy-to-separate bonded body 5b, the bonding strength between the base member 1 and the opposite substrate 4 is set enough for the human hands to separate the bonded body 5b. By doing so, it becomes possible to easily separate the bonded body 5b without having to use any device or tool.

In the manner described above, it is possible to obtain the bonded body 5b.

If necessary, the bonded body 5b thus obtained may be subjected to at least one of the steps [4A], [4B] and [4C] in the first embodiment.

At this time, the tiny gap is generated (or remains) in the region (a non-bonding region), other than the predetermined region 350, of the interface between the bonding film 3 and the opposite substrate 4 in the bonded body 5b. Therefore, it is preferred that the compressing and heating of the bonded body 5b is performed under the conditions in that the bonding film 3 and the opposite substrate 4 are not bonded together in the region other than the predetermined region 350.

Taking the above situations into account, it is preferred that the predetermined region 350 is preferentially subjected to at least one of the steps [4A], [4B] and [4C] in the first embodiment, when such a need arises. This makes it possible to prevent the bonding film 3 and the opposite substrate 4 from being bonded together in the region other than the predetermined region 350.

Fifth Embodiment

Next, description will be made on a fifth embodiment of each of the base member of the present invention, a bonding method of bonding the base member and an object together, that is, the bonding method of the present invention, and the bonded body of the present invention including the above base member.

FIGS. 16A to 16D are longitudinal sectional views for explaining a fifth embodiment of the bonding method of bonding the base member according to the present invention to an object.

In this regard, it is to be noted that in the following description, an upper side in each of FIGS. 16A to 16D will be referred to as "upper" and a lower side thereof will be referred to as "lower".

Hereinafter, the bonding method according to the fifth embodiment will be described by placing emphasis on the points differing from the first to fourth embodiments, with the same matters omitted from description.

The bonding method according to this embodiment is the same as that of the first embodiment, except that a base member 1 is obtained by selectively forming an intermediate layer 7a and a bonding film 3a only in a predetermined region 350 of an upper surface 25 of the substrate 2 in this order, and the base member 1 and the opposite substrate 4 are partially bonded together in the predetermined region 350.

In other words, the bonding method according to this embodiment includes a step of preparing the base member 1 having the intermediate layer 7a and the bonding film 3a and the opposite substrate (the object) 4, a step of applying the energy to the bonding film 3a of the base member 1 so that it is activated, and a step of making the prepared opposite substrate 4 and the base member 1 contact with each other through the bonding film 3a so that they are bonded together through the intermediate layer 7a and the bonding film 3a, to thereby obtain a bonded body 5c.

Hereinafter, the respective steps of the bonding method according to this embodiment will be described one after another.

Figure 16A:
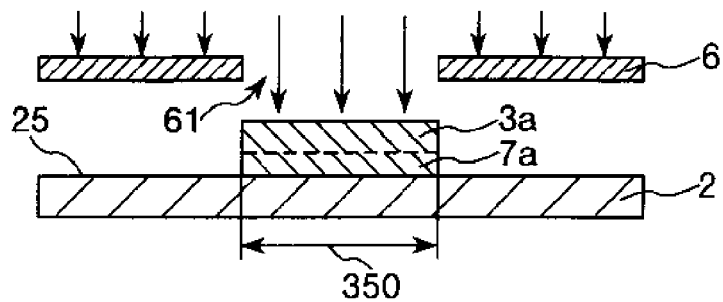
FIGS. 16A to 16D are longitudinal sectional views for explaining a fifth embodiment of the bonding method of bonding the base member according to the present invention to an object.

[1] First, as shown in FIG. 16A, a mask 6 having a window portion 61 whose shape corresponds to a shape of the predetermined region 350 is provided above the substrate 2.

Then, the intermediate layer 7a and the bonding film 3a are formed on the upper surface 25 of the substrate 2 through the mask 6 in this order. Specifically, the intermediate layer 7a is selectively formed on the predetermined region 350 of the substrate 2 through the mask 6, and then the bonding film 3a is formed on the intermediate layer 7a through the mask 6, which makes it possible to form the intermediate layer 7a and the bonding film 3a on the predetermined region 350 of the substrate 2 in this order (see FIG. 16A).

Figure 16B:
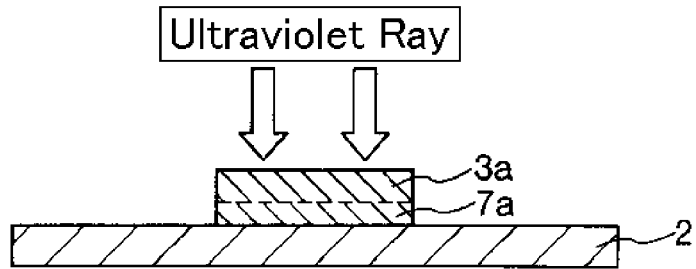

[2] Next, the energy is applied to the bonding film 3a as shown in FIG. 16B. By doing so, a bonding property with respect to the opposite substrate 4 is developed in the bonding film 3a of the base member 1.

During the application of the energy in this step, the energy may be applied selectively to the bonding film 3a or to the entirety of the upper surface 25 of the substrate 2 including the bonding film 3a. Further, the energy may be applied to the bonding film 3a by any method including, e.g., the methods described in the first embodiment.

Figure 16C:
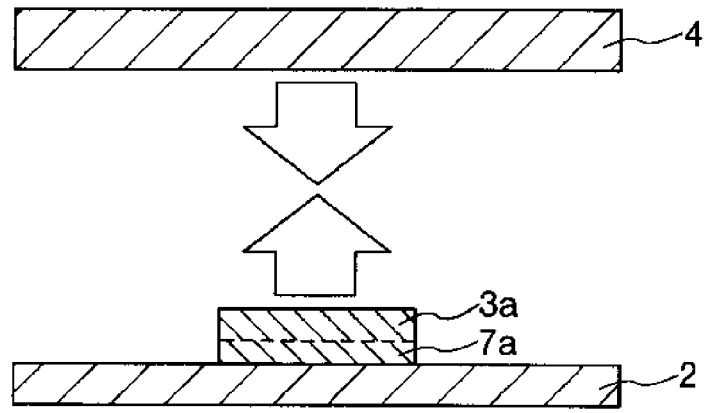

[3] Next, the opposite substrate (the object) 4 is prepared as shown in FIG. 16C. Then, the base member 1 and the opposite substrate 4 are laminated together so that the bonding film 3a and the opposite substrate 4 make close contact with each other. This makes it possible to obtain a bonded body 5c as shown in FIG. 16D.

In the bonded body 5c thus obtained, the substrate 2 and the opposite substrate 4 are not bonded together in the entire of an interface therebetween, but partially bonded together only in a partial region (the predetermined region 350) During the formation of the bonding film 3a, it is possible to easily select a bonded region by merely controlling the film formation region.

This makes it possible to control, e.g., an area of the region (the predetermined region 350) in which the bonding film 3a is formed, which in turn makes it possible to easily adjust the bonding strength between the base member 1 and the opposite substrate 4. As a result, there is provided a bonded body 5c that allows a bonded portion to be separated easily.

Figure 16D:
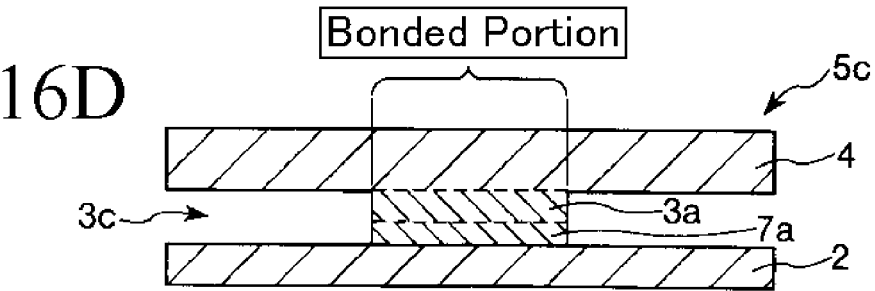

Further, it is possible to reduce local concentration of stress which would be generated in the bonded portion by suitably controlling an area and shape of the bonded portion (the predetermined region 350) of the base member 1 and the opposite substrate 4 shown in FIG. 16D.

This makes it possible to reliably bond the base member 1 and the opposite substrate 4 together, e.g., even in the case where the substrate 2 and the opposite substrate 4 exhibit a large difference in their thermal expansion coefficients.

In addition, between the substrate 2 and the opposite substrate 4 in the bonded body 5c, a gap 3c having a size corresponding to a total thickness of the intermediate layer 7a and the bonding film 3a is formed in the region other than the predetermined region 350 (see FIG. 16D).

This means that it is possible to easily form closed spaces, flow paths or the like each having a desired shape between the substrate 2 and the opposite substrate 4 by suitably changing the shape of the predetermined region 350 and the total thickness of the intermediate layer 7a and the bonding film 3a.

In the manner described above, it is possible to obtain the bonded body 5c.

If necessary, the bonded body 5c thus obtained may be subjected to at least one of the steps [4A], [4B] and [4C] in the first embodiment.

Sixth Embodiment

Next, description will be made on a sixth embodiment of each of the base member of the present invention, a bonding method of bonding the base member and an object together, that is, the bonding method of the present invention, and the bonded body of the present invention including the above base member.

FIGS. 17A to 17D are longitudinal sectional views for explaining a sixth embodiment of the bonding method of bonding the base member according to the present invention to an object.

In this regard, it is to be noted that in the following description, an upper side in each of FIGS. 17A to 17D will be referred to as "upper" and a lower side thereof will be referred to as "lower".

Hereinafter, the bonding method according to the sixth embodiment will be described by placing emphasis on the points differing from the first to fifth embodiments, with the same matters omitted from description.

The bonding method according to this embodiment is the same as that of the first embodiment, except that two base members 1 each having a bonding film 31 or a bonding film 32 are prepared, the bonding film 31 and only a predetermined region 350 of the bonding film 32 thereof are activated, and the two base members 1 are bonded together in the predetermined region 350.

In other words, the bonding method according to this embodiment includes a step of preparing the two base members 1 each having the bonding film 31 or the bonding film 32, a step of applying the energy to different regions (the entire of the surface 351 and the predetermined region 350 of the surface 352) of the bonding films 31 and 32 of the two base members 1 so that the different regions are activated, and a step of making the base members 1 contact with each other through the bonding films 31 and 32 so that they are partially bonded together in the predetermined region 350, to thereby obtain a bonded body 5d.

Hereinafter, the respective steps of the bonding method according to this embodiment will be described one after another.

Figure 17A:
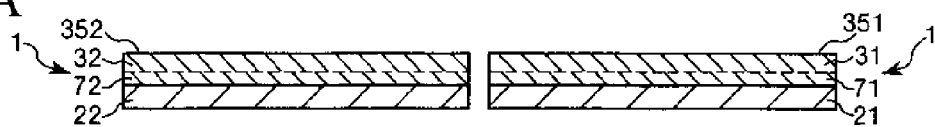
FIGS. 17A to 17D are longitudinal sectional views for explaining a sixth embodiment of the bonding method of bonding the base member according to the present invention to an object.

[1] First, two base members 1 are prepared in the same manner as in the first embodiment (see FIG. 17A).

In this embodiment, as shown in FIG. 17A, as the two base members 1, used are a base member (a first base member) 1 having a substrate 21, and an intermediate layer 71 and a bonding film 31 provided on the substrate 21 in this order, and a base member (a second base member) 1 having a substrate 22, and an intermediate layer 72 and a bonding film 32 provided on the substrate 22 in this order.

Figure 17B:
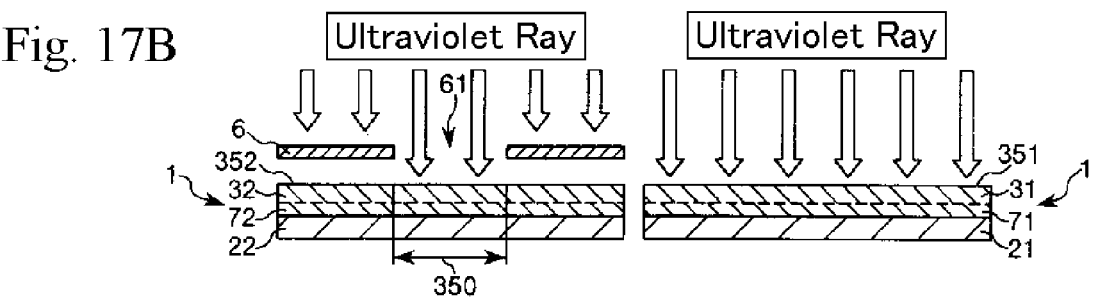

[2] Next, as shown in FIG. 17B, the energy is applied to the entirety of the surface 351 of the bonding film 31 of one of the two base members 1. By doing so, a bonding property is developed over the entirety of the surface 351 of the bonding film 31.

On the other hand, the energy is selectively applied to the predetermined region 350 of the surface 352 of the bonding film 32 of the other base member 1. The same method as employed in the fourth embodiment may be used as the method of selectively applying the energy to the predetermined region 350.

When the energy is applied to the bonding films 31 and 32, respectively, at least a part of the leaving groups 303 are removed therefrom. After the leaving groups 303 have been removed, the active hands 304 are generated in the vicinity of the surfaces 351 and 352 of the bonding films 31 and 32.

In this state, the bonding films 31 and 32 are activated, that is, a bonding property is developed in the entirety of the surface 351 of the bonding film 31 and in the predetermined region 350 of the surface 352 of the bonding film 32, respectively.

In contrast, little or no bonding property is developed in a region of the bonding film 32 other than the predetermined region 350. The two base members 1 each having the above state are rendered partially bondable to each other in the predetermined region 350.

Figure 17C:
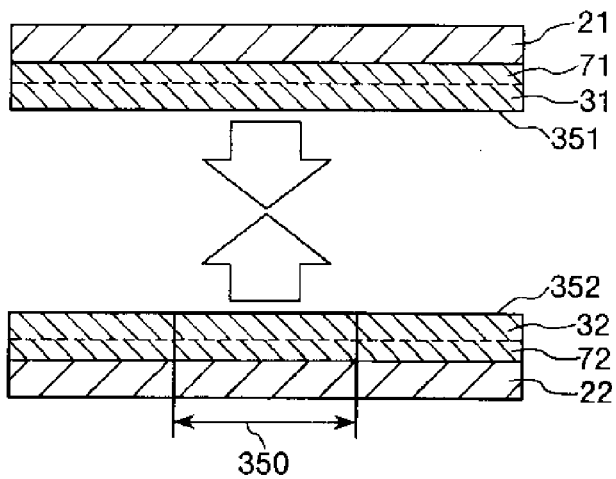
Figure 17D:
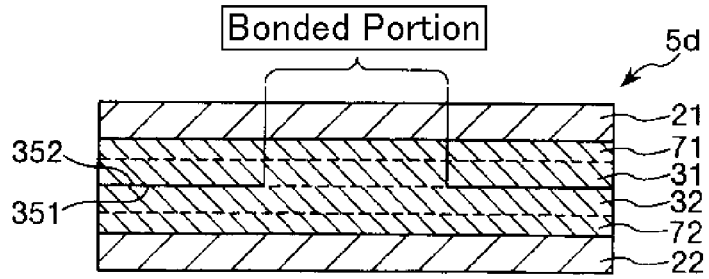

[3] Then, as shown in FIG. 17C, the two base members 1 are laminated together so that the bonding films 31 and 32 each having the bonding property thus developed make close contact with each other, to thereby obtain a bonded body 5d as shown in FIG. 17D.

In the bonded body 5d thus obtained, the two base members 1 are not bonded together in the entire of an interface therebetween, but partially bonded together only in a partial region (the predetermined region 350). During this bonding operation, it is possible to easily select a bonded region by merely controlling an energy application region of the bonding film 32. This makes it possible to easily control, e.g., the bonding strength between the base members 1.

In the manner described above, it is possible to obtain the bonded body 5d.

If necessary, the bonded body 5d thus obtained may be subjected to at least one of the steps [4A], [4B] and [4C] in the first embodiment.

For example, if the bonded body 5d is heated while compressing the same, the substrates 21 and 22 in the bonded body 5d come closer to each other. This accelerates dehydration and condensation of the hydroxyl groups and/or bonding of the dangling bonds in the interface between the bonding films 31 and 32. Thus, unification (bonding) of the bonding films 31 and 32 is further progressed in the bonded portion formed in the predetermined region 350. Eventually, the bonding films 31 and 32 are substantially completely united.

At this time, a tiny gap is generated (or remains) in the region (a non-bonding region), other than the predetermined region 350, of the interface between the surfaces 351 and 352 of the bonding films 31 and 32. Therefore, it is preferred that the compressing and heating of the bonded body 5d is performed under the conditions in that the bonding films 31 and 32 are not bonded together in the region other than the predetermined region 350.

Taking the above situations into account, it is preferred that the predetermined region 350 is preferentially subjected to at least one of the steps [4A], [4B] and [4C] in the first embodiment, when such a need arises. This makes it possible to prevent the bonding films 31 and 32 from being bonded together in the region other than the predetermined region 350.

Seventh Embodiment

Next, description will be made on a seventh embodiment of each of the base member of the present invention, a bonding method of bonding the base member and an object together, that is, the bonding method of the present invention, and the bonded body of the present invention including the above base member.

FIGS. 18A to 18D are longitudinal sectional views for explaining a seventh embodiment of the bonding method of bonding the base member according to the present invention to an object.

In this regard, it is to be noted that in the following description, an upper side in each of FIGS. 18A to 18D will be referred to as "upper" and a lower side thereof will be referred to as "lower".

Hereinafter, the bonding method according to the seventh embodiment will be described by placing emphasis on the points differing from the first to sixth embodiments, with the same matters omitted from description.

The bonding method according to this embodiment is the same as that of the first embodiment, except that two base members 1 are obtained by selectively forming intermediate layers 7a and 7b and bonding films 3a and 3b only in predetermined regions 350 of upper surfaces 251 and 252 of substrates 21 and 22, and the two base members 1 are partially bonded together through the bonding films 3a and 3b thereof.

In other words, the bonding method according to this embodiment includes a step of preparing two base members 1 each having the substrate 21 or 22, and the intermediate layer 7a or 7b and the bonding film 3a or 3b formed in a predetermined region 350 of the substrates 21 or 22, a step of applying the energy to the bonding films 3a and 3b of the base members 1 so that they are activated, and a step of making the two base members 1 close contact with each other through the bonding films 3a and 3b so that they are partially bonded together, to thereby obtain a bonded body 5e.

Hereinafter, the respective steps of the bonding method according to this embodiment will be described one after another.

Figure 18A:
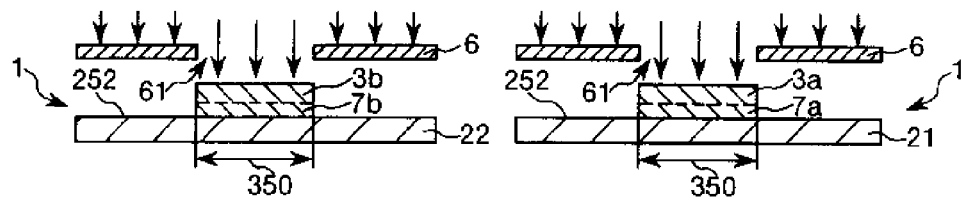
FIGS. 18A to 18D are longitudinal sectional views for explaining a seventh embodiment of the bonding method of bonding the base member according to the present invention to an object.

[1] First, as shown in FIG. 18A, masks 6 each having a window 61 whose shape corresponds to a shape of the predetermined region 350 are respectively provided above the substrates 21 and 22.

Then, the intermediate layers 7a and 7b and the bonding films 3a and 3b are respectively formed on the upper surfaces 251 and 252 of the substrates 21 and 22 through the masks 6 in these orders.

Specifically, the intermediate layers 7a and 7b are selectively formed on the predetermined regions 350 of the substrates 21 and 22 through the masks 6, respectively, and then the bonding films 3a and 3b are respectively formed on the intermediate layers 7a and 7b through the masks 6.

This makes it possible to respectively form the intermediate layer 7a and 7b and the bonding film 3a and 3b on the predetermined regions 350 of the substrates 21 and 22 in these order (see FIG. 18A).

Figure 18B:
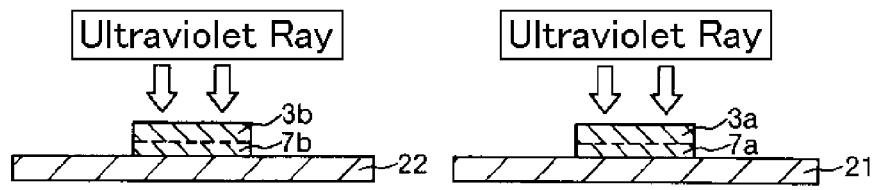

[2] Next, as shown in FIG. 18B, the energy is applied to the bonding films 3a and 3b, respectively. By doing so, a bonding property is developed in each of the bonding films 3a and 3b of the base members 1.

During the application of the energy in this step, the energy may be applied selectively to the bonding films 3a and 3b or to the entirety of the upper surfaces 251 and 252 of the substrates 21 and 22 including the bonding films 3a and 3b. In this regard, it is to be noted that the energy may be applied to the bonding films 3a and 3b by any method including, e.g., the methods described in the first embodiment.

Figure 18C:
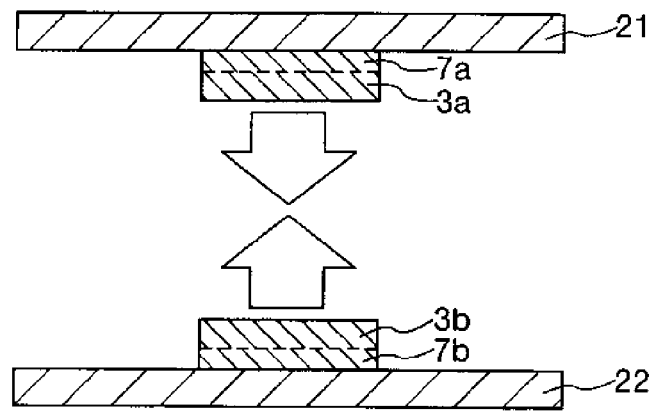

[3] Next, as shown in FIG. 18C, the two base members 1 are laminated together so that the bonding films 3a and 3b each having the bonding property thus developed make close contact with each other. This makes it possible to obtain a bonded body 5e as shown in FIG. 18D.

In the bonded body 5e thus obtained, the two base members 1 are not bonded together in the entire of an interface therebetween, but partially bonded together only in a partial region (the predetermined region 350). During the formations of the bonding films 3a and 3b, it is possible to easily select a bonded region by merely controlling the film formation regions. This makes it possible to easily control, e.g., the bonding strength between the base members 1.

Figure 18D:
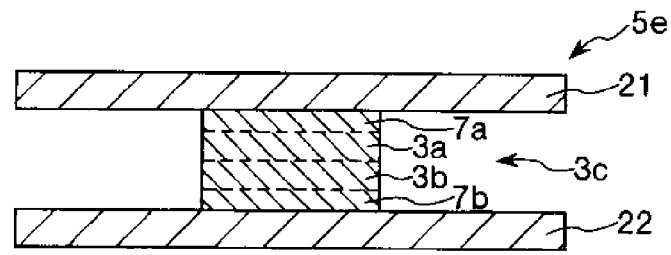

In addition, between the substrates 21 and 22 in the bonded body 5e, a gap 3c having a size corresponding to a total thickness of the intermediate layers 7a and 7b and the bonding films 3a and 3b is formed in the region other than the predetermined region 350 (see FIG. 18D).

This means that it is possible to easily form closed spaces, flow paths or the like each having a desired shape between the substrates 21 and 22 by suitably changing the shape of the predetermined region 350 and the total thickness of the intermediate layers 7a and 7b and the bonding films 3a and 3b.

In the manner described above, it is possible to obtain the bonded body 5e.

If necessary, the bonded body 5e thus obtained may be subjected to at least one of the steps [4A], [4B] and [4C] in the first embodiment.

For example, if the bonded body 5e is heated while compressing the same, the substrates 21 and 22 in the bonded body 5e come closer to each other. This accelerates dehydration and condensation of the hydroxyl groups and/or bonding of the dangling bonds in the interface between the bonding films 3a and 3b. Thus, unification (bonding) of the bonding films 3a and 3b is further progressed in the bonded portion formed in the predetermined region 350. Eventually, the bonding films 3a and 3b are substantially completely united.

The bonding methods of the respective embodiments described above can be used in bonding different kinds of members together.

Examples of an article (a bonded body) to be manufactured by these bonding methods include: semiconductor devices such as a transistor, a diode and a memory; piezoelectric devices such as a crystal oscillator and a surface acoustic wave device; optical devices such as a reflecting mirror, an optical lens, a diffraction grating and an optical filter; photoelectric conversion devices such as a solar cell; semiconductor substrates having semiconductor devices mounted thereon; insulating substrates having wirings or electrodes formed thereon; ink-jet type recording heads; parts of micro electromechanical systems such as a micro reactor and a micro mirror; sensor parts such as a pressure sensor and an acceleration sensor; package parts of semiconductor devices or electronic components; recording media such as a magnetic recording medium, a magneto-optical recording medium and an optical recording medium; parts for display devices such as a liquid crystal display device, an organic EL device and an electrophoretic display device; parts for fuel cells; and the like.

Surface Acoustic Wave Device

Now, description will be made on an embodiment of a surface acoustic wave device (a SAW device) in which the bonded body according to the present invention is used.

Figure 19:
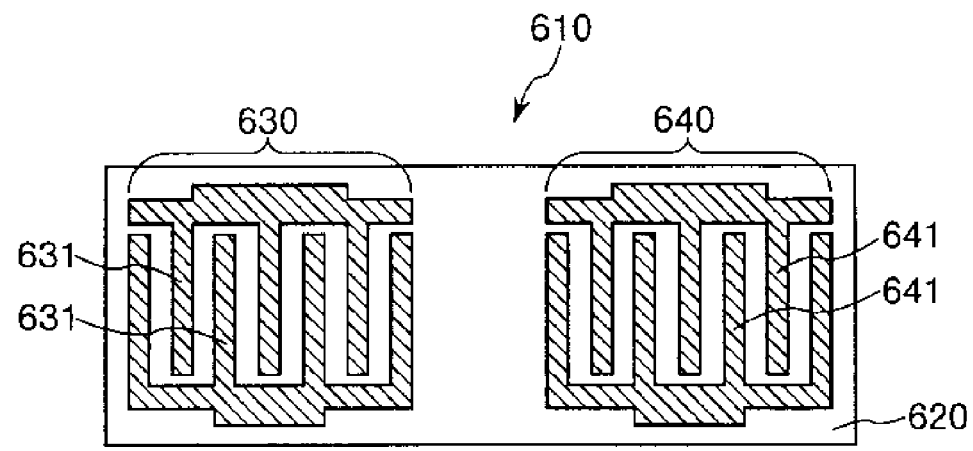
FIG. 19 is a plan view showing a surface acoustic wave device in which the bonded body according to the present invention is used.
Figure 20:
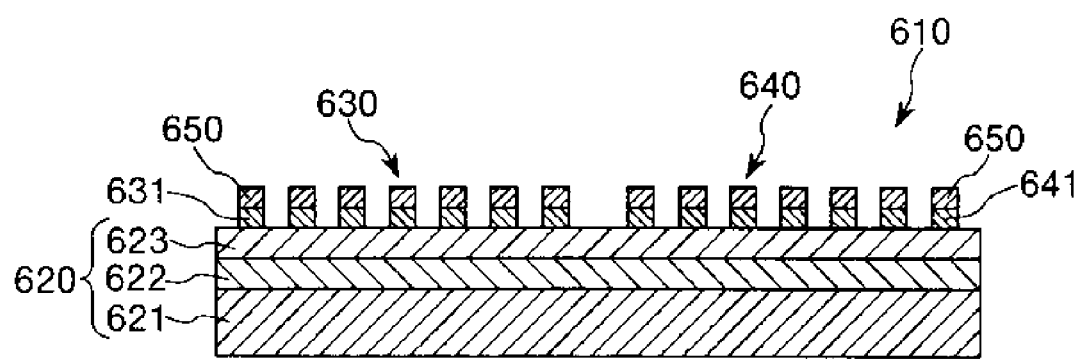
FIG. 20 is a longitudinal sectional view of the surface acoustic wave device shown in FIG. 19.

FIG. 19 is a plan view showing a surface acoustic wave device in which the bonded body according to the present invention is used. FIG. 20 is a longitudinal sectional view of the surface acoustic wave device shown in FIG. 19.

In this regard, it is to be noted that in the following description, an upper side in FIG. 20 will be referred to as "upper" and a lower side thereof will be referred to as "lower".

The surface acoustic wave device 610 shown in FIGS. 19 and 20 is a device having a transversal type structure. The surface acoustic wave device 610 includes a substrate 620 having piezoelectricity at least in the vicinity of a surface thereof, an IDT 630 for input and an IDT 640 for output each provided on the substrate 620, and an insulating protection film 650 provided on upper surfaces of the IDTs 630 and 640.

In this regard, it is to be noted that the substrate 620 includes a base 621, a foundation layer 622 and a piezoelectric body layer 623, and the foundation layer 622 and the piezoelectric body layer 623 are laminated on the base 621 in these orders.

Examples of a constituent material of the base 621 include various kinds of semiconductor materials such as Si, GaSi, SiGe, GaAs, STC and InP, various kinds of glass materials, various kinds of ceramic materials, various kinds of resin materials such as polyimide and polycarbonate, and the like.

An average thickness of the base 621 is not particularly limited to a specific value, but is preferably in the range of about 0.05 to 1 mm, and more preferably in the range of about 0.1 to 0.8 mm.

Further, the base 621 may be formed of a laminated body having a plurality of layers, as well as a single layered body. In the case where the base 621 is formed of the laminated body, the above materials may be arbitrarily used in combination as a constituent material of each layer.

The foundation layer 622 has a function of setting (defining) a property (a condition) of a surface acoustic wave excited in the piezoelectric body layer 623. Examples of the condition include an oscillation frequency, amplitude, propagation speed, and the like.

In the case where the foundation layer 622 is provided in the surface acoustic wave device 610 and a constituent material thereof is appropriately selected, it is possible to set the property of the surface acoustic wave to a desired property.

As the constituent material of the foundation layer 622, a material mainly containing at least one kind selected from the group comprising diamond, silicon, sapphire, glass, quartz, lithium tantalate, potassium niobate and lithium niobate is preferably used, and a material mainly containing at least one kind selected from the group comprising diamond, sapphire, lithium tantalate and potassium niobate is more preferably used.

Use of the above material makes it possible to contribute to change the surface acoustic wave to a high frequency, which change is required for application in the field of high speed communication such as a wireless LAN or optical communication.

An average thickness of the foundation layer 622 is not particularly limited to a specific value, but is preferably in the range of about 1 to 20 μm, more preferably in the range of about 3 to 10 μm, and still more preferably in the range of about 3 to 5 μm.

According to a desired property of the surface acoustic wave, the foundation layer 622 may be formed of a laminated body having a plurality of layers, as well as a single layered body. In this regard, it is to be noted that the foundation layer 622 is formed optionally and may be omitted.

The piezoelectric body layer 623 serves as a propagation medium of the surface acoustic wave.

As a constituent material of the piezoelectric body layer 623, a material mainly containing at least one kind selected from the group comprising zinc oxide, aluminum nitride, lithium tantalate, lithium niobate and potassium niobate is preferably used. By forming the piezoelectric body layer 623 with such a material, it is possible to obtain a surface acoustic wave device 610 having a high frequency and an excellent temperature characteristic.

Further, an average thickness of the piezoelectric body layer 623 is not particularly limited to a specific value, but is preferably in the range of about 0.01 to 5 μm, and more preferably in the range of about 0.1 to 2 μm. In this regard, it is to be noted that a substrate having a single layer structure can be used as the substrate 620 instead of a substrate having a multilayer structure.

The IDT (an input side electrode) 630 has a function of applying an electrical voltage to the piezoelectric body layer 623 and inducing a surface acoustic wave in the piezoelectric body layer 623, whereas, the IDT (an output side electrode) 640 has a function of detecting the surface acoustic wave propagating through the piezoelectric body layer 623, converting the surface acoustic wave into an electrical signal, and outputting the electrical signal to the outside.

Therefore, when a driving voltage is inputted to the IDT 630, a surface acoustic wave is induced in the piezoelectric body layer 623 and an electrical signal of a specific frequency band is outputted from the IDT 640 by a filtering function thereof.

Each of the IDTs 630 and 640 is comprised of a pair of comb-shaped electrodes each having a plurality of electrode fingers 631 or 641. A characteristic of an oscillation frequency of the surface acoustic wave can be set to a desired characteristic by adjusting widths, intervals, thicknesses, and the like of the electrode fingers 631 and 641 of the comb-shaped electrodes.

Further, examples of a constituent material of each of the IDTs 630 and 640 include Al, Cu, W, Mo, Ti, Au, Y, Pb, and Sc and alloys containing these metal elements, and one or more of which may be used independently or in combination.

The insulating protection film 650 prevents foreign matters from adhering to the upper surfaces of the IDTs 630 and 640 and prevents short-circuit between the electrode fingers 631 and 641 via the foreign matters. The insulating protection film 650 is formed on the upper surfaces of the IDTs (the comb-shaped electrodes) 630 and 640 so as to have a shape and an area substantially equal to those of the IDTs 630 and 640.

In the surface acoustic wave device 610, the insulating protective film 650 corresponds to the substrate 2 of the base member 1, and each of the IDTs 630 and 640 corresponds to the bonding film 3 thereof. In this regard, it is to be noted that an intermediate layer, which is provided between the insulating protective film 650 and each of the IDTs 630 and 640 and corresponds to the intermediate layer 7 of the base member 1, is not shown in FIG. 20.

The surface acoustic wave device 610 having such a configuration can be manufactured by bonding the base member 1, in which the substrate 2, the intermediate layer 7 and the bonding film 3 each having a shape corresponding to the shape of the insulating protective film 650 (the IDT 630 or 640) are provided, to the substrate (the object) 620.

According to such a configuration, a change in a material between the insulating protective film 650 and the substrate 620 is eliminated on a path on which the surface acoustic wave is propagated. The change in a material on the path is substantially only between the electrode fingers 631 and 641 and the substrate 620.

Therefore, reflection of the surface acoustic wave due to the change in a material and an energy loss due to the reflection are suppressed. As a result, it is possible to obtain a surface acoustic wave device 610 having high input and output efficiency.

Wiring Board

Now, description will be made on an embodiment of a wiring board in which the bonded body according to the present invention is used.

Figure 21:
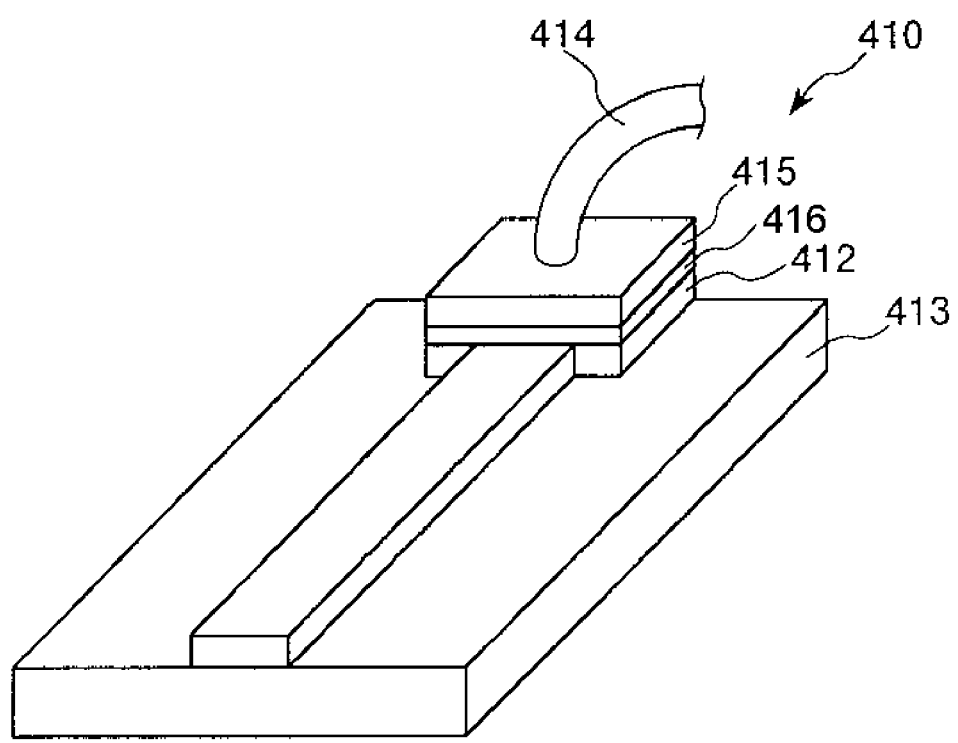
FIG. 21 is a perspective view showing a wiring board in which the bonded body according to the present invention is used.

FIG. 21 is a perspective view showing a wiring board in which the bonded body according to the present invention is used.

A wiring board 410 shown in FIG. 21 includes an insulated board 413, an electrode 412 provided on the insulated board 413, a lead 414, an electrode 415 provided at one end of the lead 414 so as to be opposed to the electrode 412, and a conductive layer 416 electrically bonding (connecting) the electrode 412 and the electrode 415 together.

In the wiring board 410, the electrode 415 corresponds to the substrate 2 of the base member 1, and the conductive layer 416 corresponds to the bonding film 3 thereof. In this regard, it is to be noted that an intermediate layer, which is provided between the electrode 415 and the conductive layer 416 and corresponds to the intermediate layer 7 of the base member 1, is not shown in FIG. 21.

The wiring board 410 having such a configuration can be manufactured by bonding the base member 1, in which the substrate 2, the intermediate layer 7 and the bonding film 3 each having a shape corresponding to the shape of the electrode 415 (the conductive layer 416) are provided, to the electrode (the object) 412.

In the wiring board 410 manufactured in this way, the electrodes 412 and 415 are firmly bonded together through the conductive layer 416. This makes it possible to reliably prevent delamination (separation) between the electrodes 412 and 415 or the like, and to obtain a wiring board 410 having high reliability. Further, the conductive layer 416 also has a function of bonding the electrodes 412 and 415, and conducting therebetween.

In this regard, even if the conductive layer 416 has a very thin thickness, it can exhibit sufficient high bonding strength. As a result, it is possible to reduce electrical resistance between the electrodes 412 and 415, and to reduce contact resistance between adjacent layers each provided in the wiring board 410. For this reason, electrical conductivity between the electrodes 412 and 415 can be further increased.

Moreover, a thickness of the conductive layer 416 can be easily controlled with high accuracy as described above. This makes it possible to obtain a wiring board 410 having higher dimensional accuracy and to easily control electrical conductivity between the electrodes 412 and 415.

Although the base member, the bonding method and the bonded body according to the present invention have been described above based on the embodiments illustrated in the drawings, the present invention is not limited thereto.

As an alternative example, the bonding method according to the present invention may be a combination of two or more of the foregoing embodiments. If necessary, one or more arbitrary step may be added in the bonding method according to the present invention.

EXAMPLES

Next, description will be made on a number of concrete examples of the present invention.

1. Manufacturing Bonded Body

Example 1A

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate to form an intermediate layer made of urethane foam and having an average thickness of 1 μm thereon.

Subsequently, the monocrystalline silicon substrate, on which the intermediate layer was formed, was set in the chamber 211 of the film forming apparatus 200 shown in FIG. 4 so that the intermediate layer faces a bottom side of the chamber 211. The intermediate layer was subjected to a surface treatment using oxygen plasma.

Next, a bonding film, which had an average thickness of 100 nm and was made of ITO containing hydrogen atoms, was formed on the surface-treated surface of the intermediate layer by means of an ion beam sputtering method. In this regard, it is to be noted that the film forming conditions were as follows.

Film Forming Conditions for Ion Beam Sputtering Method
Target: ITO
Ultimate vacuum within chamber: $2 \times 10^{-6}$ Torr
Pressure within chamber during film formation: $1 \times 10^{-3}$ Torr
Flow rate of hydrogen gas: 60 sccm
Temperature within the chamber: 20° C.
Acceleration voltage of ion beam: 600 V
Applied voltage to ion generation chamber side grid: +400 V
Applied voltage to chamber side grid: −200 V
Ion beam current: 200 mA
Kind of gas supplied to ion generation chamber: Kr gas
Processing time: 20 minutes The bonding film formed in this way was made of the ITO introducing the hydrogen atoms. The bonding film contained metal atoms (indium atoms and tin atoms), oxygen atoms bonded to the metal atoms, and leaving groups (hydrogen atoms) bonded to at least one of the metal and oxygen atoms.

In this way, obtained was a base member in which the intermediate layer and the bonding film were formed on the monocrystalline silicon substrate in this order (the base member of the present invention).

Then, an ultraviolet ray was irradiated on the obtained bonding film under the following conditions.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes On the other hand, one surface of the glass substrate (the opposite substrate) was subjected to a surface treatment using oxygen plasma.

After one minute had lapsed from irradiation of the ultraviolet ray, the base member and the glass substrate were laminated together so that the ultraviolet ray-irradiated surface of the bonding film and the surface-treated surface of the glass substrate made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the base member and the glass substrate.

Example 2A

In Example 2A, a bonded body was manufactured in the same manner as in the Example 1A, except that the heating temperature was changed from 80° C. to 25° C. during the compressing and heating of the bonded body obtained.

Examples 3A to 11A

In each of Examples 3A to 11A, a bonded body was manufactured in the same manner as in the Example 1A, except that the constitute material of the substrate and the constitute material of the opposite substrate were changed to materials shown in Table 1.

Examples 12A and 13A

In each of Examples 12A and 13A, a bonded body was manufactured in the same manner as in the Example 1A, except that the constitute material of the substrate and the constitute material of the opposite substrate were changed to materials shown in Table 1, and an intermediate layer was formed by applying a water dispersion containing poly(p-phenylenevinylene) (PPV) onto a monocrystalline silicon substrate using a spin coating method, and then subjecting the water dispersion to an annealing treatment at a temperature of 130° C. for ten minutes using a hot plate.

Example 14A

First, in the same manner as in the Example 1A, a monocrystalline silicon substrate (a substrate) on which an intermediate layer was provided and a glass substrate (an opposite substrate) were prepared and subjected to a surface treatment using oxygen plasma.

Then, a bonding film was formed on the surface-treated surface of the intermediate layer provided on the monocrystalline silicon substrate in the same manner as in the Example 1A.

In this way, obtained was a base member in which the intermediate layer and the bonding film were formed on the monocrystalline silicon substrate in this order (the base member of the present invention).

Subsequently, the base member and the glass substrate were laminated together so that the bonding film of the base member and the surface-treated surface of the glass substrate made contact with each other to thereby obtain a laminated body.

Next, an ultraviolet ray was irradiated to the laminated body from the side of the glass substrate under the following conditions.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes In this way, the base member and the glass substrate were bonded together to thereby obtain a bonded body.

Then, the bonded body thus obtained was heated at a temperature of 80° C. while compressing the same under a pressure of 3 MPa and was maintained for fifteen minutes to thereby increase bonding strength between the base member and the glass substrate.

Example 15A

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate and the glass substrate, respectively, to form intermediate layers each made of urethane foam and having an average thickness of 1 μm thereon.

Subsequently, both of the substrates were set in the chamber 211 of the film forming apparatus 200 shown in FIG. 4 so that the intermediate layers face a bottom side of the chamber 211. The intermediate layers provided on the substrates were subjected to a surface treatment using oxygen plasma.

Next, bonding films, each of which had an average thickness of 100 nm and was made of ATO containing hydrogen atoms, were formed on the surface-treated surfaces of the intermediate layers by means of an ion beam sputtering method. In this regard, it is to be noted that the film forming conditions were as follows.

Film Forming Conditions for Ion Beam Sputtering Method
Target: ATO
Ultimate vacuum within chamber: $2 \times 10^{-6}$ Torr
Pressure within chamber during film formation: $1 \times 10^{-3}$ Torr
Flow rate of hydrogen gas: 60 sccm
Temperature within the chamber: 20° C.
Acceleration voltage of ion beam: 600 V
Applied voltage to ion generation chamber side grid: +400 V
Applied voltage to chamber side grid: −200 V
Ion beam current: 200 mA
Kind of gas supplied to ion generation chamber: Kr gas
Processing time: 20 minutes In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Then, an ultraviolet ray was irradiated on the obtained bonding films under the following conditions.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes After one minute had lapsed from irradiation of the ultraviolet ray, the two base members were laminated together so that the ultraviolet ray-irradiated surfaces of the bonding films made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the two base members.

Example 16A

In Example 16A, a bonded body was manufactured in the same manner as in the Example 15A, except that the heating temperature was changed from 80° C. to 25° C. during the compressing and heating of the bonded body obtained.

Examples 17A to 25A

In each of Examples 17A to 25A, a bonded body was manufactured in the same manner as in the Example 15A, except that the constitute material of the substrate and the constitute material of the opposite substrate were changed to materials shown in Table 1.

Examples 26A and 27A

In each of Examples 26A and 27A, a bonded body was manufactured in the same manner as in the Example 15A, except that the constitute material of the substrate and the constitute material of the opposite substrate were changed to materials shown in Table 1, and intermediate layers were formed by applying a water dispersion containing poly(p-phenylenevinylene) (PPV) onto both of the substrates using a spin coating method, and then subjecting the water dispersion to an annealing treatment at a temperature of 130° C. for ten minutes using a hot plate.

Example 28A

First, in the same manner as in the Example 15A, a monocrystalline silicon substrate (a substrate) on which an intermediate layer was provided and a glass substrate (an opposite substrate) on which an intermediate layer was provided were prepared, and the intermediate layers were subjected to a surface treatment using oxygen plasma.

Then, bonding films were formed on the surface-treated surfaces of the intermediate layers provided on the substrates in the same manner as in the Example 15A.

In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Subsequently, the base members were laminated together so that the bonding films of the base members made contact with each other to thereby obtain a laminated body.

Next, an ultraviolet ray was irradiated to the laminated body from the side of the glass substrate under the following conditions.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes In this way, the base members were bonded together to thereby obtain a bonded body.

Then, the bonded body thus obtained was heated at a temperature of 80° C. while compressing the same under a pressure of 3 MPa and was maintained for fifteen minutes to thereby increase bonding strength between the two base members.

Example 29A

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate and the glass substrate, respectively, to form intermediate layers each made of urethane foam and having an average thickness of 1 μm thereon.

Subsequently, both of the substrates were set in the chamber 211 of the film forming apparatus 200 shown in FIG. 4 so that the intermediate layers face a bottom side of the chamber 211. The intermediate layers provided on the substrates were subjected to a surface treatment using oxygen plasma.

Next, bonding films, each of which had an average thickness of 100 nm and was made of ITO containing hydrogen atoms, were formed on the surface-treated surfaces of the intermediate layers by means of an ion beam sputtering method. In this regard, it is to be noted that the film forming conditions were as follows.

Film Forming Conditions for Ion Beam Sputtering Method
Target: ITO
Ultimate vacuum within chamber: $2\times10^{-6}$ Torr
Pressure within chamber during film formation: $1\times10^{-3}$ Torr
Flow rate of hydrogen gas: 60 sccm
Temperature within the chamber: 20° C.
Acceleration voltage of ion beam: 600 V
Applied voltage to ion generation chamber side grid: +400 V
Applied voltage to chamber side grid: −200 V
Ion beam current: 200 mA
Kind of gas supplied to ion generation chamber: Kr gas
Processing time: 20 minutes In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Then, an ultraviolet ray was irradiated on the obtained bonding films under the following conditions. In this regard, it is to be noted that the ultraviolet ray was irradiated on the entirety of the surface of the bonding film provided on the monocrystalline silicon substrate and on a frame-shaped region having a width of 3 mm along a periphery of the surface of the bonding film provided on the glass substrate.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes Subsequently, the two base members were laminated together so that the ultraviolet ray-irradiated surfaces of the bonding films made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the two base members.

Example 30A

In Example 30A, a bonded body was manufactured in the same manner as in the Example 29A, except that the heating temperature was changed from 80° C. to 25° C. during the compressing and heating of the bonded body obtained.

Examples 31A, 35A to 37A, 39A and 40A

In each of Examples 31A, 35A to 37A, 39A and 40A, a bonded body was manufactured in the same manner as in the Example 29A, except that the constitute material of the substrate and the constitute material of the opposite substrate were changed to materials shown in Table 2.

Example 32A

First, a monocrystalline silicon substrate having a length of 20 mm, a width of 20 mm, an average thickness of 1 mm and a flatness of 500 nm (defined by JIS B 0621) was prepared as a substrate. A stainless steel substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate to form an intermediate layer made of urethane foam and having an average thickness of 1 μm thereon.

Subsequently, the monocrystalline silicon substrate, on which the intermediate layer was formed, was set in the chamber 211 of the film forming apparatus 200 shown in FIG.

4 so that the intermediate layer faces a bottom side of the chamber 211. The intermediate layer was subjected to a surface treatment using oxygen plasma.

Next, a bonding film, which had an average thickness of 100 nm and was made of ITO containing hydrogen atoms, was formed on the surface-treated surface of the intermediate layer by means of an ion beam sputtering method. In this regard, it is to be noted that the film forming conditions were the same as those of Example 29A.

In this way, obtained was a base member in which the intermediate layer and the bonding film were formed on the monocrystalline silicon substrate in this order (the base member of the present invention).

Then, an ultraviolet ray was irradiated on the bonding film in the same manner as in the Example 29A. In this regard, it is to be noted that the ultraviolet ray was irradiated on a frame-shaped region having a width of 3 mm along a periphery of the surface of the bonding film.

Further, the stainless steel substrate was subjected to a surface treatment using oxygen plasma in the same manner as employed in the monocrystalline silicon substrate.

Subsequently, the base member and the stainless steel substrate were laminated together so that the ultraviolet ray-irradiated surface of the bonding film and the surface-treated surface of the stainless steel substrate made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the base member and the stainless steel substrate.

Example 33A

In Example 33A, a bonded body was manufactured in the same manner as in the Example 32A, except that the heating temperature was changed from 80° C. to 25° C. during the compressing and heating of the bonded body obtained.

Examples 34A, 38A and 41A

In each of Examples 34A, 38A and 41A, a bonded body was manufactured in the same manner as in the Example 32A, except that the constitute material of the substrate and the constitute material of the opposite substrate were changed to materials shown in Table 2.

Example 1B

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate to form an intermediate layer made of urethane foam and having an average thickness of 1 μm thereon.

Subsequently, the monocrystalline silicon substrate, on which the intermediate layer was formed, was set in the chamber 211 of the film forming apparatus 200 shown in FIG. 4 so that the intermediate layer faces a bottom side of the chamber 211. The intermediate layer was subjected to a surface treatment using oxygen plasma.

Next, as a metal oxide film, an ITO film having an average thickness of 100 nm was formed on the surface-treated surface of the intermediate layer by means of an ion beam sputtering method. In this regard, it is to be noted that the film forming conditions were as follows.

Film Forming Conditions for Ion Beam Sputtering Method
Target: ITO
Ultimate vacuum within chamber: $2 \times 10^{-6}$ Torr
Pressure within chamber during film formation: $1 \times 10^{-3}$ Torr
Temperature within the chamber: 20° C.
Acceleration voltage of ion beam: 600 V
Applied voltage to ion generation chamber side grid: +400 V
Applied voltage to chamber side grid: −200 V
Ion beam current: 200 mA
Kind of gas supplied to ion generation chamber: Kr gas
Processing time: 20 minutes Thereafter, the metal oxide film (the ITO film) thus obtained was subjected to a heat treatment so that hydrogen atoms were introduced into the vicinity of a surface thereof to obtain a bonding film. In this regard, it is to be noted that the heat treatment conditions were as follows.

Heat Treatment Conditions
Pressure within chamber during heat treatment: $1 \times 10^{-3}$ Torr
Flow rate of hydrogen gas: 60 sccm
Temperature within the chamber: 150° C.
Processing time: 60 minutes The bonding film formed in this way was composed from the ITO film introducing the hydrogen atoms into the vicinity of the surface thereof. The bonding film included metal atoms (indium atoms and tin atoms), oxygen atoms bonded to the metal atoms, and leaving groups (hydrogen atoms) bonded to at least one of the metal and oxygen atoms.

In this way, obtained was a base member in which the intermediate layer and the bonding film were formed on the monocrystalline silicon substrate in this order (the base member of the present invention).

Then, an ultraviolet ray was irradiated on the obtained bonding film under the following conditions.

Ultraviolet Ray Irradiation Conditions
Composition of atmospheric gas: atmosphere (air)
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes On the other hand, one surface of the glass substrate (the opposite substrate) was subjected to a surface treatment using oxygen plasma.

After one minute had lapsed from irradiation of the ultraviolet ray, the base member and the glass substrate were laminated together so that the ultraviolet ray-irradiated surface of the bonding film and the surface-treated surface of the glass substrate made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the base member and the glass substrate.

Example 2B

In Example 2B, a bonded body was manufactured in the same manner as in the Example 1B, except that the heating temperature was changed from 80° C. to 25° C. during the compressing and heating of the bonded body obtained.

Examples 3B to 11B

In each of Examples 3B to 11B, a bonded body was manufactured in the same manner as in the Example 1B, except that the constitute material of the substrate and the constitute material of the opposite substrate were changed to materials shown in Table 3.

Examples 12B and 13B

In each of Examples 12B and 13B, a bonded body was manufactured in the same manner as in the Example 1B, except that the constitute material of the substrate and the constitute material of the opposite substrate were changed to materials shown in Table 3, and an intermediate layer was formed by applying a water dispersion containing poly(p-phenylenevinylene) (PPV) onto a monocrystalline silicon substrate using a spin coating method, and then subjecting the water dispersion to an annealing treatment at a temperature of 130° C. for ten minutes using a hot plate.

Example 14B

First, in the same manner as in the Example 1B, a monocrystalline silicon substrate (a substrate) on which an intermediate layer was provided and a glass substrate (an opposite substrate) were prepared and subjected to a surface treatment using oxygen plasma.

Then, a bonding film was formed on the surface-treated surface of the intermediate layer provided on the monocrystalline silicon substrate in the same manner as in the Example 1B.

In this way, obtained was a base member in which the intermediate layer and the bonding film were formed on the monocrystalline silicon substrate in this order (the base member of the present invention).

Subsequently, the base member and the glass substrate were laminated together so that the bonding film of the base member and the surface-treated surface of the glass substrate made contact with each other to thereby obtain a laminated body.

Next, an ultraviolet ray was irradiated to the laminated body from the side of the glass substrate under the following conditions.

Ultraviolet Ray Irradiation Conditions
Composition of atmospheric gas: atmosphere (air)
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes In this way, the base member and the glass substrate were bonded together to thereby obtain a bonded body.

Then, the bonded body thus obtained was heated at a temperature of 80° C. while compressing the same under a pressure of 3 MPa and was maintained for fifteen minutes to thereby increase bonding strength between the base member and the glass substrate.

Example 15B

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate and the glass substrate, respectively, to form intermediate layers each made of urethane foam and having an average thickness of 1 μm thereon.

Subsequently, both of the substrates were set in the chamber 211 of the film forming apparatus 200 shown in FIG. 4 so that the intermediate layers face a bottom side of the chamber 211. The intermediate layers provided on the substrates were subjected to a surface treatment using oxygen plasma.

Next, as metal oxide films, ATO films each having an average thickness of 100 nm were formed on the surface-treated surfaces of the intermediate layers by means of an ion beam sputtering method. In this regard, it is to be noted that the film forming conditions were as follows.

Film Forming Conditions for Ion Beam Sputtering Method
Target: ATO
Ultimate vacuum within chamber: $2 \times 10^{-6}$ Torr
Pressure within chamber during film formation: $1 \times 10^{-3}$ Torr
Temperature within the chamber: 20° C.
Acceleration voltage of ion beam: 600 V
Applied voltage to ion generation chamber side grid: +400 V
Applied voltage to chamber side grid: −200 V
Ion beam current: 200 mA
Kind of gas supplied to ion generation chamber: Kr gas
Processing time: 20 minutes Thereafter, the metal oxide films (the ATO films) thus obtained were subjected to a heat treatment so that hydrogen atoms were introduced into the vicinity of surfaces thereof to thereby obtain bonding films. In this regard, it is to be noted that the heat treatment conditions were as follows.

Heat Treatment Conditions
Pressure within chamber during heat treatment: $1 \times 10^{-3}$ Torr
Flow rate of hydrogen gas: 60 sccm
Temperature within the chamber: 150° C.
Processing time: 60 minutes In this way, obtained were a base member in which the intermediate layer and the bonding film were formed on the monocrystalline silicon substrate in this order, and a base member in which the intermediate layer and the bonding film were formed on the glass substrate in this order.

Then, an ultraviolet ray was irradiated on the obtained bonding films under the following conditions.

Ultraviolet Ray Irradiation Conditions
Composition of atmospheric gas: atmosphere (air)

Temperature of atmospheric gas: 20° C.

Pressure of atmospheric gas: atmospheric pressure (100 kPa)

Wavelength of ultraviolet ray: 172 nm

Irradiation time of ultraviolet ray: 5 minutes

After one minute had lapsed from irradiation of the ultraviolet ray, the two base members were laminated together so that the ultraviolet ray-irradiated surfaces of the bonding films made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the two base members.

Example 16B

In Example 16B, a bonded body was manufactured in the same manner as in the Example 15B, except that the heating temperature was changed from 80° C. to 25° C. during the compressing and heating of the bonded body obtained.

Examples 17B to 25B

In each of Examples 17B to 25B, a bonded body was manufactured in the same manner as in the Example 15B, except that the constitute material of the substrate and the constitute material of the opposite substrate were changed to materials shown in Table 3.

Examples 26B and 27B

In each of Examples 26B and 27B, a bonded body was manufactured in the same manner as in the Example 15B, except that the constitute material of the substrate and the constitute material of the opposite substrate were changed to materials shown in Table 3, and intermediate layers were formed by applying a water dispersion containing poly(p-phenylenevinylene) (PPV) onto both of the substrates using a spin coating method, and then subjecting the water dispersion to an annealing treatment at a temperature of 130° C. for ten minutes using a hot plate.

Example 28B

First, in the same manner as in the Example 15B, a monocrystalline silicon substrate (a substrate) on which an intermediate layer was provided and a glass substrate (an opposite substrate) on which an intermediate layer was provided were prepared, and the intermediate layers were subjected to a surface treatment using oxygen plasma.

Then, bonding films were formed on the surface-treated surfaces of the intermediate layers provided on the substrates in the same manner as in the Example 15B.

In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Subsequently, the base members were laminated together so that the bonding films of the base members made contact with each other to thereby obtain a laminated body.

Next, an ultraviolet ray was irradiated on the laminated body from the side of the glass substrate under the following conditions.

Ultraviolet Ray Irradiation Conditions

Composition of atmospheric gas: atmosphere (air)

Temperature of atmospheric gas: 20° C.

Pressure of atmospheric gas: atmospheric pressure (100 kPa)

Wavelength of ultraviolet ray: 172 nm

Irradiation time of ultraviolet ray: 5 minutes

In this way, the base members were bonded together to thereby obtain a bonded body.

Then, the bonded body thus obtained was heated at a temperature of 80° C. while compressing the same under a pressure of 3 MPa and was maintained for fifteen minutes to thereby increase bonding strength between the two base members.

Example 29B

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate and the glass substrate, respectively, to form intermediate layers each made of urethane foam and having an average thickness of 1 μm thereon.

Subsequently, both of the substrates were set in the chamber 211 of the film forming apparatus 200 shown in FIG. 4 so that the intermediate layers face a bottom side of the chamber 211. The intermediate layers provided on the substrates were subjected to a surface treatment using oxygen plasma.

Next, as metal oxide films, ITO films each having an average thickness of 100 nm were formed on the surface-treated surfaces of the intermediate layers by means of an ion beam sputtering method. In this regard, it is to be noted that the film forming conditions were as follows.

Film Forming Conditions for Ion Beam Sputtering Method

Target: ITO

Ultimate vacuum within chamber: $2 \times 10^{-6}$ Torr

Pressure within chamber during film formation: $1 \times 10^{-3}$ Torr

Temperature within the chamber: 20° C.

Acceleration voltage of ion beam: 600 V

Applied voltage to ion generation chamber side grid: +400 V

Applied voltage to chamber side grid: −200 V

Ion beam current: 200 mA

Kind of gas supplied to ion generation chamber: Kr gas

Processing time: 20 minutes

Thereafter, the metal oxide films (the ITO films) thus obtained were subjected to a heat treatment so that hydrogen atoms were introduced into the vicinity of surfaces thereof to obtain bonding films. In this regard, it is to be noted that the heat treatment conditions were as follows.

Heat Treatment Conditions

Pressure within chamber during heat treatment: $1 \times 10^{-3}$ Torr

Flow rate of hydrogen gas: 60 sccm

Temperature within the chamber: 150° C.

Processing time: 60 minutes

In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Then, an ultraviolet ray was irradiated on the obtained bonding films under the following conditions. In this regard, it is to be noted that the ultraviolet ray was irradiated on the entirety of the surface of the bonding film provided on the monocrystalline silicon substrate and on a frame-shaped region having a width of 3 mm along a periphery of the surface of the bonding film provided on the glass substrate.

Ultraviolet Ray Irradiation Conditions

Composition of atmospheric gas: atmosphere (air)

Temperature of atmospheric gas: 20° C.

Pressure of atmospheric gas: atmospheric pressure (100 kPa)

Wavelength of ultraviolet ray: 172 nm

Irradiation time of ultraviolet ray: 5 minutes

Subsequently, the two base members were laminated together so that the ultraviolet ray-irradiated surfaces of the bonding films made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the two base members.

Example 30B

In Example 30B, a bonded body was manufactured in the same manner as in the Example 29B, except that the heating temperature was changed from 80° C. to 25° C. during the compressing and heating of the bonded body obtained.

Examples 31B, 35B to 37B, 39B and 40B

In each of Examples 31B, 35B to 37B, 39B and 40B, a bonded body was manufactured in the same manner as in the Example 29B, except that the constitute material of the substrate and the constitute material of the opposite substrate were changed to materials shown in Table 4.

Example 32B

First, a monocrystalline silicon substrate having a length of 20 mm, a width of 20 mm, an average thickness of 1 mm and a flatness of 500 nm (defined by JIS B 0621) was prepared as a substrate. A stainless steel substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate to form an intermediate layer made of urethane foam and having an average thickness of 1 μm thereon.

Subsequently, the monocrystalline silicon substrate, on which the intermediate layer was formed, was set in the chamber 211 of the film forming apparatus 200 shown in FIG. 4 so that the intermediate layer faces a bottom side of the chamber 211. The intermediate layer was subjected to a surface treatment using oxygen plasma.

Next, a bonding film, which had an average thickness of 100 nm and composed from the ITO film introducing hydrogen atoms into the vicinity of the surface thereof, was formed on the surface-treated surface of the intermediate layer. In this regard, it is to be noted that the film forming conditions were the same as those of Example 29B.

In this way, obtained was a base member in which the intermediate layer and the bonding film were formed on the monocrystalline silicon substrate in this order (the base member of the present invention).

Then, an ultraviolet ray was irradiated on the bonding film in the same manner as in the Example 29B. In this regard, it is to be noted that the ultraviolet ray was irradiated on a frame-shaped region having a width of 3 mm along a periphery of the surface of the bonding film.

Further, the stainless steel substrate was subjected to a surface treatment using oxygen plasma in the same manner as employed in the monocrystalline silicon substrate.

Subsequently, the base member and the stainless steel substrate were laminated together so that the ultraviolet ray-irradiated surface of the bonding film and the surface-treated surface of the stainless steel substrate made contact with each other to thereby obtain a bonded body.

Then, the bonded body thus obtained was heated at a temperature of 80° C. while compressing the same under a pressure of 3 MPa and was maintained for fifteen minutes to thereby increase bonding strength between the base member and the stainless steel substrate.

Example 33B

In Example 33B, a bonded body was manufactured in the same manner as in the Example 32B, except that the heating temperature was changed from 80° C. to 25° C. during the compressing and heating of the bonded body obtained.

Examples 34B, 38B and 41B

In each of Examples 34B, 38B and 41B, a bonded body was manufactured in the same manner as in the Example 32B, except that the constitute material of the substrate and the constitute material of the opposite substrate were changed to materials shown in Table 4.

Example 1C

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate to form an intermediate layer made of urethane foam and having an average thickness of 1 μm thereon.

Subsequently, the monocrystalline silicon substrate, on which the intermediate layer was formed, was set in the chamber 511 of the film forming apparatus 500 shown in FIG. 8. The intermediate layer was subjected to a surface treatment using oxygen plasma.

Next, a bonding film having an average thickness of 100 nm was formed on the surface-treated surface of the intermediate layer using 2,4-pentadionato copper(II) as a raw material by means of a MOCVD method. In this regard, it is to be noted that the film forming conditions were as follows.

Film Forming Conditions
Atmosphere within chamber: nitrogen gas and hydrogen gas
Organic metal material (raw material): 2,4-pentadionato copper(II)
Flow rate of atomized organic metal material: 1 sccm
Carrier gas: nitrogen gas
Flow rate of carrier gas: 500 sccm
Flow rate of hydrogen gas: 0.2 sccm
Ultimate vacuum within chamber: $2 \times 10^{-6}$ Torr
Pressure within chamber during film formation: $1 \times 10^{-3}$ Torr
Temperature of substrate holder: 275° C.
Processing time: 10 minutes The bonding film formed in this way contained Cu atoms as metal atoms. In the bonding film, a part of an organic compound contained in the 2,4-pentadionato copper(II) remained as leaving groups.

In this way, obtained was a base member in which the intermediate layer and the bonding film were formed on the monocrystalline silicon substrate in this order (the base member of the present invention).

Then, an ultraviolet ray was irradiated on the obtained bonding film under the following conditions.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes On the other hand, one surface of the glass substrate (the opposite substrate) was subjected to a surface treatment using oxygen plasma.

After one minute had lapsed from irradiation of the ultraviolet ray, the base member and the glass substrate were laminated together so that the ultraviolet ray-irradiated surface of the bonding film and the surface-treated surface of the glass substrate made contact with each other to thereby obtain a bonded body.

Then, the bonded body thus obtained was heated at a temperature of 120° C. while compressing the same under a pressure of 10 MPa and was maintained for fifteen minutes to thereby increase bonding strength between the base member and the glass substrate.

Example 2C

In Example 2C, a bonded body was manufactured in the same manner as in the Example 1C, except that the heating temperature was changed from 120° C. to 25° C. during the compressing and heating of the bonded body obtained.

Examples 3C to 11C

In each of Examples 3C to 11C, a bonded body was manufactured in the same manner as in the Example 1C, except that the constitute material of the substrate and the constitute material of the opposite substrate were changed to materials shown in Table 5.

Examples 12C and 13C

In each of Examples 12C and 13C, a bonded body was manufactured in the same manner as in the Example 1C, except that the constitute material of the substrate and the constitute material of the opposite substrate were changed to materials shown in Table 5, and an intermediate layer was formed by applying a water dispersion containing poly(p-phenylenevinylene) (PPV) onto a monocrystalline silicon substrate using a spin coating method, and then subjecting the water dispersion to an annealing treatment at a temperature of 130° C. for ten minutes using a hot plate.

Example 14C

First, in the same manner as in the Example 1C, a monocrystalline silicon substrate (a substrate) on which an intermediate layer was provided and a glass substrate (an opposite substrate) were prepared and subjected to a surface treatment using oxygen plasma.

Then, a bonding film was formed on the surface-treated surface of the intermediate layer provided on the monocrystalline silicon substrate in the same manner as in the Example 1C.

In this way, obtained was a base member in which the intermediate layer and the bonding film were formed on the monocrystalline silicon substrate in this order (the base member of the present invention).

Subsequently, the base member and the glass substrate were laminated together so that the bonding film of the base member and the surface-treated surface of the glass substrate made contact with each other to thereby obtain a laminated body.

Next, an ultraviolet ray was irradiated to the laminated body from the side of the glass substrate under the following conditions.

Ultraviolet Ray Irradiation Conditions
Composition of atmospheric gas: nitrogen gas
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes In this way, the base member and the glass substrate were bonded together to thereby obtain a bonded body.

Then, the bonded body thus obtained was heated at a temperature of 80° C. while compressing the same under a pressure of 10 MPa and was maintained for fifteen minutes to thereby increase bonding strength between the base member and the glass substrate.

Example 15C

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate and the glass substrate, respectively, to form intermediate layers each made of urethane foam and having an average thickness of 1 μm thereon.

Subsequently, both of the substrates were set in the chamber 511 of the film forming apparatus 500 shown in FIG. 8 so that the intermediate layers face an upper side of the chamber 511. The intermediate layers provided on the substrates were subjected to a surface treatment using oxygen plasma.

Next, bonding films each having an average thickness of 100 nm were formed on the surface-treated surfaces of the intermediate layers using 2,4-pentadionato copper(II) as a raw material by means of a MOCVD method. In this regard, it is to be noted that the film forming conditions were as follows.

Film Forming Conditions

Atmosphere within chamber: nitrogen gas and hydrogen gas

Organic metal material (raw material): 2,4-pentadionato copper(II)

Flow rate of atomized organic metal material: 1 sccm

Carrier gas: nitrogen gas

Flow rate of carrier gas: 500 sccm

Flow rate of hydrogen gas: 0.2 sccm

Ultimate vacuum within chamber: $2 \times 10^{-6}$ Torr

Pressure within chamber during film formation: $1 \times 10^{-3}$ Torr

Temperature of substrate holder: 275° C.

Processing time: 10 minutes

In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Then, an ultraviolet ray was irradiated on the obtained bonding films under the following conditions.

Ultraviolet Ray Irradiation Conditions

Composition of atmospheric gas: nitrogen gas

Temperature of atmospheric gas: 20° C.

Pressure of atmospheric gas: atmospheric pressure (100 kPa)

Wavelength of ultraviolet ray: 172 nm

Irradiation time of ultraviolet ray: 5 minutes

After one minute had lapsed from irradiation of the ultraviolet ray, the two base members were laminated together so that the ultraviolet ray-irradiated surfaces of the bonding films made contact with each other to thereby obtain a bonded body.

Then, the bonded body thus obtained was heated at a temperature of 120° C. while compressing the same under a pressure of 10 MPa and was maintained for fifteen minutes to thereby increase bonding strength between the two base members.

Example 16C

In Example 16C, a bonded body was manufactured in the same manner as in the Example 15C, except that the heating temperature was changed from 120° C. to 25° C. during the compressing and heating of the bonded body obtained.

Examples 17C to 25C

In each of Examples 17C to 25C, a bonded body was manufactured in the same manner as in the Example 15C, except that the constitute material of the substrate and the constitute material of the opposite substrate were changed to materials shown in Table 5.

Examples 26C and 27C

In each of Examples 26C and 27C, a bonded body was manufactured in the same manner as in the Example 15C, except that the constitute material of the substrate and the constitute material of the opposite substrate were changed to materials shown in Table 5, and intermediate layers were formed by applying a water dispersion containing poly(p-phenylenevinylene) (PPV) onto both of the substrates using a spin coating method, and then subjecting the water dispersion to an annealing treatment at a temperature of 130° C. for ten minutes using a hot plate.

Example 28C

First, in the same manner as in the Example 15C, a monocrystalline silicon substrate (a substrate) on which an intermediate layer was provided and a glass substrate (an opposite substrate) on which an intermediate layer was provided were prepared, and the intermediate layers were subjected to a surface treatment using oxygen plasma.

Then, bonding films were formed on the surface-treated surfaces of the intermediate layers provided on the substrates in the same manner as in the Example 15C.

In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Subsequently, the base members were laminated together so that the bonding films of the base members made contact with each other to thereby obtain a laminated body.

Next, an ultraviolet ray was irradiated on the laminated body from the side of the glass substrate under the following conditions.

Ultraviolet Ray Irradiation Conditions

Composition of atmospheric gas: nitrogen gas

Temperature of atmospheric gas: 20° C.

Pressure of atmospheric gas: atmospheric pressure (100 kPa)

Wavelength of ultraviolet ray: 172 nm

Irradiation time of ultraviolet ray: 5 minutes

In this way, the base members were bonded together to thereby obtain a bonded body.

Then, the bonded body thus obtained was heated at a temperature of 80° C. while compressing the same under a pressure of 10 MPa and was maintained for fifteen minutes to thereby increase bonding strength between the two base members.

Example 29C

First, a monocrystalline silicon substrate having a length of 20 mm, a width of 20 mm, an average thickness of 1 mm and a flatness of 500 nm (defined by JIS B 0621) was prepared as a substrate. A glass substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate and the glass substrate, respectively, to form intermediate layers each made of urethane foam and having an average thickness of 1 μm thereon.

Subsequently, both of the substrates were set in the chamber 511 of the film forming apparatus 500 shown in FIG. 8 so that the intermediate layers face an upper side of the chamber 511. The intermediate layers provided on the substrates were subjected to a surface treatment using oxygen plasma.

Next, bonding films each having an average thickness of 100 nm were formed on the surface-treated surfaces of the intermediate layers using 2,4-pentadionato copper(II) as a raw material by means of a MOCVD method. In this regard, it is to be noted that the film forming conditions were as follows.

Film Forming Conditions

Atmosphere within chamber: nitrogen gas and hydrogen gas

Organic metal material (raw material): 2,4-pentadionato copper(II)

Flow rate of atomized organic metal material: 1 sccm

Carrier gas: nitrogen gas

Flow rate of carrier gas: 500 sccm

Flow rate of hydrogen gas: 0.2 sccm

Ultimate vacuum within chamber: $2 \times 10^{-6}$ Torr

Pressure within chamber during film formation: $1 \times 10^{-3}$ Torr

Temperature of substrate holder: 275° C.

Processing time: 10 minutes

In this way, obtained were a base member in which the intermediate layer and the bonding film were formed on the monocrystalline silicon substrate in this order, and a base member in which the intermediate layer and the bonding film were formed on the glass substrate in this order (the base members of the present invention).

Then, an ultraviolet ray was irradiated on the obtained bonding films under the following conditions. In this regard, it is to be noted that the ultraviolet ray was irradiated on the entirety of the surface of the bonding film provided on the monocrystalline silicon substrate and on a frame-shaped region having a width of 3 mm along a periphery of the surface of the bonding film provided on the glass substrate.

Ultraviolet Ray Irradiation Conditions

Composition of atmospheric gas: nitrogen gas

Temperature of atmospheric gas: 20° C.

Pressure of atmospheric gas: atmospheric pressure (100 kPa)

Wavelength of ultraviolet ray: 172 nm

Irradiation time of ultraviolet ray: 5 minutes

Subsequently, the two base members were laminated together so that the ultraviolet ray-irradiated surfaces of the bonding films made contact with each other to thereby obtain a bonded body.

Then, the bonded body thus obtained was heated at a temperature of 120° C. while compressing the same under a pressure of 10 MPa and was maintained for fifteen minutes to thereby increase bonding strength between the two base members.

Example 30C

In Example 30C, a bonded body was manufactured in the same manner as in the Example 29C, except that the heating temperature was changed from 120° C. to 80° C. during the compressing and heating of the bonded body obtained.

Examples 31C, 35C to 37C, 39C and 40C

In each of Examples 31C, 35C to 37C, 39C and 40C, a bonded body was manufactured in the same manner as in the Example 29C, except that the constitute material of the substrate and the constitute material of the opposite substrate were changed to materials shown in Table 6.

Example 32C

First, a monocrystalline silicon substrate having a length of 20 mm, a width of 20 mm, an average thickness of 1 mm and a flatness of 500 nm (defined by JIS B 0621) was prepared as a substrate. A stainless steel substrate having a length of 20 mm, a width of 20 mm, an average thickness of 1 mm and a flatness of 500 nm (defined by JIS B 0621) was prepared as an opposite substrate.

Then, toluene diisocyanate ("T-80", produced by Nippon Polyurethane Industry Co., Ltd.) was prepared as polyisocyanate, polyether polyol ("OHV35", produced by Sanyo Chemical Industries, Ltd.) was prepared as polyol, and stannous octylate ("MRH110", produced by Johoku Chemical Co., Ltd.) was prepared as a catalyst.

These materials were mixed under the presence of water and applied onto the monocrystalline silicon substrate to form an intermediate layer made of urethane foam and having an average thickness of 1 μm thereon.

Subsequently, the monocrystalline silicon substrate, on which the intermediate layer was formed, was set in the chamber 511 of the film forming apparatus 500 shown in FIG. 8 so that the intermediate layer faces an upper side of the chamber 511. The intermediate layer was subjected to a surface treatment using oxygen plasma.

Next, a bonding film having an average thickness of 100 nm was formed on the surface-treated surface of the intermediate layer in the same manner as in the Example 29C.

In this way, obtained was a base member in which the intermediate layer and the bonding film were formed on the monocrystalline silicon substrate in this order (the base member of the present invention).

Then, an ultraviolet ray was irradiated on the bonding film in the same manner as in the Example 29C. In this regard, it is to be noted that the ultraviolet ray was irradiated on a frame-shaped region having a width of 3 mm along a periphery of the surface of the bonding film.

Further, the stainless steel substrate was subjected to a surface treatment using oxygen plasma in the same manner as employed in the monocrystalline silicon substrate.

Subsequently, the base member and the stainless steel substrate were laminated together so that the ultraviolet ray-irradiated surface of the bonding film and the surface-treated surface of the stainless steel substrate made contact with each other to thereby obtain a bonded body.

Then, the bonded body thus obtained was heated at a temperature of 120° C. while compressing the same under a pressure of 3 MPa and was maintained for fifteen minutes to thereby increase bonding strength between the base member and the stainless steel substrate.

Example 33C

In Example 33C, a bonded body was manufactured in the same manner as in the Example 32C, except that the heating temperature was changed from 120° C. to 80° C. during the compressing and heating of the bonded body obtained.

Examples 34C, 38C and 41C

In each of Examples 34C, 38C and 41C, a bonded body was manufactured in the same manner as in the Example 32C, except that the constitute material of the substrate and the constitute material of the opposite substrate were changed to materials shown in Table 6.

Comparative Examples 1 to 3

In each of Comparative Examples 1 to 3, a bonded body was manufactured in the same manner as in the Example 1C, except that the constitute material of the substrate and the constitute material of the opposite substrate were changed to materials shown in Table 5, and the substrate on which the intermediate layer was formed and the opposite substrate were bonded together using an epoxy-based adhesive.

Comparative Examples 4 to 6

In each of Comparative Examples 4 to 6, a bonded body was manufactured in the same manner as in the Example 1C, except that the constitute material of the substrate and the constitute material of the opposite substrate were changed to materials shown in Table 5, and the substrate on which the intermediate layer was formed and the opposite substrate were bonded together using an Ag paste.

Comparative Examples 7 to 9

In each of Comparative Examples 7 to 9, a bonded body was manufactured in the same manner as in the Example 1C, except that the constitute material of the substrate and the constitute material of the opposite substrate were changed to materials shown in Table 6, and the substrate on which the intermediate layer was formed and the opposite substrate were partially bonded together using an epoxy-based adhesive in regions each having a width of 3 mm along a periphery of each substrate.

2. Evaluation of Bonded Body 2.1 Evaluation of Bonding Strength (Splitting Strength)

Bonding strength was measured for each of the bonded bodies obtained in the Examples 1A to 28A, the Examples 1B to 28B, the Examples 1C to 28C, and the Comparative Examples 1 to 6.

The measurement of the bonding strength was performed by trying removal of the substrate from the opposite substrate. The bonding strength was defined by a value measured just before the substrate and the opposite substrate were separated with each other, and was evaluated according to criteria described below.

Evaluation Criteria for Bonding Strength
A: 10 MPa (100 kgf/cm$^2$) or more
B: 5 MPa (50 kgf/cm$^2$) or more, but less than 10 MPa (100 kgf/cm$^2$)
C: 1 MPa (10 kgf/cm$^2$) or more, but less than 5 MPa (50 kgf/cm$^2$)
D: less than 1 MPa (10 kgf/cm$^2$)

2.2 Evaluation of Dimensional Accuracy

Dimensional accuracy in a thickness direction was measured for each of the bonded bodies obtained in the Examples 1A to 41A, the Examples 1B to 41B, the Examples 1C to 41C, and the Comparative Examples 1 to 9.

The evaluation of the dimensional accuracy was performed by measuring a thickness of each corner portion of the bonded body having a squire shape, calculating a difference between a maximum value and a minimum value of the thicknesses measured, and evaluating the difference according to criteria described below.

Evaluation Criteria for Dimensional Accuracy
A: less than 10 μm
B: 10 μm or more 2.3 Evaluation of Chemical Resistance Each of the bonded bodies obtained in the Examples 1A to 41A, the Examples 1B to 41B, the Examples 1C to 41C, and the Comparative Examples 1 to 9 was immersed in ink for an ink-jet printer ("HQ4", produced by Seiko Epson Corporation), which was maintained at a temperature of 80° C., for three weeks.

Thereafter, the substrate was removed from the opposite substrate, and it was checked whether or not the ink penetrated into a bonding interface of the bonded body. The result of the check was evaluated according to criteria described below.

Evaluation Criteria for Chemical Resistance
A: Ink did not penetrate into the bonded body at all.
B: Ink penetrated into the corner portions of the bonded body slightly.
C: Ink penetrated along the edge portions of the bonded body.
D: Ink penetrated into the inside of the bonded body.

2.4 Evaluation of Resistivity

Resistivity in a bonded portion was measured for each of the bonded bodies obtained in the examples 12A, 13A, 26A, 27A, 12B, 13B, 26B, 27B, 12C, 13C, 26C and 27C and the comparative examples 5 and 6. The measured resistivity was evaluated according to criteria described bellow.

Evaluation Criteria for Resistivity
A: less than $1 \times 10^{-3}$ Ω·cm
B: $1 \times 10^{-3}$ Ω·cm or more 2.5 Evaluation of Shape Change Shape changes of the substrate and the opposite substrate were checked for each of the bonded bodies obtained in the Examples 29A to 41A, the Examples 29B to 41B, the Examples 29C to 41C, and the Comparative Examples 7 to 9.

Specifically, warp amounts of the substrate and the opposite substrate were measured before and after the bonded body was manufactured, a change between the warp amounts was evaluated according to criteria described below.

Evaluation Criteria for Change between Warp Amounts
A: The warp amounts of the substrate and the opposite substrate were changed hardly before and after the bonded body was manufactured.
B: The warp amounts of the substrate and the opposite substrate were changed slightly before and after the bonded body was manufactured.
C: The warp amounts of the substrate and the opposite substrate were changed rather significantly before and after the bonded body was manufactured.
D: The warp amounts of the substrate and the opposite substrate were changed significantly before and after the bonded body was manufactured.

Evaluation results of the above items 2.1 to 2.5 are shown in Tables 1 to 6.

TABLE 1

| | Constituent Material of Substrate | Bonding Film Metal Oxide | Bonding Film Leaving Groups | Bonding Film Forming Position | Intermediate layer | Constituent Material of Opposite Substrate | Irradiation of Ultraviolet Ray | Heating Temperature | Bonding Strength | Dimensional Accuracy | Chemical Resistance | Resistivity |
|---|---|---|---|---|---|---|---|---|---|---|---|---|
| Ex. 1A | Silicon | ITO | Hydrogen Atoms | Only Substrate | Urethane Foam | Glass | Before Laminating | 80° C. | B | A | A | — |
| Ex. 2A | Silicon | | | | | Glass | | 25° C. | B | A | A | — |
| Ex. 3A | Silicon | | | | | Silicon | | 80° C. | B | A | A | — |
| Ex. 4A | Silicon | | | | | Stainless Steel | | 80° C. | B | A | A | — |
| Ex. 5A | Silicon | | | | | Aluminum | | 80° C. | B | A | A | — |
| Ex. 6A | Silicon | | | | | PET | | 80° C. | A | A | A | — |
| Ex. 7A | Silicon | | | | | PI | | 80° C. | A | A | A | — |
| Ex. 8A | Glass | | | | | Glass | | 80° C. | B | A | A | — |
| Ex. 9A | Glass | | | | | Stainless Steel | | 80° C. | B | A | A | — |
| Ex. 10A | Stainless Steel | | | | | PET | | 80° C. | A | A | A | — |
| Ex. 11A | Stainless Steel | | | | | PI | | 80° C. | A | A | A | — |
| Ex. 12A | Stainless Steel | | | | PPV | Aluminum | | 80° C. | B | A | A | A |
| Ex. 13A | Stainless Steel | | | | | Stainless Steel | | 80° C. | B | A | A | A |
| Ex. 14A | Silicon | | | | Urethane Foam | Glass | After Laminating | 80° C. | B | A | A | — |
| Ex. 15A | Silicon | ATO | | Substrate and Opposite Substrate | Urethane Foam | Glass | Before Laminating | 80° C. | B | A | A | — |
| Ex. 16A | Silicon | | | | | Glass | | 25° C. | B | A | A | — |
| Ex. 17A | Silicon | | | | | Silicon | | 80° C. | B | A | A | — |
| Ex. 18A | Silicon | | | | | Stainless Steel | | 80° C. | B | A | A | — |
| Ex. 19A | Silicon | | | | | Aluminum | | 80° C. | B | A | A | — |
| Ex. 20A | Silicon | | | | | PET | | 80° C. | A | A | A | — |
| Ex. 21A | Silicon | | | | | PI | | 80° C. | A | A | A | — |
| Ex. 22A | Glass | | | | | Glass | | 80° C. | B | A | A | — |
| Ex. 23A | Glass | | | | | Stainless Steel | | 80° C. | B | A | A | — |
| Ex. 24A | Stainless Steel | | | | | PET | | 80° C. | A | A | A | — |
| Ex. 25A | Stainless Steel | | | | | PI | | 80° C. | A | A | A | — |
| Ex. 26A | Stainless Steel | | | | PPV | Aluminum | | 80° C. | B | A | A | A |
| Ex. 27A | Stainless Steel | | | | | Stainless Steel | | 80° C. | B | A | A | A |
| Ex. 28A | Silicon | | | | Urethane Foam | Glass | After Laminating | 80° C. | B | A | A | — |

*PET: Polyethylene Terephthalate, PI: Polyimide

TABLE 2

| | Conditions for Manufacturing Bonded Body | | | | | | | | Evaluation Results | | | |
|---|---|---|---|---|---|---|---|---|---|---|---|---|
| | Constituent Material of Substrate | Bonding Film Metal Oxide | Bonding Film Leaving Groups | Bonding Film Bonding region | Forming Position | Constituent Material of Opposite Substrate | Irradiation of Ultraviolet Ray | Heating Temperature | Dimensional Accuracy | Chemical Resistance | Change of Warp Amounts |
|---|---|---|---|---|---|---|---|---|---|---|---|
| Ex. 29A | Silicon | ITO | Hydrogen Atoms | A Part of Surface of Bonding Film | Substrate and Opposite Substrate | Glass | Before Laminating | 80° C. | A | A | A |
| Ex. 30A | Silicon | | | | Substrate and Opposite Substrate | Glass | | 25° C. | A | A | A |
| Ex. 31A | Silicon | | | | Substrate and Opposite Substrate | Silicon | | 80° C. | A | A | A |
| Ex. 32A | Silicon | | | | Only Substrate | Stainless Steel | | 80° C. | A | A | B |
| Ex. 33A | Silicon | | | | Only Substrate | Stainless Steel | | 25° C. | A | A | A |
| Ex. 34A | Silicon | | | | Only Substrate | Aluminum | | 80° C. | A | A | B |
| Ex. 35A | Silicon | | | | Substrate and Opposite Substrate | PET | | 80° C. | A | A | B |
| Ex. 36A | Silicon | | | | Substrate and Opposite Substrate | PI | | 80° C. | A | A | B |
| Ex. 37A | Glass | | | | Substrate and Opposite Substrate | Glass | | 80° C. | A | A | A |

TABLE 2-continued

| | Conditions for Manufacturing Bonded Body | | | | | | | Evaluation Results | | |
|---|---|---|---|---|---|---|---|---|---|---|
| | Constituent | Bonding Film | | | Constituent Material of | Irradiation of | Heating | Di- | | Change of Warp |
| | Material of Substrate | Metal Oxide | Leaving Groups | Bonding region | Forming Position | Opposite Substrate | Ultraviolet Ray | Tem- perature | mensional Accuracy | Chemical Resistance | A- mounts |
| Ex. 38A | Glass | | | | Only Substrate | Stainless Steel | | 80° C. | A | A | B |
| Ex. 39A | Stainless Steel | | | | Substrate and Opposite Substrate | PET | | 80° C. | A | A | B |
| Ex. 40A | Stainless Steel | | | | Substrate and Opposite Substrate | PI | | 80° C. | A | A | B |
| Ex. 41A | Stainless Steel | | | | Only Substrate | Aluminum | | 80° C. | A | A | A |

*PET: Polyethylene Terephthalate, PI: Polyimide

TABLE 3

| | Conditions for Manufacturing Bonded Body | | | | | | | | Evaluation Results | | | |
|---|---|---|---|---|---|---|---|---|---|---|---|---|
| | Constituent | Bonding Film | | | | Constituent Material of | Irradiation of | Heating | Bond- | Di- | | Re- |
| | Material of Substrate | Metal Oxide | Leaving Groups | Forming Position | Intermediate layer | Opposite Substrate | Ultraviolet Ray | Tem- perature | ing Strength | mensional Accuracy | Chemical Resistance | sis- tivity |
| Ex. 1B | Silicon | ITO | Hydrogen Atoms | Only Substrate | Urethane Foam | Glass | Before Laminating | 80° C. | B | A | A | — |
| Ex. 2B | Silicon | | | | | Glass | | 25° C. | B | A | A | — |
| Ex. 3B | Silicon | | | | | Silicon | | 80° C. | B | A | A | — |
| Ex. 4B | Silicon | | | | | Stainless Steel | | 80° C. | B | A | A | — |
| Ex. 5B | Silicon | | | | | Aluminum | | 80° C. | B | A | A | — |
| Ex. 6B | Silicon | | | | | PET | | 80° C. | A | A | A | — |
| Ex. 7B | Silicon | | | | | PI | | 80° C. | A | A | A | — |
| Ex. 8B | Glass | | | | | Glass | | 80° C. | B | A | A | — |
| Ex. 9B | Glass | | | | | Stainless Steel | | 80° C. | B | A | A | — |
| Ex. 10B | Stainless Steel | | | | | PET | | 80° C. | A | A | A | — |
| Ex. 11B | Stainless Steel | | | | | PI | | 80° C. | A | A | A | — |
| Ex. 12B | Stainless Steel | | | | PPV | Aluminum | | 80° C. | B | A | A | A |
| Ex. 13B | Stainless Steel | | | | | Stainless Steel | | 80° C. | B | A | A | A |
| Ex. 14B | Silicon | | | | Urethane Foam | Glass | After Laminating | 80° C. | B | A | A | — |
| Ex. 15B | Silicon | ATO | | Substrate and Opposite Substrate | Urethane Foam | Glass | Before Laminating | 80° C. | B | A | A | — |
| Ex. 16B | Silicon | | | | | Glass | | 25° C. | B | A | A | — |
| Ex. 17B | Silicon | | | | | Silicon | | 80° C. | B | A | A | — |
| Ex. 18B | Silicon | | | | | Stainless Steel | | 80° C. | B | A | A | — |
| Ex. 19B | Silicon | | | | | Aluminum | | 80° C. | B | A | A | — |
| Ex. 20B | Silicon | | | | | PET | | 80° C. | A | A | A | — |
| Ex. 21B | Silicon | | | | | PI | | 80° C. | A | A | A | — |
| Ex. 22B | Glass | | | | | Glass | | 80° C. | B | A | A | — |
| Ex. 23B | Glass | | | | | Stainless Steel | | 80° C. | B | A | A | — |
| Ex. 24B | Stainless Steel | | | | | PET | | 80° C. | A | A | A | — |
| Ex. 25B | Stainless Steel | | | | | PI | | 80° C. | A | A | A | — |
| Ex. 26B | Stainless Steel | | | | PPV | Aluminum | | 80° C. | B | A | A | A |
| Ex. 27B | Stainless Steel | | | | | Stainless Steel | | 80° C. | B | A | A | A |
| Ex. 28B | Silicon | | | | Urethane Foam | Glass | After Laminating | 80° C. | B | A | A | — |

*PET: Polyethylene Terephthalate, PI: Polyimide

TABLE 4

| | Constituent Material of Substrate | Bonding Film Metal Oxide | Bonding Film Leaving Groups | Bonding Film Bonding region | Bonding Film Forming Position | Constituent Material of Opposite Substrate | Irradiation of Ultraviolet Ray | Heating Temperature | Dimensional Accuracy | Chemical Resistance | Change of Warp Amounts |
|---|---|---|---|---|---|---|---|---|---|---|---|
| Ex. 29B | Silicon | ITO | Hydrogen Atoms | A Part of Surface of Bonding Film | Substrate and Opposite Substrate | Glass | Before Laminating | 80° C. | A | A | A |
| Ex. 30B | Silicon | | | | Substrate and Opposite Substrate | Glass | | 25° C. | A | A | A |
| Ex. 31B | Silicon | | | | Substrate and Opposite Substrate | Silicon | | 80° C. | A | A | A |
| Ex. 32B | Silicon | | | | Only Substrate | Stainless Steel | | 80° C. | A | A | B |
| Ex. 33B | Silicon | | | | Only Substrate | Stainless Steel | | 25° C. | A | A | A |
| Ex. 34B | Silicon | | | | Only Substrate | Aluminum | | 80° C. | A | A | B |
| Ex. 35B | Silicon | | | | Substrate and Opposite Substrate | PET | | 80° C. | A | A | B |
| Ex. 36B | Silicon | | | | Substrate and Opposite Substrate | PI | | 80° C. | A | A | B |
| Ex. 37B | Glass | | | | Substrate and Opposite Substrate | Glass | | 80° C. | A | A | A |
| Ex. 38B | Glass | | | | Only Substrate | Stainless Steel | | 80° C. | A | A | B |
| Ex. 39B | Stainless Steel | | | | Substrate and Opposite Substrate | PET | | 80° C. | A | A | B |
| Ex. 40B | Stainless Steel | | | | Substrate and Opposite Substrate | PI | | 80° C. | A | A | B |
| Ex. 41B | Stainless Steel | | | | Only Substrate | Aluminum | | 80° C. | A | A | A |

*PET: Polyethylene Terephthalate, PI: Polyimide

TABLE 5

| | Constituent Material of Substrate | Bonding Film Raw Material of Bonding Film | Bonding Film Forming Position | Intermediate layer | Constituent Material of Opposite Substrate | Irradiation of Ultraviolet Ray | Heating Temperature | Bonding Strength | Dimensional Accuracy | Chemical Resistance | Resistivity |
|---|---|---|---|---|---|---|---|---|---|---|---|
| Ex. 1C | Silicon | 2,4-Pentadionato Copper(II) | Only Substrate | Urethane Foam | Glass | Before Laminating | 120° C. | B | A | A | — |
| Ex. 2C | Silicon | | | | Glass | | 25° C. | B | A | A | — |
| Ex. 3C | Silicon | | | | Silicon | | 120° C. | B | A | A | — |
| Ex. 4C | Silicon | | | | Stainless Steel | | 120° C. | B | A | A | — |
| Ex. 5C | Silicon | | | | Aluminum | | 120° C. | B | A | A | — |
| Ex. 6C | Silicon | | | | PET | | 120° C. | A | A | A | — |
| Ex. 7C | Silicon | | | | PI | | 120° C. | A | A | A | — |
| Ex. 8C | Glass | | | | Glass | | 120° C. | B | A | A | — |
| Ex. 9C | Glass | | | | Stainless Steel | | 120° C. | B | A | A | — |
| Ex. 10C | Stainless Steel | | | | PET | | 120° C. | A | A | A | — |
| Ex. 11C | Stainless Steel | | | | PI | | 120° C. | A | A | A | — |
| Ex. 12C | Stainless Steel | | | PPV | Aluminum | | 120° C. | B | A | A | A |
| Ex. 13C | Stainless Steel | | | | Stainless Steel | | 120° C. | B | A | A | A |
| Ex. 14C | Silicon | | | Urethane Foam | Glass | After Laminating | 80° C. | B | A | A | — |
| Ex. 15C | Silicon | | Substrate and Opposite | Urethane Foam | Glass | Before Laminating | 120° C. | B | A | A | — |
| Ex. 16C | Silicon | | | | Glass | | 25° C. | B | A | A | — |
| Ex. 17C | Silicon | | | | Silicon | | 120° C. | B | A | A | — |

TABLE 5-continued

| | | Conditions for Manufacturing Bonded Body | | | | | | Evaluation Results | | | |
|---|---|---|---|---|---|---|---|---|---|---|---|
| | | Bonding Film | | | Constituent | Irradiation | | | | | |
| | Constituent Material of Substrate | Raw Material of Bonding Film | Forming Position | Intermediate layer | Material of Opposite Substrate | of Ultraviolet Ray | Heating Temperature | Bonding Strength | Dimensional Accuracy | Chemical Resistance | Resistivity |
| Ex. 18C | Silicon | | Substrate | | Stainless Steel | | 120° C. | B | A | A | — |
| Ex. 19C | Silicon | | | | Aluminum | | 120° C. | B | A | A | — |
| Ex. 20C | Silicon | | | | PET | | 120° C. | A | A | A | — |
| Ex. 21C | Silicon | | | | PI | | 120° C. | A | A | A | — |
| Ex. 22C | Glass | | | | Glass | | 120° C. | B | A | A | — |
| Ex. 23C | Glass | | | | Stainless Steel | | 120° C. | B | A | A | — |
| Ex. 24C | Stainless Steel | | | | PET | | 120° C. | A | A | A | — |
| Ex. 25C | Stainless Steel | | | | PI | | 120° C. | A | A | A | — |
| Ex. 26C | Stainless Steel | | | PPV | Aluminum | | 120° C. | B | A | A | A |
| Ex. 27C | Stainless Steel | | | | Stainless Steel | | 120° C. | B | A | A | A |
| Ex. 28C | Silicon | | | Urethane Foam | Glass | After Laminating | 80° C. | B | A | A | — |
| Comp. Ex. 1 | Silicon | Epoxy-based Adhesive | — | Urethane Foam | Glass | — | — | C | B | C | — |
| Comp. Ex. 2 | Silicon | | | | Silicon | | | C | B | C | — |
| Comp. Ex. 3 | Silicon | | | | Stainless Steel | | | C | B | C | — |
| Comp. Ex. 4 | Stainless Steel | Conductive Paste | — | Urethane Foam | Glass | — | | C | B | C | — |
| Comp. Ex. 5 | Stainless Steel | (Ag Paste) | | | Aluminum | | | C | B | C | B |
| Comp. Ex. 6 | Stainless Steel | | | | Stainless Steel | | | C | B | C | B |

*PET: Polyethylene Terephthalate, PI: Polyimide

TABLE 6

| | | Conditions for Manufacturing Bonded Body | | | | | | Evaluation Results | | |
|---|---|---|---|---|---|---|---|---|---|---|
| | | Bonding Film | | | Constituent | Irradiation | | | | |
| | Constituent Material of Substrate | Raw Material of Bonding Film | Bonding region | Forming Position | Material of Opposite Substrate | of Ultraviolet Ray | Heating Temperature | Dimensional Accuracy | Chemical Resistance | Change of Warp Amounts |
| Ex. 29C | Silicon | 2,4-Pentadionato Copper(II) | A Part of Surface of Bonding Film | Substrate and Opposite Substrate | Glass | Before Laminating | 120° C. | A | A | A |
| Ex. 30C | Silicon | | | Substrate and Opposite Substrate | Glass | | 80° C. | A | A | A |
| Ex. 31C | Silicon | | | Substrate and Opposite Substrate | Silicon | | 120° C. | A | A | A |
| Ex. 32C | Silicon | | | Only Substrate | Stainless Steel | | 120° C. | A | A | B |
| Ex. 33C | Silicon | | | Only Substrate | Stainless Steel | | 80° C. | A | A | A |
| Ex. 34C | Silicon | | | Only Substrate | Aluminum | | 120° C. | A | A | B |
| Ex. 35C | Silicon | | | Substrate and Opposite Substrate | PET | | 120° C. | A | A | B |
| Ex. 36C | Silicon | | | Substrate and Opposite Substrate | PI | | 120° C. | A | A | B |
| Ex. 37C | Glass | | | Substrate and Opposite Substrate | Glass | | 120° C. | A | A | A |
| Ex. 38C | Glass | | | Only Substrate | Stainless Steel | | 120° C. | A | A | B |

TABLE 6-continued

| | Conditions for Manufacturing Bonded Body | | | | | | Evaluation Results | | |
|---|---|---|---|---|---|---|---|---|---|
| | Bonding Film | | | Constituent | Irradiation | | | | |
| | Constituent Material of Substrate | Raw Material of Bonding Film | Bonding region | Forming Position | Material of Opposite Substrate | of Ultraviolet Ray | Heating Temperature | Dimensional Accuracy | Chemical Resistance | Change of Warp Amounts |
| Ex. 39C | Stainless Steel | | | Substrate and Opposite Substrate | PET | | 120° C. | A | A | B |
| Ex. 40C | Stainless Steel | | | Substrate and Opposite Substrate | PI | | 120° C. | A | A | B |
| Ex. 41C | Stainless Steel | | | Only Substrate | Aluminum | | 120° C. | A | A | A |
| Comp. Ex. 7 | Silicon | Epoxy-based Adhesive | A Part of Surface of Bonding Film | — | Glass | — | — | B | C | A |
| Comp. Ex. 8 | Silicon | | | | Silicon | | | B | C | A |
| Comp. Ex. 9 | Silicon | | | | Stainless Steel | | | B | C | B |

*PET: Polyethylene Terephthalate, PI: Polyimide

As is apparent in Tables 1 to 6, the bonded bodies obtained in the examples exhibited excellent characteristics in all the items of the bonding strength, the dimensional accuracy, the chemical resistance, and the resistivity. Further, the bonded bodies obtained in the Examples had the changes of the warp amounts smaller than those of the bonded bodies obtained in the Comparative Examples.

On the other hand, the bonded bodies obtained in the Comparative Examples did not have enough chemical resistance. Further, it was confirmed that the dimensional accuracy of the bonded bodies was particularly low. Moreover, the resistivity of the bonded bodies was high.

What is claimed is:

1. A base member being adapted to be bonded to an object through a bonding film, wherein the base member comprises:
   a substrate;
   the bonding film containing metal atoms being antimony, oxygen atoms bonded to the metal atoms, and leaving groups each bonded to at least one of the metal or oxygen atoms, and having a surface; and
   an intermediate layer provided between the substrate and the bonding film, the intermediate layer having such a property that its thickness can be changed by applying stress thereto, wherein the intermediate layer is constituted of an urethane foam or poly(p-phenylenevinylene),
   wherein when energy is applied to at least a predetermined region of the surface of the bonding film, the leaving groups, which exist in the surface within the region, are removed from the bonding film so that the region develops a bonding property with respect to the object.

2. The base member as claimed in claim 1, wherein the leaving groups are unevenly distributed in the surface of the bonding film.

3. The base member as claimed in claim 1, wherein the leaving groups are at least one selected from the group consisting of a hydrogen atom, a carbon atom, a nitrogen atom, a phosphorus atom, a sulfur atom, a halogen atom and an atomic group composed of these atoms.

4. The base member as claimed in claim 1, wherein the bonding film is composed of a material which is obtained by introducing hydrogen atoms as the leaving groups into antimony tin oxide (ATO).

5. The base member as claimed in claim 1, wherein the abundance ratio of the metal atoms to the oxygen atoms contained in the bonding film is in the range of 3:7 to 7:3.

6. The base member as claimed in claim 1, wherein the intermediate layer is directly bonded to the bonding film.

7. The base member as claimed in claim 1, wherein the intermediate layer is capable of being elastically deformed.

8. The base member as claimed in claim 7, wherein the storage modulus of the intermediate layer is in the range of 0.01 to 10 MPa.

9. The base member as claimed in claim 1, wherein the average thickness of the intermediate layer is in the range of 5 to 10000 nm.

10. The base member as claimed in claim 1, wherein the ratio of the average thickness of the intermediate layer to the average thickness of the bonding film is 0.1 to 1000.

11. The base member as claimed in claim 1, wherein active hands are generated on the surface of the bonding film, after the leaving groups existing at least in the surface are removed from the bonding film.

12. The base member as claimed in claim 11, wherein each of the active hands is a dangling bond or a hydroxyl group.

13. The base member as claimed in claim 1, wherein the average thickness of the bonding film is in the range of 1 to 1000 nm.

14. The base member as claimed in claim 1, wherein the bonding film is in the form of a solid having no fluidity.

15. The base member as claimed in claim 1, wherein at least a portion of the substrate which makes contact with the intermediate layer is composed of a silicon material, a metal material or a glass material as a major component thereof.

16. The base member as claimed in claim 1, wherein a surface of the intermediate layer which makes contact with the bonding film has been subjected to a surface treatment for improving bonding strength between the intermediate layer and the bonding film.

17. The base member as claimed in claim 16, wherein the surface treatment is a plasma treatment.

18. A bonded body, comprising:
   the base member defined by claim 1; and
   an object bonded to the base member through the bonding film thereof.

19. A bonded body, comprising:
a first base member and a second base member each defined by claim 1,
wherein the first and second base members are bonded together by facing and bonding the bonding films thereof.

20. A bonding method of forming a bonded body in which the base member defined by claim 1 and an object are bonded together through the bonding film of the base member, comprising:
preparing the base member and the object;
applying energy to at least a predetermined region of a surface of the bonding film of the base member so that the region develops a bonding property with respect to the object; and
making the object and the base member close contact with each other through the bonding film, so that the object and the base member are bonded together due to the bonding property developed in the region, to thereby obtain the bonded body.

21. The bonding method as claimed in claim 20, wherein the applying the energy is carried out by at least one method selected from the group consisting of a method in which an energy beam is irradiated on the bonding film, a method in which the bonding film is heated and a method in which a compressive force is applied to the bonding film.

22. The bonding method as claimed in claim 21, wherein the energy beam is an ultraviolet ray having a wavelength of 126 to 300 nm.

23. The bonding method as claimed in claim 21, wherein a temperature of the heating is in the range of 25 to 100° C.

24. The bonding method as claimed in claim 21, wherein the compressive force is in the range of 0.2 to 10 MPa.

25. The bonding method as claimed in claim 20, wherein the applying the energy is carried out in an atmosphere.

26. The bonding method as claimed in claim 20, wherein the object has a surface which has been, in advance, subjected to a surface treatment for improving bonding strength between the object and the base member, and
wherein the bonding film of the base member makes close contact with the surface-treated surface of the object.

27. The bonding method as claimed in claim 20, wherein the object has a surface containing at least one group or substance selected from the group comprising a functional group, a radical, an open circular molecule, an unsaturated bond, a halogen atom and peroxide, and
wherein the bonding film of the base member makes close contact with the surface having the group or substance of the object.

28. The bonding method as claimed in claim 20, further comprising subjecting the bonded body to a treatment for improving bonding strength between the base member and the object.

29. The bonding method as claimed in claim 28, wherein the subjecting the treatment is carried out by at least one method selected from the group consisting of a method in which an energy beam is irradiated on the bonded body, a method in which the bonded body is heated and a method in which a compressive force is applied to the bonded body.

30. A bonding method of forming a bonded body in which the base member defined by claim 1 and an object are bonded together through the bonding film of the base member, the bonding film having a surface making contact with the object, comprising:
preparing the base member and the object;
making the object and the base member close contact with each other through the bonding film to obtain a laminated body in which the object and the base member are laminated together; and
applying energy to at least a predetermined region of the surface of the bonding film in the laminated body, so that the region develops a bonding property with respect to the object and the object and the base member are bonded together due to the bonding property developed in the region, to thereby obtain the bonded body.

31. The bonding method as claimed in claim 30, wherein the applying the energy is carried out by at least one method selected from the group consisting of a method in which an energy beam is irradiated on the bonding film, a method in which the bonding film is heated and a method in which a compressive force is applied to the bonding film.

32. The bonding method as claimed in claim 31, wherein the energy beam is an ultraviolet ray having a wavelength of 126 to 300 nm.

33. The bonding method as claimed in claim 31, wherein the temperature of the heating is in the range of 25 to 100° C.

34. The bonding method as claimed in claim 31, wherein the compressive force is in the range of 0.2 to 10 MPa.

35. The bonding method as claimed in claim 30, wherein the applying the energy is carried out in an atmosphere.

36. The bonding method as claimed in claim 30, wherein the object has a surface which has been, in advance, subjected to a surface treatment for improving bonding strength between the object and the base member, and
wherein the bonding film of the base member makes close contact with the surface-treated surface of the object.

37. The bonding method as claimed in claim 30, wherein the object has a surface containing at least one group or substance selected from the group comprising a functional group, a radical, an open circular molecule, an unsaturated bond, a halogen atom and peroxide, and
wherein the bonding film of the base member makes close contact with the surface having the group or substance of the object.

38. The bonding method as claimed in claim 30, further comprising subjecting the bonded body to a treatment for improving bonding strength between the base member and the object.

39. The bonding method as claimed in claim 38, wherein the subjecting the treatment is carried out by at least one method selected from the group consisting of a method in which an energy beam is irradiated on the bonded body, a method in which the bonded body is heated and a method in which a compressive force is applied to the bonded body.

* * * * *